US012580440B2

(12) United States Patent
Howey et al.

(10) Patent No.: US 12,580,440 B2
(45) Date of Patent: Mar. 17, 2026

(54) MOTOR HOUSING DESIGN FOR ROTOR-AXIAL-DISPLACEMENT-INDEPENDENT AND MOUNTING-ORIENTATION-INDEPENDENT INGRESS PROTECTION

(71) Applicant: Enedym Inc., Hamilton (CA)

(72) Inventors: Brock Howey, Paris (CA); Berker Bilgin, Welland (CA)

(73) Assignee: Enedym Inc., Hamilton (CA)

( * ) Notice: Subject to any disclaimer, the term of this patent is extended or adjusted under 35 U.S.C. 154(b) by 300 days.

(21) Appl. No.: 18/207,260

(22) Filed: Jun. 8, 2023

(65) Prior Publication Data

US 2024/0413700 A1 Dec. 12, 2024

(51) Int. Cl.
*H02K 5/10* (2006.01)
*H02K 15/14* (2006.01)

(52) U.S. Cl.
CPC .............. *H02K 5/10* (2013.01); *H02K 15/14* (2013.01)

(58) Field of Classification Search
CPC H02K 5/10; H02K 5/124; H02K 5/20; H02K 5/14; H02K 9/19; Y10S 277/927; Y10S 277/926; F16J 15/40; F16J 15/28
USPC ................................. 310/90, 88, 87
See application file for complete search history.

(56) References Cited

U.S. PATENT DOCUMENTS 2,377,770 A * 6/1945 Fish ......................... F16J 15/54
277/423
2,936,715 A * 5/1960 Southam ............... F04D 29/146
277/377

3,021,161 A * 2/1962 Rhoads ................ F16J 15/3256
277/423
3,330,567 A * 7/1967 Mercer ................. B21B 31/078
277/423
3,494,681 A * 2/1970 Anderson ............. F16C 23/084
277/423
3,510,138 A * 5/1970 Bowen ................. F16J 15/3264
384/135

(Continued)

FOREIGN PATENT DOCUMENTS

CN 108258873 B 2/2020
CN 111490620 A 8/2020

(Continued)

*Primary Examiner* — Maged M Almawri
(74) *Attorney, Agent, or Firm* — SMART & BIGGAR LP; Stephen Beney

(57) ABSTRACT

Embodiments herein relate to a motor housing for ingress protection and a method of assembly thereof. In accordance with at least one aspect, there is provided a motor housing assembly for retaining an electric motor, comprising: a housing body portion extending along a housing axis between a first end and a second end; an end flange member coupled to the first end of the housing body, the end flange further comprising an exterior surface and an interior surface and a shaft-receiving opening extending between the exterior and interior surfaces for receiving a shaft of the electric motor, wherein the exterior surface comprising a groove surrounding the shaft-receiving opening; a sealing assembly disposed around the shaft-receiving opening of the end flange, the sealing assembly comprising: a flinger seal extending between a first and a second end, wherein the second end is receivable inside of the groove.

5 Claims, 46 Drawing Sheets

(56) References Cited

U.S. PATENT DOCUMENTS

| | | | | |
|---|---|---|---|---|
| 3,832,021 A * | 8/1974 | Jennings | B21B 31/078 | |
| | | | 277/420 | |
| 4,380,416 A * | 4/1983 | Menager | F04D 29/126 | |
| | | | 415/174.3 | |
| 4,832,511 A * | 5/1989 | Nisley | F16C 33/7806 | |
| | | | 384/480 | |
| 5,028,054 A * | 7/1991 | Peach | F16J 15/3264 | |
| | | | 384/480 | |
| 5,996,542 A * | 12/1999 | Bathurst | F16J 15/4476 | |
| | | | 277/351 | |
| 6,250,639 B1 * | 6/2001 | Hayes | F16C 13/02 | |
| | | | 277/565 | |
| 6,376,949 B1 * | 4/2002 | Hayslett | H02K 5/10 | |
| | | | 277/408 | |
| 6,471,215 B1 * | 10/2002 | Drago | F16J 15/166 | |
| | | | 277/420 | |
| 6,726,212 B2 * | 4/2004 | Oldenburg | F16J 15/324 | |
| | | | 277/560 | |
| 6,746,018 B2 * | 6/2004 | Lewis | F16J 15/3264 | |
| | | | 277/351 | |
| 8,328,202 B2 * | 12/2012 | Foster | F16J 15/3236 | |
| | | | 277/572 | |
| 8,439,363 B2 * | 5/2013 | Greca | F16J 15/3456 | |
| | | | 277/572 | |
| 9,574,610 B2 * | 2/2017 | Kice | F16C 35/045 | |
| 9,651,155 B2 * | 5/2017 | Angiulli | F16J 15/3232 | |
| 9,837,870 B2 | 12/2017 | Greve | | |
| 10,125,872 B2 * | 11/2018 | Binder | F16J 15/322 | |
| 10,569,962 B2 * | 2/2020 | Grimm | F16C 33/7896 | |
| 11,231,110 B2 * | 1/2022 | Specht | F16J 15/3404 | |
| 11,746,906 B1 * | 9/2023 | Balta | F16J 15/3204 | |
| | | | 277/309 | |
| 2003/0155718 A1 * | 8/2003 | Lewis | F16J 15/3264 | |
| | | | 277/549 | |
| 2013/0300230 A1 * | 11/2013 | Nakazawa | H02K 9/04 | |
| | | | 310/63 | |
| 2016/0003361 A1 * | 1/2016 | Takahashi | F16J 15/3448 | |
| | | | 277/377 | |
| 2024/0141996 A1 * | 5/2024 | Balta | F16C 33/7896 | |

FOREIGN PATENT DOCUMENTS

| | | |
|---|---|---|
| CN | 110985676 B | 8/2021 |
| JP | 5686991 B2 | 3/2015 |
| WO | 2021032762 A1 | 2/2021 |

* cited by examiner

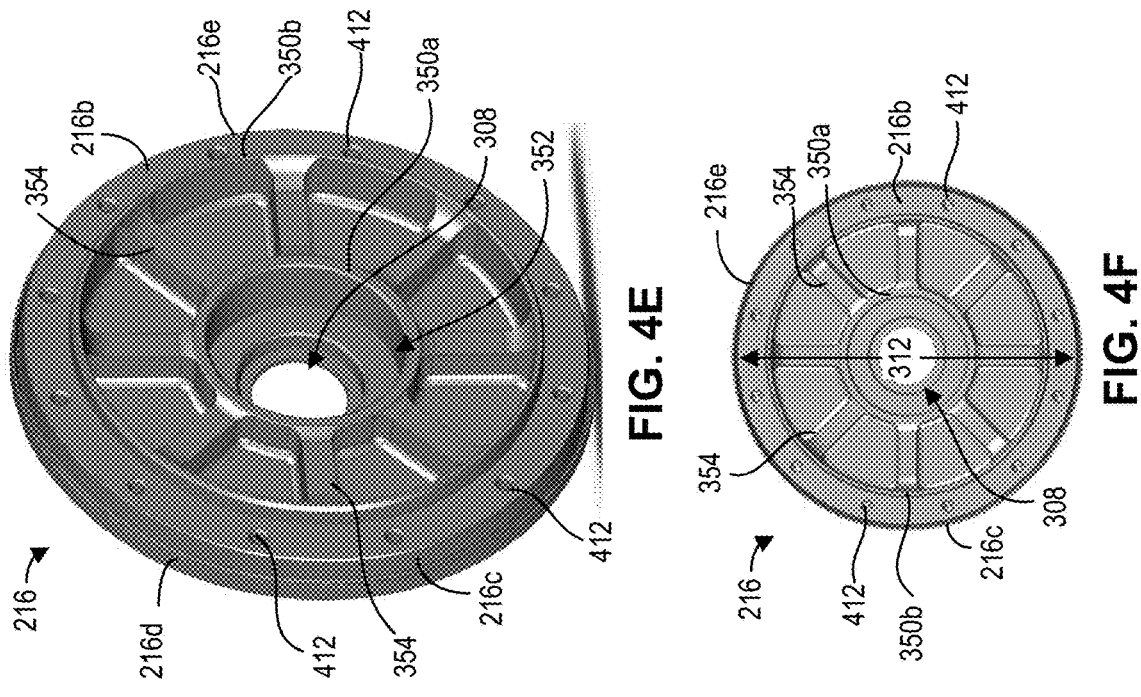
FIG. 4E
FIG. 4F
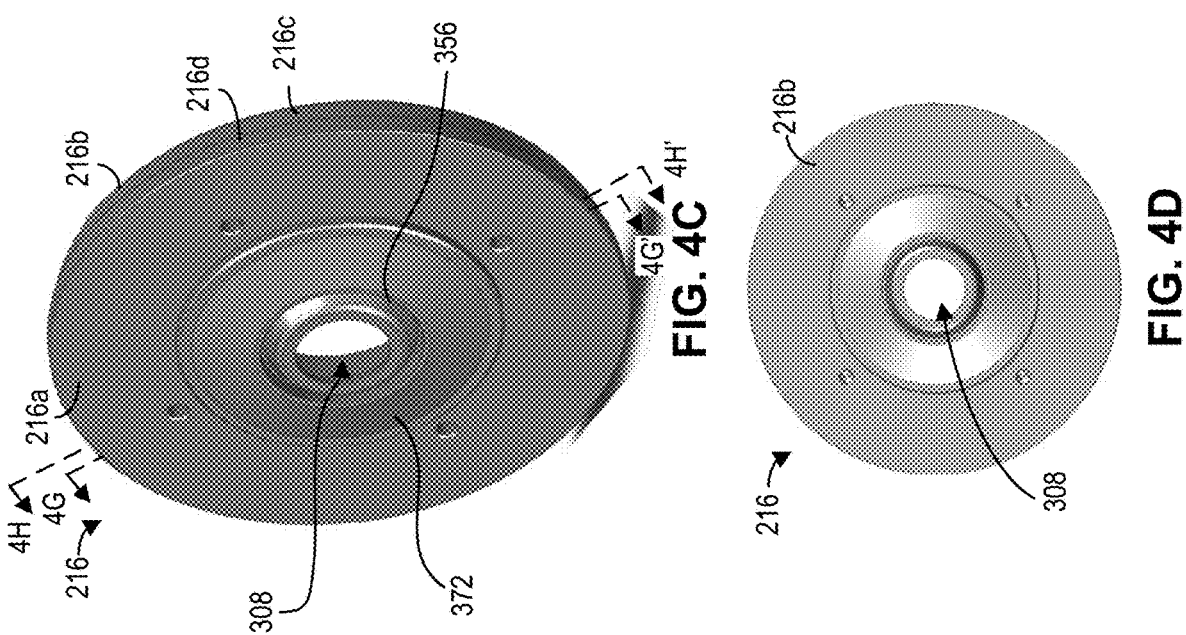
FIG. 4C
FIG. 4D

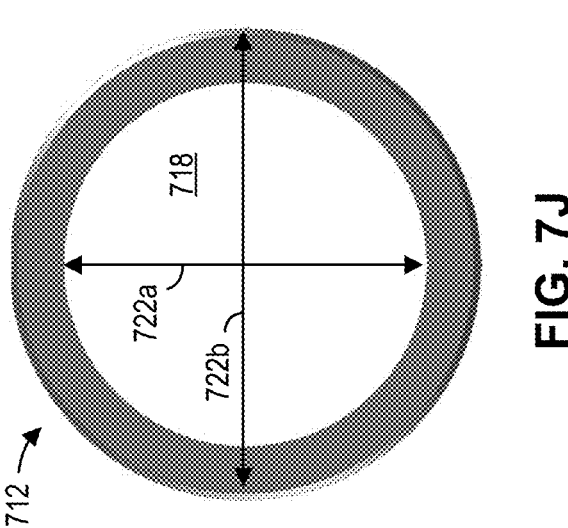
FIG. 7J
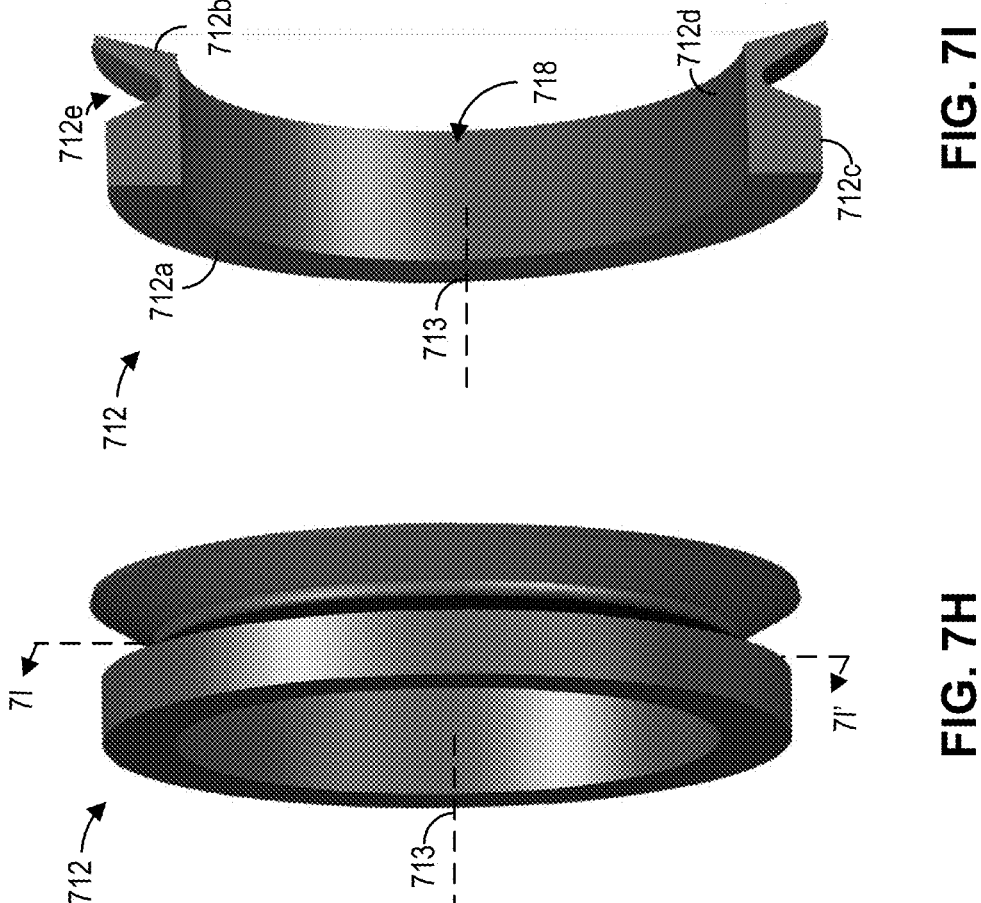
FIG. 7I
FIG. 7H

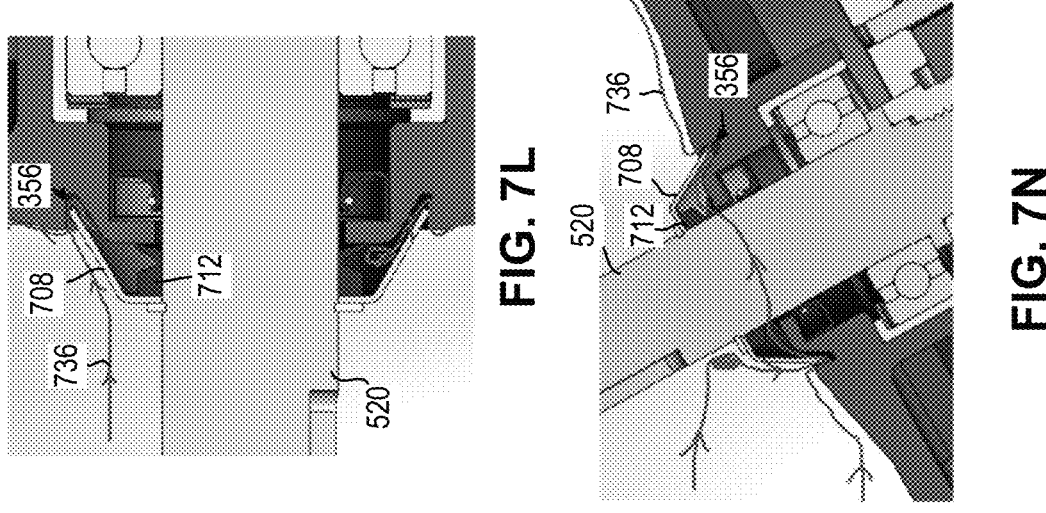
FIG. 7L
FIG. 7N
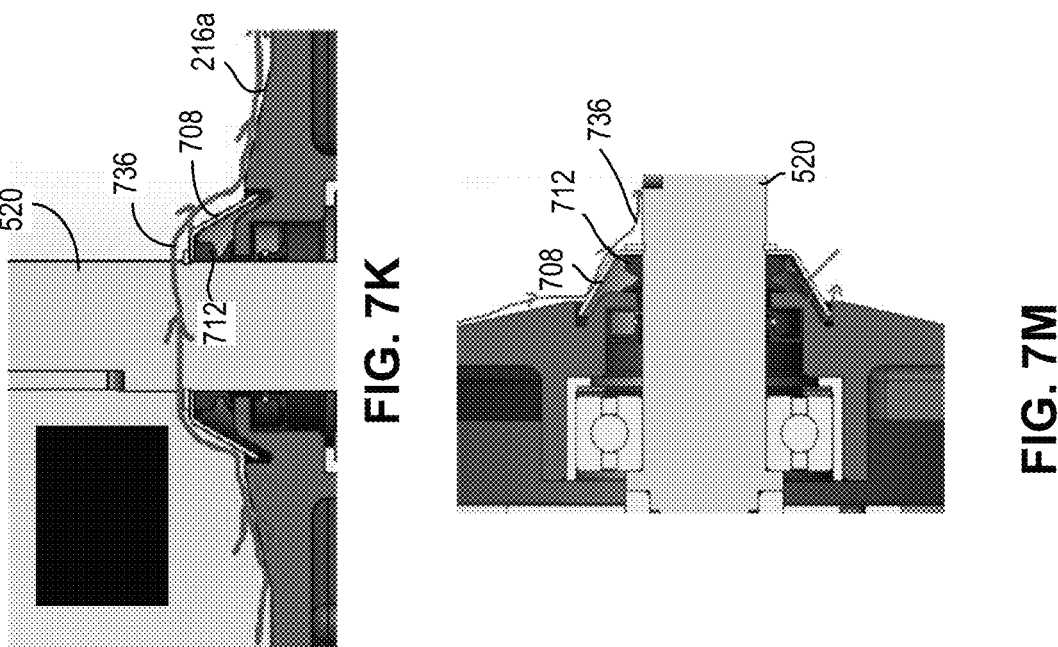
FIG. 7K
FIG. 7M

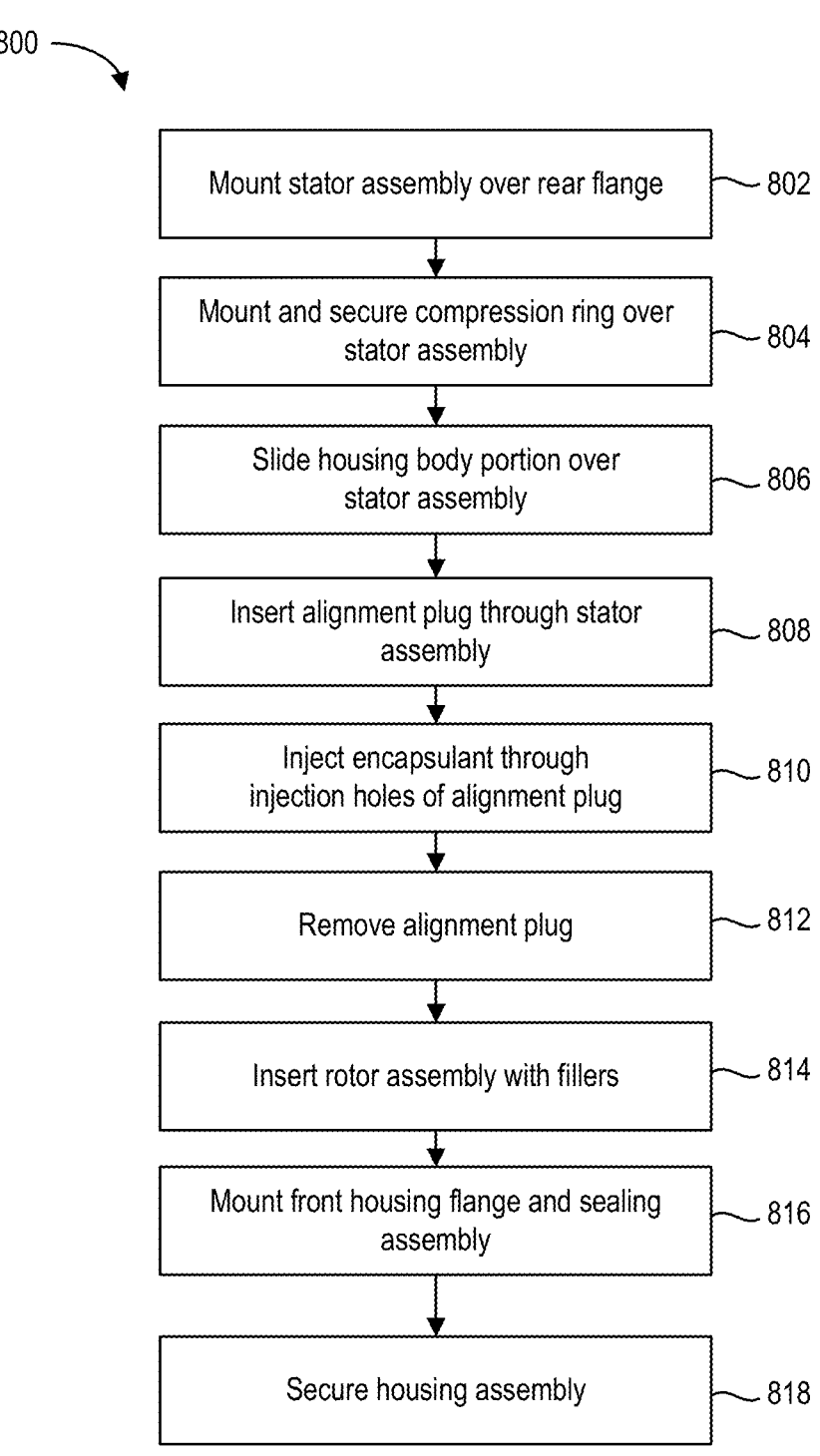

800

Mount stator assembly over rear flange — 802

Mount and secure compression ring over stator assembly — 804

Slide housing body portion over stator assembly — 806

Insert alignment plug through stator assembly — 808

Inject encapsulant through injection holes of alignment plug — 810

Remove alignment plug — 812

Insert rotor assembly with fillers — 814

Mount front housing flange and sealing assembly — 816

Secure housing assembly — 818

FIG. 8

MOTOR HOUSING DESIGN FOR ROTOR-AXIAL-DISPLACEMENT-INDEPENDENT AND MOUNTING-ORIENTATION-INDEPENDENT INGRESS PROTECTION

CROSS REFERENCE TO RELATED APPLICATION

This application claims the benefit of U.S. Application No. 63/350,664 filed Jun. 9, 2022, the entire contents of which is incorporated herein by reference.

FIELD

The described embodiments relate to electric motor housings, and in particular, to a motor housing for ingress protection and a method of assembly thereof.

INTRODUCTION

The following is not an admission that anything discussed below is part of the prior art or part of the common general knowledge of a person skilled in the art.

In at least some example applications, electric motors can be deployed in harsh conditions involving, for example, exposure to high pressure fluids, high variability temperatures and/or high humidity. For instance, washdown motors—in the food processing industry—are typically operated continuously in extreme temperature ranges characterized by high humidity. Further, washdown motors may also be subject to high pressure blasts of caustic cleaning solution, applied multiple times a day, to ensure the motor housing is free from contaminants which may otherwise contaminate the processed food.

To this end, there has been a focus on designing motor housings that protect against these harsh condition factors. This includes designing housings that prevent ingress of water and other fluids (e.g., oil and cutting fluids, as well as high pressure fluid blasts), as well as build-up of humidity and moisture inside the housing. Housings having poor ingress protection can result in high failure rates and low service life for electric motors. This may be costly, not only due to the need for continuous reparations to the electric motor, but also the downtime to production resulting each time a motor is taken offline for maintenance.

Here, it has been appreciated that existing motor housing designs suffer from a number of significant drawbacks. For example, many motor housings provide poor ingress protection. Alternatively, motor housings providing acceptable ingress protection do so at the expense of preventing ease of access to the motor assembly inside of the housing, e.g., for maintenance. Still further, many motor housings may have complex and costly design configurations.

SUMMARY OF THE VARIOUS EMBODIMENTS

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with at least one broad aspect, there is provided a motor housing assembly for retaining an electric motor, comprising: a housing body portion extending along a housing axis between a first end and a second end; an end flange member coupled to the first end of the housing body, the end flange further comprising an exterior surface and an interior surface and a shaft-receiving opening extending between the exterior and interior surfaces for receiving a shaft of the electric motor, wherein the exterior surface comprising a groove surrounding the shaft-receiving opening; a sealing assembly disposed around the shaft-receiving opening of the end flange, the sealing assembly comprising: a flinger seal extending between a first and a second end, wherein the second end is receivable inside of the groove; and a contact seal disposed under the flinger seal and over the front surface of the end flange.

In at least one example, the flinger seal is tapered outwardly between the first and second end.

In at least one example, the flinger seal is rotatable with the motor shaft.

In at least one example, the second end of the flinger seal is axially translatable inside the groove.

In at least one example, the sealing assembly further comprises a radial shaft seal disposed inside an interior of the housing body portion and in contact with the interior surface of the end flange member.

In another broad aspect, there is provided a method of assembling a motor housing comprising: mounting a stator assembly over a rear flange of a housing assembly, wherein the stator assembly extends between a first stator end and a second stator end and the stator assembly engages the rear flange at the second stator end; mounting a compression ring over the first stator end; securing the compression ring to the rear flange; sliding a body portion, of the housing assembly over the stator assembly and in engagement with the rear flange; inserting an alignment plug through an opening of the stator assembly; injecting encapsulant through one or more injection holes of the alignment plug; removing the alignment plug from within the stator assembly; inserting a rotor assembly, of an electric motor, inside the stator assembly; mounting a front flange, of the housing assembly, over the body portion; and securing the housing assembly.

In at least one example, the compression ring is secured using one or more compression ring fasteners which engage the end flange.

In at least one example, prior to insert the alignment plug, the method further comprises coating the alignment plug with release agent.

In at least one example, the rotor assembly further comprises one or more rotor assembly fillers for filling voids inside the housing body.

In at least one example, the housing assembly is secured using one or more housing fasteners which secure the rear flange, body portion and front flange together.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 4C is a front perspective view of a front end flange member, of the housing assembly of FIG. 3A;

FIG. 4D is a front elevation view of the front end flange member;

FIG. 4E is a rear perspective view of the front end flange member;

FIG. 4F is a rear elevation view of the front end flange member;

FIG. 7H is a perspective view of a contact seal, in accordance with some example embodiments;

FIG. 7I is a perspective cross-sectional view of the contact seal, taken along the section line 7I-7I' of FIG. 7H;

FIG. 7J is a top plan view of the contact seal;

FIG. 7K is an enlarged view of a portion of the housing assembly and electric motor in FIG. 7A, taken along the section line 7B-7B' of FIG. 7A, and in a first orientation;

FIG. 7L is an enlarged view of a portion of the housing assembly and electric motor in FIG. 7A, taken along the section line 7B-7B' of FIG. 7A, and in a second orientation;

FIG. 7M is an enlarged view of a portion of the housing assembly and electric motor in FIG. 7A, taken along the section line 7B-7B' of FIG. 7A, and in a third orientation;

FIG. 7N is an enlarged view of a portion of the housing assembly and electric motor in FIG. 7A, taken along the section line 7B-7B' of FIG. 7A, and in a fourth orientation;

FIG. 8 is a process flow for an example embodiment of a method for assembling an electric motor inside a housing assembly, in accordance with some embodiments;

Figure 1:
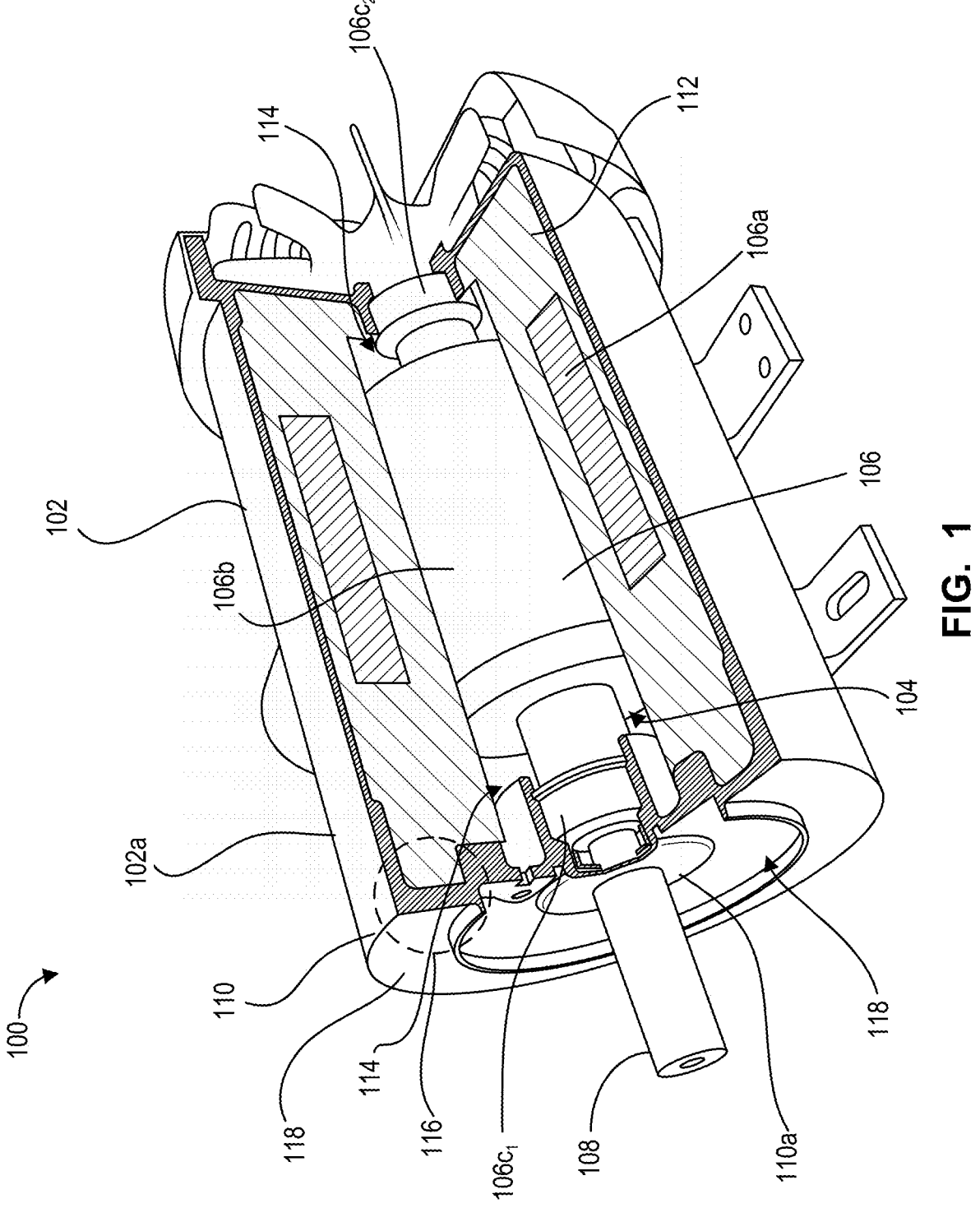
FIG. 1 is a schematic illustration of an example electric motor housing assembly, in accordance with a conventional design.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (e.g., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a group of elements are said to 'collectively' perform an act where that act is performed by any one of the elements in the group, or performed cooperatively by two or more (or all) elements in the group.

As used herein and in the claims, a first element is said to be "received" in a second element where at least a portion of the first element is received in the second element unless specifically stated otherwise.

Some elements herein may be identified by a part number, which is composed of a base number followed by an alphabetical or subscript-numerical suffix (e.g. 112*a*, or 112$_1$). Multiple elements herein may be identified by part numbers that share a base number in common and that differ by their suffixes (e.g. 112$_1$, 112$_2$, and 112$_3$). All elements with a common base number may be referred to collectively or generically using the base number without a suffix (e.g. 112).

As stated in the background, electric motors can suffer from high failure rates and low service life when encapsulated in motor housings with poor ingress protection.

In general, motor housings (as well as, more generally, most types of enclosures) are classified according to different Ingress Protection ("IP") ratings, or codes. These IP ratings are assigned based on the level of ingress protection offered by the housing enclosure, whereby a higher IP rating corresponds to a higher degree of protection against ingress of fluids, detritus, etc.

By way of example, enclosures assigned an IP55 rating are rated to protect against ingress of dirt, dust, oil and other non-corrosive materials, as well as protection from nozzle-projected water, e.g., in any direction. Higher rated IP68+ enclosures are additionally rated to withstand submerging of the enclosure under water up to particular depths, and for certain durations of time. While IP68+ enclosures are preferable, they are often available only in a limited portion of the market and at a prohibitive and significant price premium. For this reason, many washdown motors used in the food processing industry are at least IP55 rated.

Reference is now briefly made to FIG. 1, which is a schematic illustration of an example conventional electric motor housing assembly 100. The motor housing assembly 100 may be considered to be an example of a conventional design for a high IP rated motor enclosure (e.g., IP68+).

As shown, motor assembly 100 includes a housing 102 comprising a partially hollow interior volume 104. An electric motor 106 is disposed within the interior volume 104, and is protected by the housing 102 from external elements (e.g., fluids and other detritus).

As exemplified, the electric motor 106 may have a known design comprising a stator assembly 106*a* surrounding a rotor assembly 106*b*, whereby the rotor assembly 106*b* drives a shaft 108. Shaft 108 protrudes from one end of the housing 102, and may mechanically couple to an external piece of equipment. Electric motor 106 also includes bearing assemblies 10601 and 106*c*2, positioned at each end of the rotor 106*b* and coupled to the shaft 108.

Housing interior 104 is also filled with an encapsulant 112 (e.g., a hardened epoxy resin). The encapsulant 112 functions to eliminate air gaps and voids inside of the housing 102. In particular, air gaps or voids inside the housing interior 104 are undesirable as they may generate a vacuum-like effect. This vacuum effect may draw-in external contaminants into the housing, which may damage the motor 106. The vacuum effect results from temperature changes inside the housing 102 during operation of the motor 106, which may vary the air volume inside the housing 102, and in turn generate a pressure differential between the air outside and inside the housing.

Air gaps or voids can also cause a condensation problem inside housing 102. This may also result from the vacuum effect, which can suction external moisturized air, e.g., when the motor is operated in humid environments. Condensation of moisture may also damage the electric motor over time. Accordingly, the encapsulant 112 may encapsulant the stator windings to prevent moisture (or water) from entering the stator windings.

In the design shown in FIG. 1, the assembly of the motor 106 inside the housing 102 may involve at least the following steps: (i) initially, the stator and rotor 106 are mounted through an open end of the housing body; (ii) an end cap 110 is coupled to the housing body to seal the open end; and (iii) encapsulant 112 is injected through one or more openings of the housing 102 to seal air gaps and voids therein.

Here, a number of drawbacks have been appreciated with respect to the housing design exemplified in FIG. 1, as well as more broadly, other conventional motor housing designs.

First, existing designs do not fully eliminate air gap regions and voids inside the housing. For example, it is observed that inside housing 102, the encapsulant 112 does not entirely occupy the air voids 114 on either end of the rotor assembly 106b (e.g., as between the rotor 106b and the bearing assemblies 106c). These air gaps, as explained previously, generate a vacuum-like effect which can draw-in external contaminants and cause a build-up of moisture inside the housing 102, which may in turn damage the motor 106.

In some cases, breather filters are used for mitigating the problem of voids and air gaps inside the housing. A breather filter facilitates equalization of the pressure inside and outside the housing 102. In turn, the breather filter prevents the vacuum effect from drawing external contaminates and moisture into housing 102. While there are water resistant breather plugs, breather plugs and filters are generally considered to be ingress failure points for housing designs. It is therefore believed that a well encapsulated design should eliminate the use of a breather plug, and in turn, eliminate potential ingress failure points. Eliminating breather plugs can also reduce manufacturing costs.

Second, a further drawback of conventional designs is that the encapsulant 112 often prevents opening of the end cap 110. In particular, as the encapsulant 112 is injected after mounting of the end cover 110, a large area of the end cover 110 is attached to the encapsulant 112 (e.g., regions 116 in FIG. 1). In turn, the end cap 110 is not removable, thereby preventing access to the interior electric motor assembly, e.g., for service and maintenance.

In some cases, this problem is rectified by using a double cover design. For example, as shown in FIG. 1, the end cover 110 may have a smaller cover 110a cut into the larger cover surface. The small cover area 110a is not attached to the encapsulant 112, and is openable to access at least the rotor assembly 106b and bearings 106c. A double cover design, however, adds additional ingress failure points and must therefore be properly sealed. Additionally, the double cover design also increases manufacturing costs and design complexity.

Third, still a further drawback of conventional housing designs is that they are often only rated for ingress protection (e.g., IP68+ protection) when mounted in specific orientations. Many housing designs often have poor ingress protection when oriented in an upright position, rather than along their lateral sides, e.g., as illustrated in FIG. 1. This is because, in the upright position, depressed regions 118 at the end cap 110 may become pooling regions for fluids and detritus, which can degrade the seal around the motor shaft 108 opening over time.

Conventional motor housing enclosures also suffer from a number of more general drawbacks, unrelated to ingress protection. For example, many motor housings 102 are interference fit and require tight manufacturing tolerances. That is, the housing sidewall 102a often needs to be slightly smaller in circumferential size to wrap around the stator/rotor assembly. This is such as to allow the housing sidewall cover to: (a) slide over the stator 106a and in fitting mating engagement with the end flange cover 110, and (b) positionally secure the rotor/stator in alignment. More particularly, the housing is often used to retain and align the electric motor components (e.g., stator, rotor and bearings), such as to prevent displacement of these components while the electric motor is vibrating inside of the housing 102. Accordingly, the tight manufacturing tolerances assist in tightly positionally securing the rotor/stator in alignment and against vibrational displacement.

However, achieving an exact interference fit dimension for the housing enclosure is often difficult and complex, as well as being prohibitively expensive and prone to manufacturing error. Additionally, the dimensions often change under high temperatures when welding housing cover pieces together.

Designs for conventional housings 102 may also often require large thickness to further maintain alignment between the motor components. Large thicknesses, however, also increase manufacturing costs, as well as the overall weight of the housing 102. In some cases, it may possible to use thin-wall steel housing 102a that are aligned with the endcaps 110 via bolt clamps. However, a challenge with thin-walled housings is that they are difficult to seal, and it is difficult to use an interference fit to retain the stator, as the thin material is flimsy and is not accurately machinable.

In view of the foregoing, embodiments herein provide for a motor housing enclosure assembly that can mitigate at least some of the aforementioned drawbacks with conventional motor housing enclosures. In accordance with embodiments herein, the disclosed motor housing assembly may provide for higher and more robust ingress protection in various mounting orientations. As also provided herein, the disclosed motor housing may also be designed for ease of maintenance, e.g., bearing and seal maintenance. Additionally, the disclosed motor housing enclosure may additionally provide for simplified and less-expensive manufacturing, which minimizes manufacturing tolerance requirements and reduces overall weight.

i. General Overview of Motor Housing Assembly

The following is a discussion of an example embodiment for a motor housing assembly which can provide an enclosure for an electric motor. The disclosed motor housing assembly may be used by itself or with one or more other aspects of this disclosure.

Reference is now made to FIGS. 2A-2F, which illustrate various views of an example embodiment of a motor housing assembly 200 (otherwise referred to herein as a motor enclosure assembly), in accordance with the teachings herein. Housing assembly 200 may be used to enclose, or house, an electric motor.

As exemplified, housing assembly 200 includes a front housing end 204a (or first end 204a) and a rear housing end 204b (or second end 202b). Rear end 204b is axially opposed to the front end 204a along motor housing axis 208, which intersects each end 204a, 204b. It will be understood that positional references provided herein (e.g., front, top, rear, back, upper and lower) are only provided for ease of description, and that features described herein may be not be limited to a particular position and/or orientation.

As shown, a length dimension 206 is defined, along axis 208, between the front and rear ends 204a, 204b. An electric motor shaft 520, associated with an enclosed electric motor, may extend axially from the front housing end 204a.

Figure 2A:
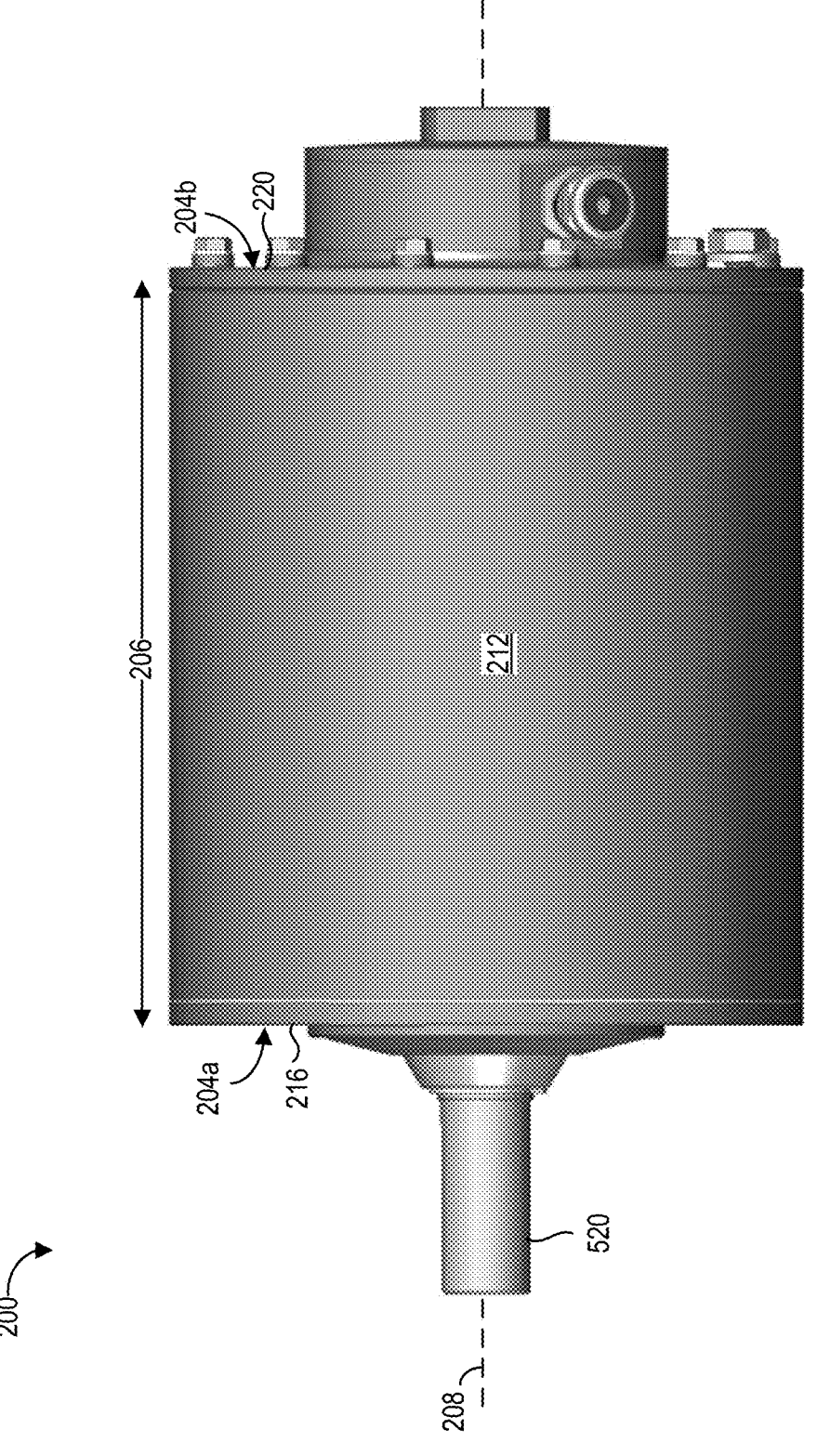
FIG. 2A is a side elevation view of an example embodiment of an electric motor and housing assembly, in accordance with teachings provided herein.
Figures 2B, 2C:
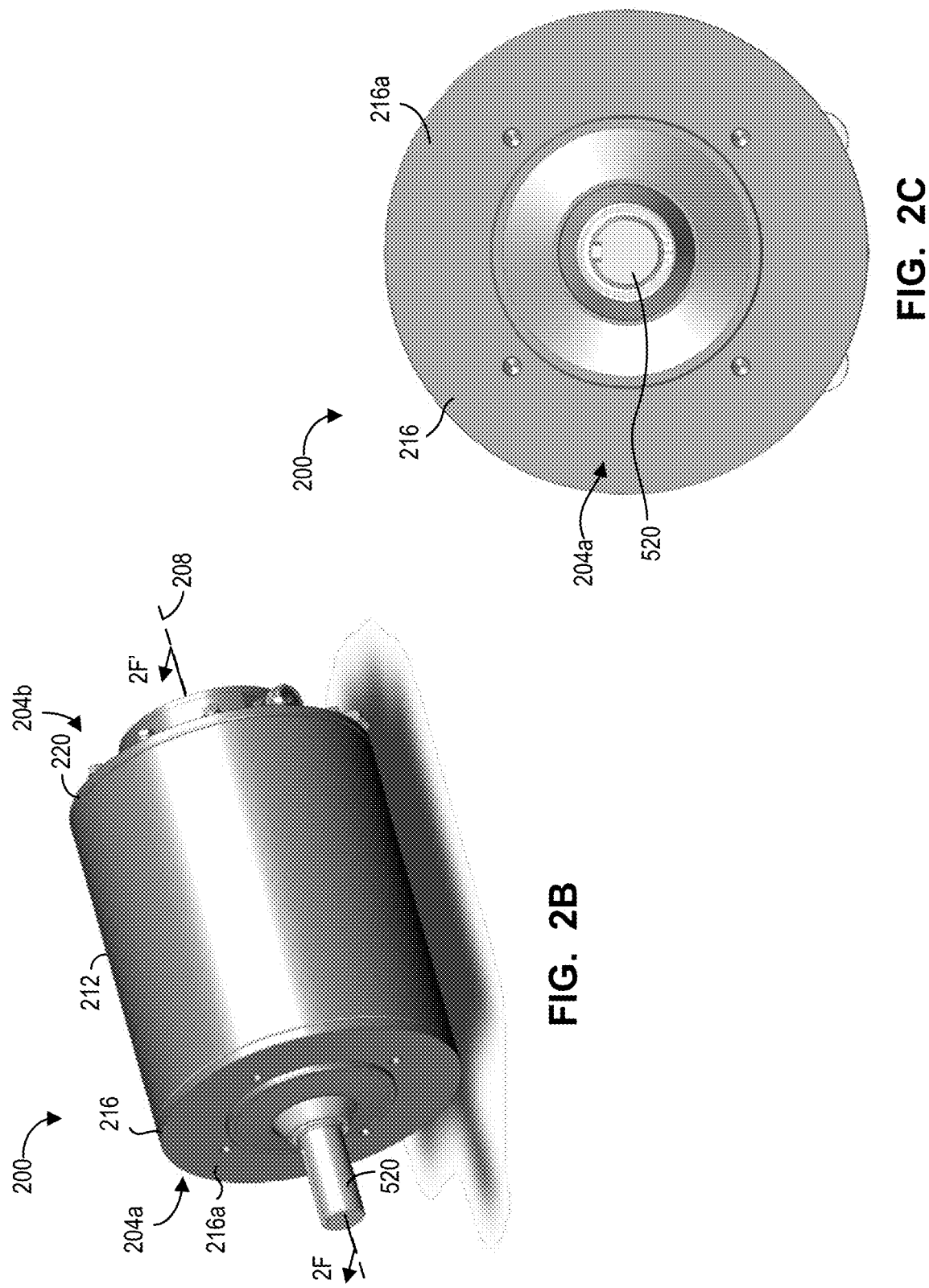
FIG. 2B is a front perspective view of the electric motor and housing assembly of FIG. 2A.
FIG. 2C is a front elevation view of the electric motor and housing assembly of FIG. 2A.
Figures 2D, 2E:
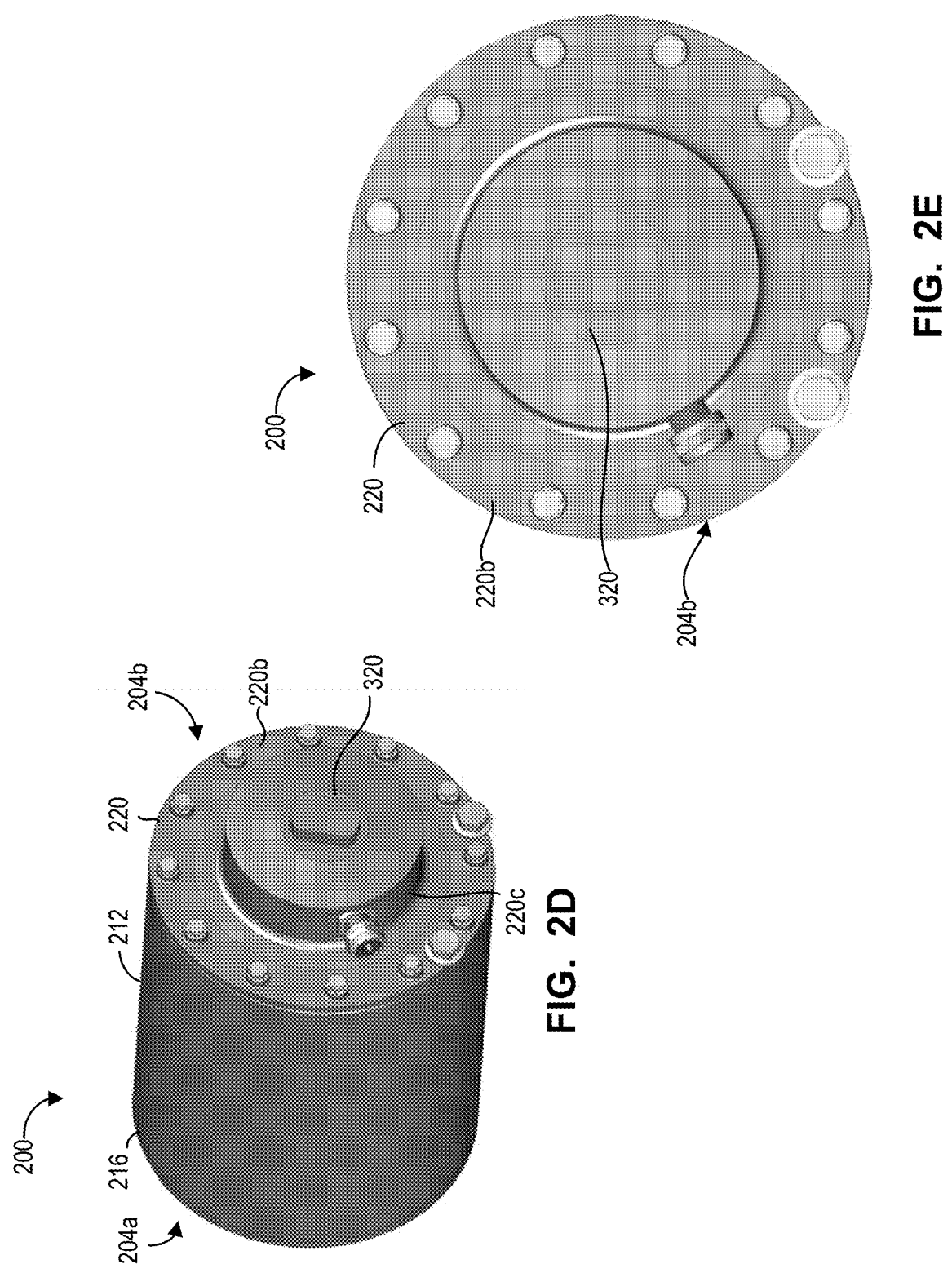
FIG. 2D is a rear perspective view of the electric motor and housing assembly of FIG. 2A.
FIG. 2E is a rear elevation view of the electric motor and housing assembly of FIG. 2A.
Figure 2F:
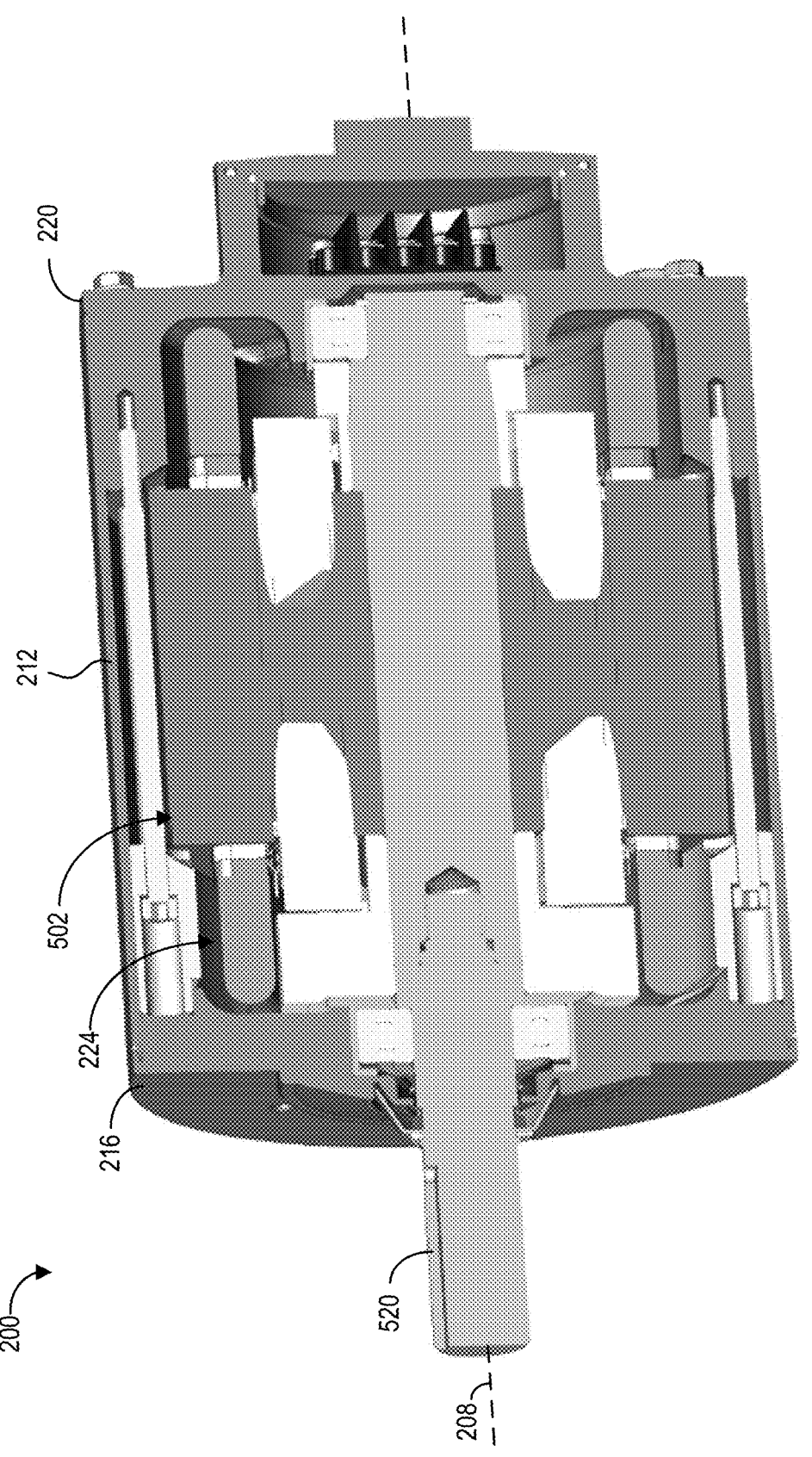
FIG. 2F is a cross-sectional perspective view of the electric motor and housing assembly of FIG. 2A, taken along the section line 2F-2F' of FIG. 2B.
Figure 3A:
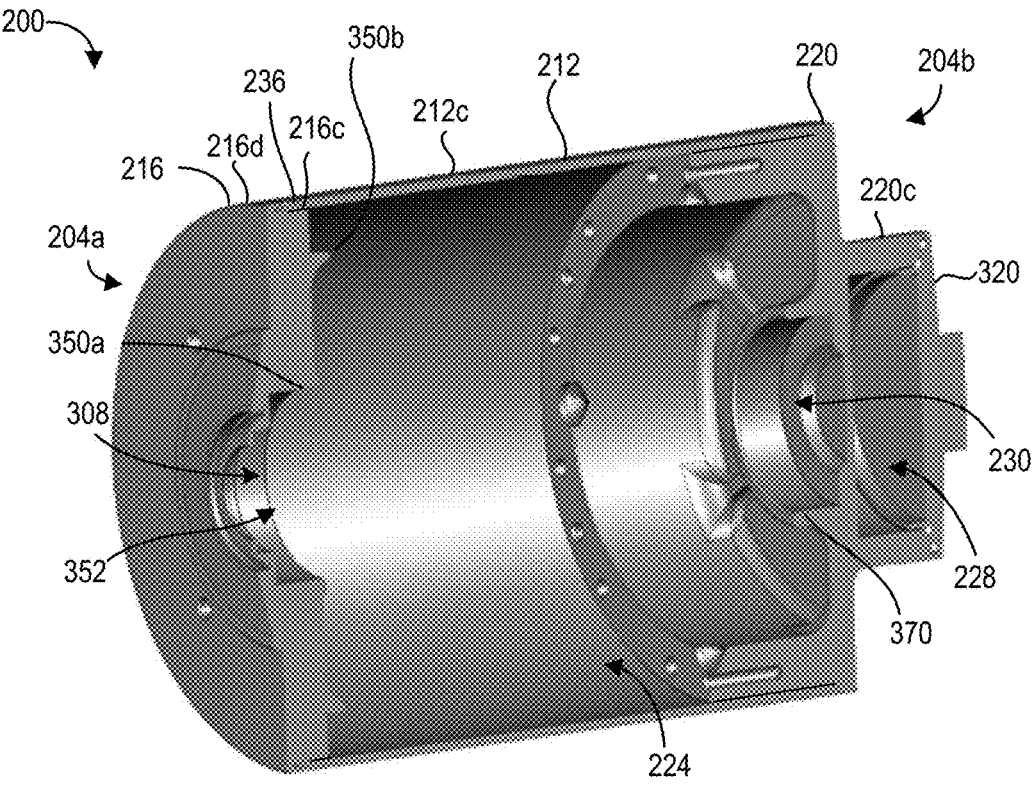
FIG. 3A is a cross-sectional perspective view of an empty housing assembly, taken along the section line 2F-2F' of FIG. 2B.
Figure 3B:
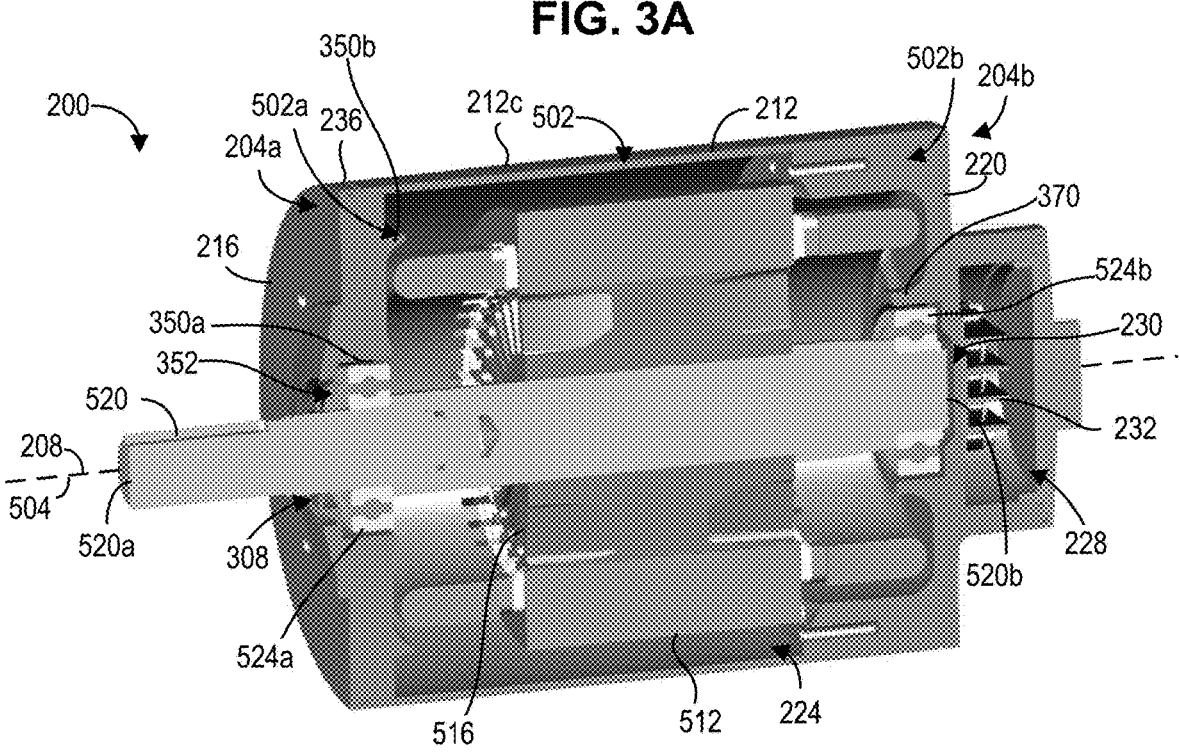
FIG. 3B is a cross-sectional perspective view of an electric motor and housing assembly, taken along the section line 2F-2F' of FIG. 2B.

Referring to FIGS. 2F and 3A-3B, in an assembled state, motor housing 200 may define an at least a partially hollow interior 224. As explained, the hollow interior 224 can accommodate an electric motor assembly 502 (e.g., a rotor and stator motor assembly), as well as various other alignment and filling components.

For sake of simplified illustration, FIG. 3A illustrates an empty motor housing 200 while FIG. 3B illustrates the housing assembly 200 retaining only an electric motor assembly 502, inside its hollow interior 224. FIG. 2F, however, illustrates the housing assembly 200 retaining the electric motor assembly 502, in combination with other features described herein (e.g., securing mechanisms, cavity fillers, etc).

Reference is now briefly made to FIGS. 5A-5E, which exemplify an embodiment of an electric motor assembly 502 which may be accommodated inside of the motor housing interior 224.

As shown, the electric motor assembly 502 extends along a motor assembly axis 504, between a first motor end 502a and second motor end 502b. The motor assembly 502 can comprise a rotor assembly 508, received within an interior of a stator assembly 512 (FIGS. 5C, 5D).

Figure 5A:
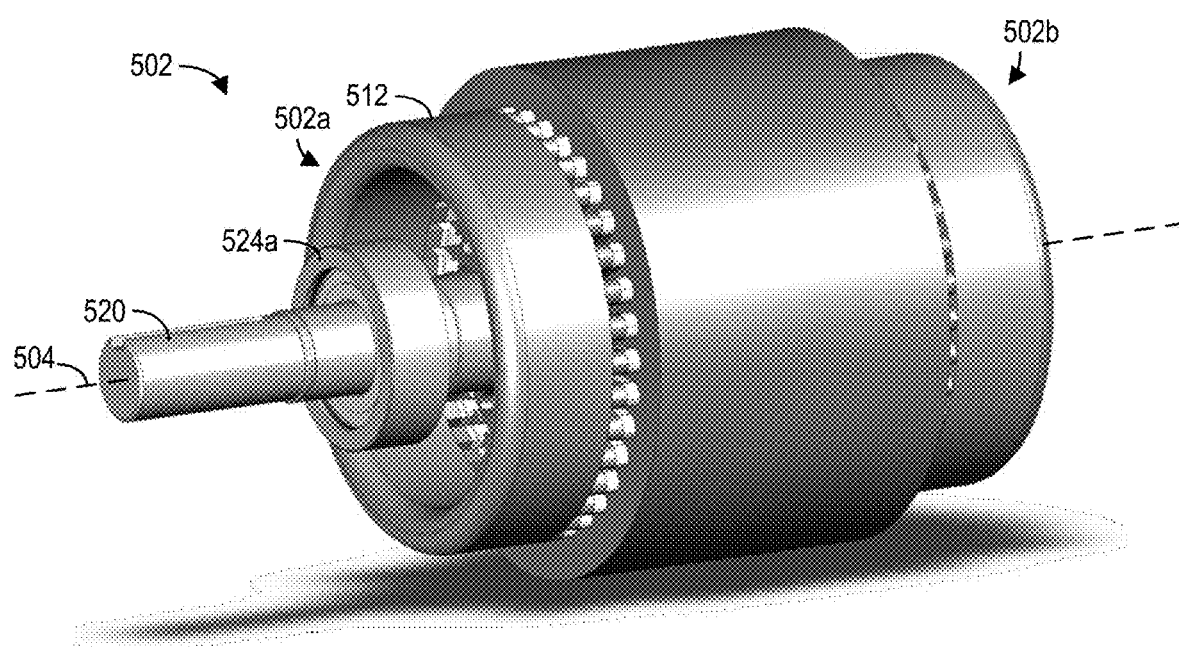
FIG. 5A is a front perspective view of an example motor assembly.
Figure 5B:
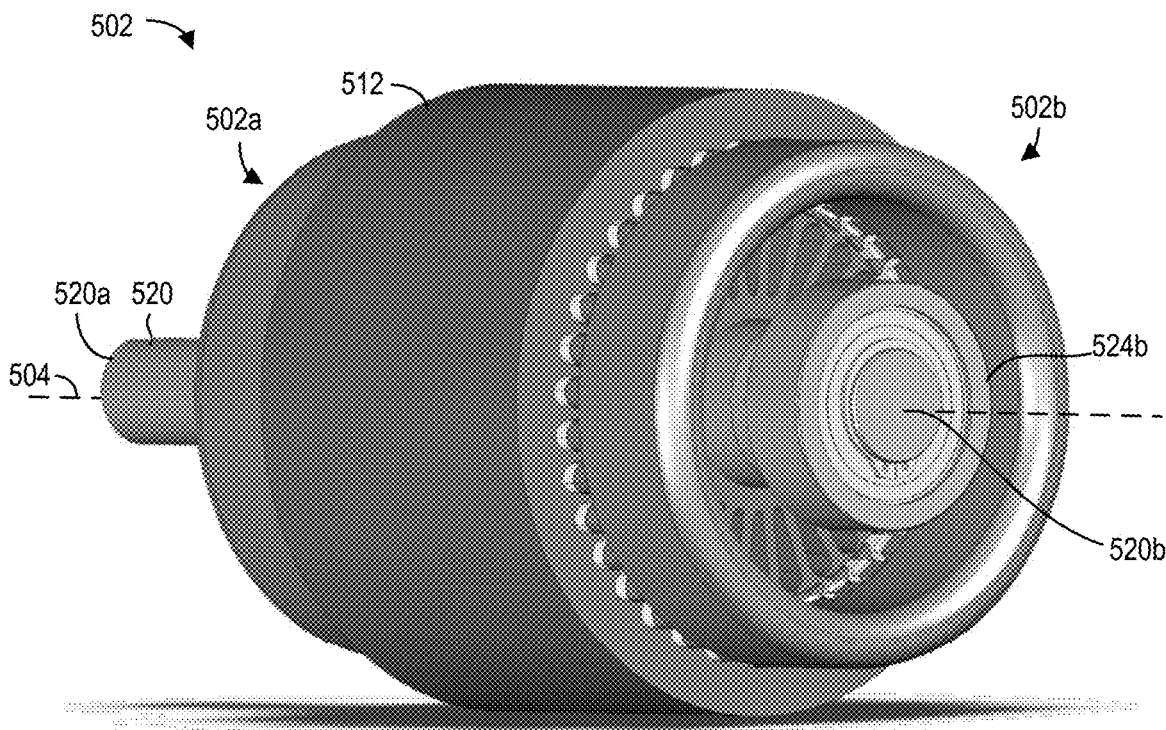
FIG. 5B is a rear perspective view of the example motor assembly.
Figures 5C, 5D:
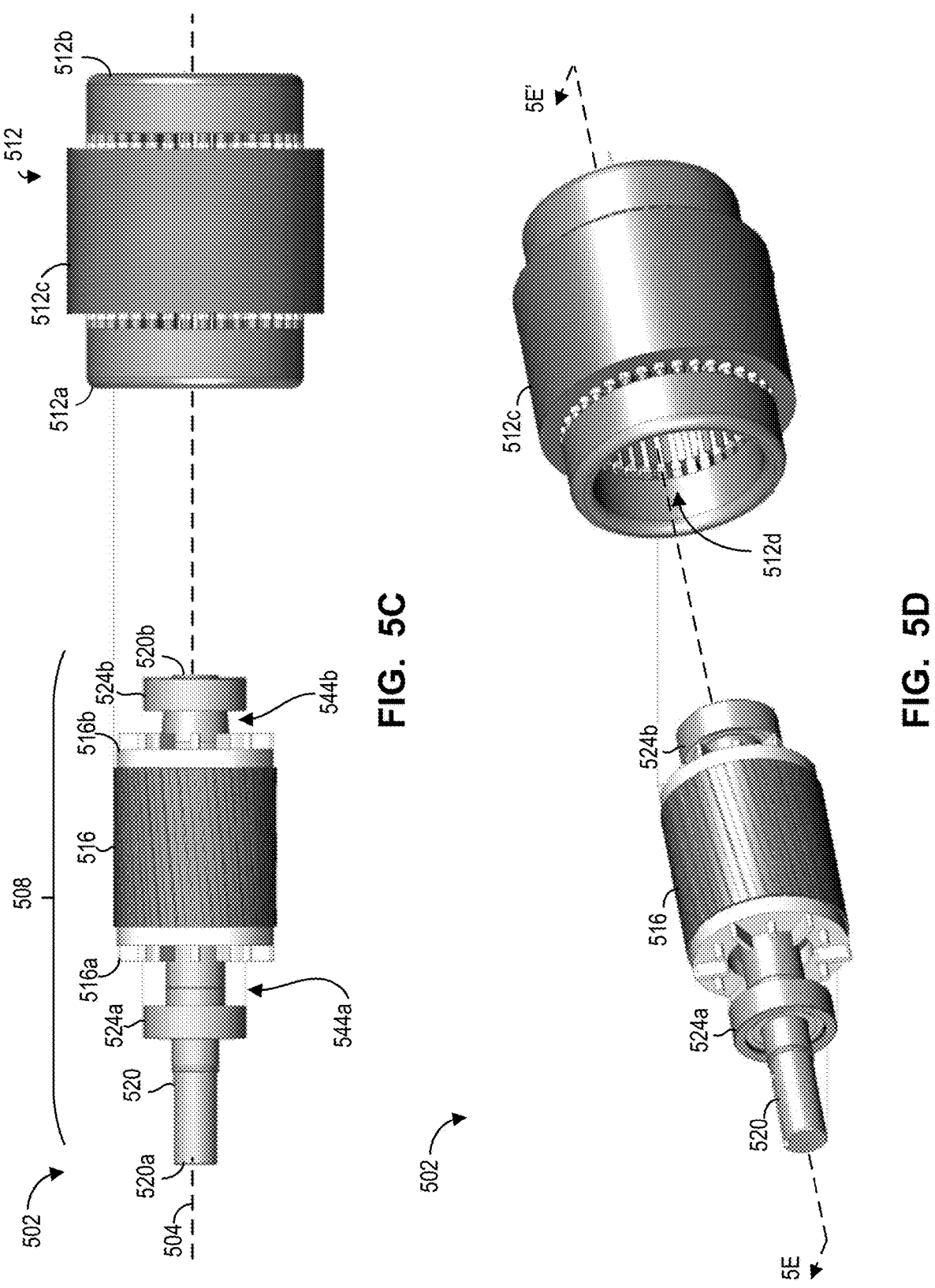
FIG. 5C is a partially exploded elevation view of the example motor assembly, showing the rotor and stator assemblies.
FIG. 5D is a perspective view of the partially exploded view of the example motor assembly.
Figure 5E:
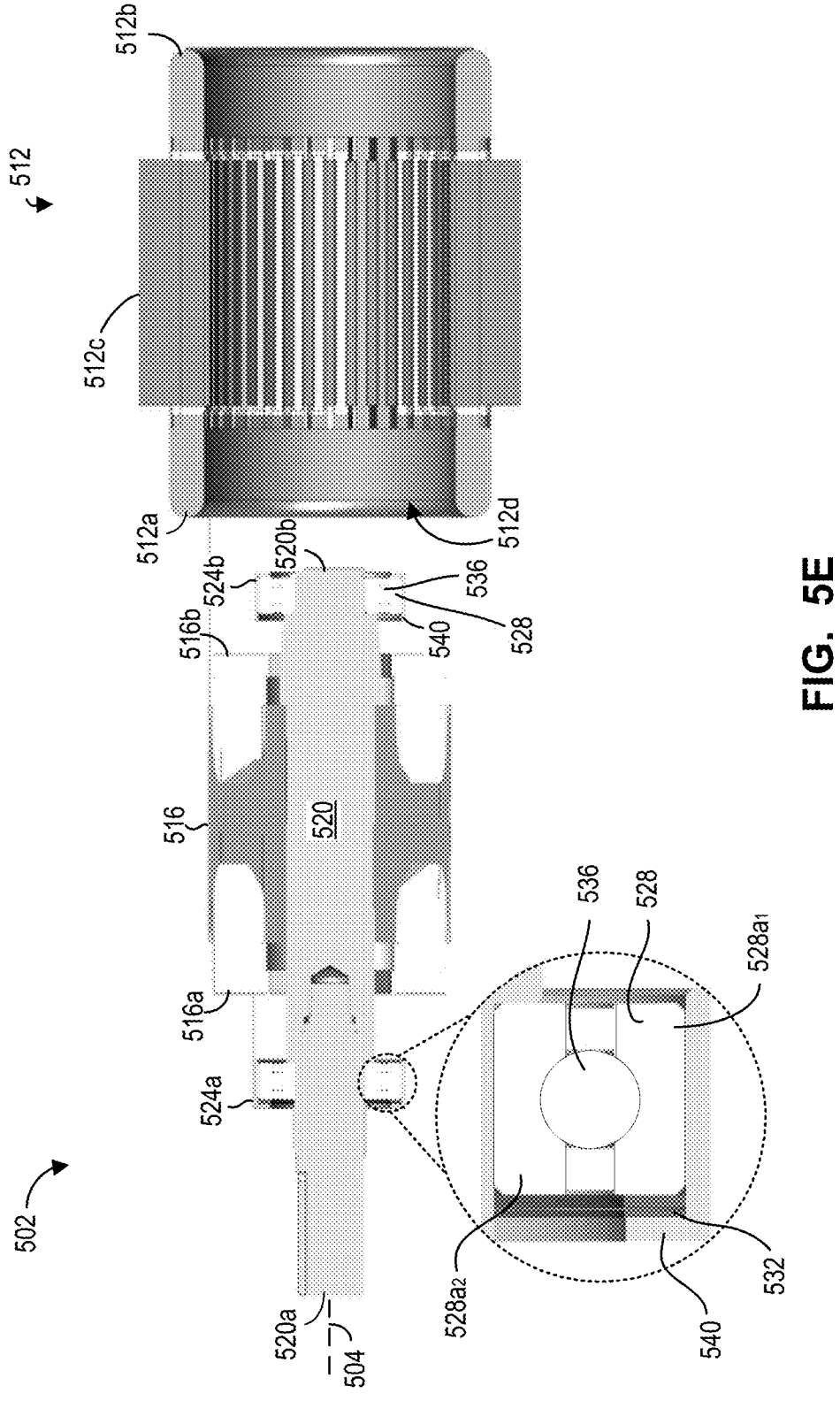
FIG. 5E is an elevation cross-sectional partially exploded view of the example motor assembly, taken along the section line 5E-5E' of FIG. 5D, as well as an enlarged view of a portion of a bearing assembly of the rotor assembly.

As exemplified in FIGS. 5C-5E, rotor assembly 508 includes the rotor core 516 (including a rotor cage). Rotor core 516 extends between a first rotor core end 516a and a second rotor core end 516b, along motor axis 504.

Rotor assembly 508 also includes shaft 520 and bearing assemblies 524. Shaft 520 extends through the rotor core 516 along axis 504 (FIG. 5E), and between a respective first and second shaft end 520a, 520b.

Bearing assemblies 524 are further rotatably connected around shaft 520, and include first and second bearing assemblies 524a, 524b. The first bearing assembly 524a and second bearing assembly 524b are connected proximal the first shaft end 520a and the second shaft end 520b, respectively. In the exemplified embodiment, each bearing assembly 524 includes a bearing casing 528 (FIG. 5E) comprising an outer casing ring $528a_1$ and inner casing ring $528a_2$ (also known as the outer and inner bearing races, respectively). The inner ring $528a_2$ is attached to the shaft 520, while the outer ring $528a_2$ is retained in a bearing end cap 540. One or more bearing balls 536 are retained between the rings $528a_1$, $528a_2$, and enable rotation of the inner ring $528a_2$ (and shaft 520) relative to the outer ring $528a_1$.

Importantly, the first bearing assembly 524a may include a pre-loaded axial spring 532. As is known in the art, the axial spring 532 is attached to the outer ring $528a_1$ (e.g., between the end cap 540 and the outer ring $528a_1$) and accommodates axial displacement of the inner ring $528a_2$ relative to the outer ring $528a_1$. For example, the axial displacement may result from axial vibration of the shaft 520 during motor operation. The pre-load spring 532 also serves an additional function in allowing for axial tolerance variation in the stack-up of all the components in the electric motor assembly 502. For example, if the ideal length between bearing inner races $528a_2$ of bearing assemblies 524a and 524b is a first length "x", but due to variations in manufacturing the length is now "x+y"—then the pre-loaded spring 532 assists in compensating for the difference "y". In other cases, the pre-loaded spring 532 also compensates for axial thermal expansion and contraction.

In some cases, the pre-loaded spring 532 is biased to the compressed state. In other cases, the preload spring is designed so that in a nominal state, the axial spring is substantially 50% compressed. In this state, the spring 532 can compensate for variations in both the compression and expansion directions. The spring 532 may be designed such that at its maximum extents, the spring 532 is unable to provide too much or too little pre-load on the bearing assemblies.

Referring now to the stator assembly 512, the stator assembly 512 may also extend between a first and second stator end 512a, 512b, along axis 504. The stator assembly 512 may include a stator stack 512c (e.g., comprising the stator windings which wrap around the teeth of the stator core). The stator assembly 512 may also include a hollow interior 512d (FIG. 5E) for receiving at least the rotor core 516, e.g., received along motor axis 504.

In at least one example embodiment, the motor assembly 512 is a radial flux motor, rather than an axial flux motor.

As exemplified in FIG. 3B, in the mounted position, the motor assembly 502 is received within the hollow volume 224 of housing 200. Preferably, in this mounted position, motor axis 504 is substantially aligned with the housing axis 208. As well, the motor's first and second ends 502a, 502b are directed towards the respective first and second housing ends 204a, 204b.

As exemplified, in the mounted state, the majority of the rotor assembly 508 is contained within the housing 200. In particular, each the rotor core 516 and bearings 524 are disposed within the housing 200. Shaft 502, however, extends out of the housing 200, to connect to external equipment. For example, the first shaft end 520a may extend from the first housing end 204a.

Housing assembly 200 may be formed from any suitable material, including various types of metals (e.g., aluminum). Further, as exemplified in FIGS. 3D-3H, housing assembly 200 may be formed of one or more connected sub-components. For instance, as exemplified in these figures, these sub-components may include: (i) a body portion 212; (ii) a front flange-end member 216 (also referred to herein as a first flange-end member); and (iii) a second flange-end member 220 (also referred to herein as a second flange-end member). In the coupled state (FIG. 3A), each of the first and second flange members 216, 220 may couple to either end of the housing body portion 212. In the uncoupled state (FIG. 3D), one or more of the flange members 216, 220 may be separated from the body portion 212.

The various subcomponents of the housing assembly 200 are now discussed in greater detail herein, beginning with the body portion 212.

Figure 3C:
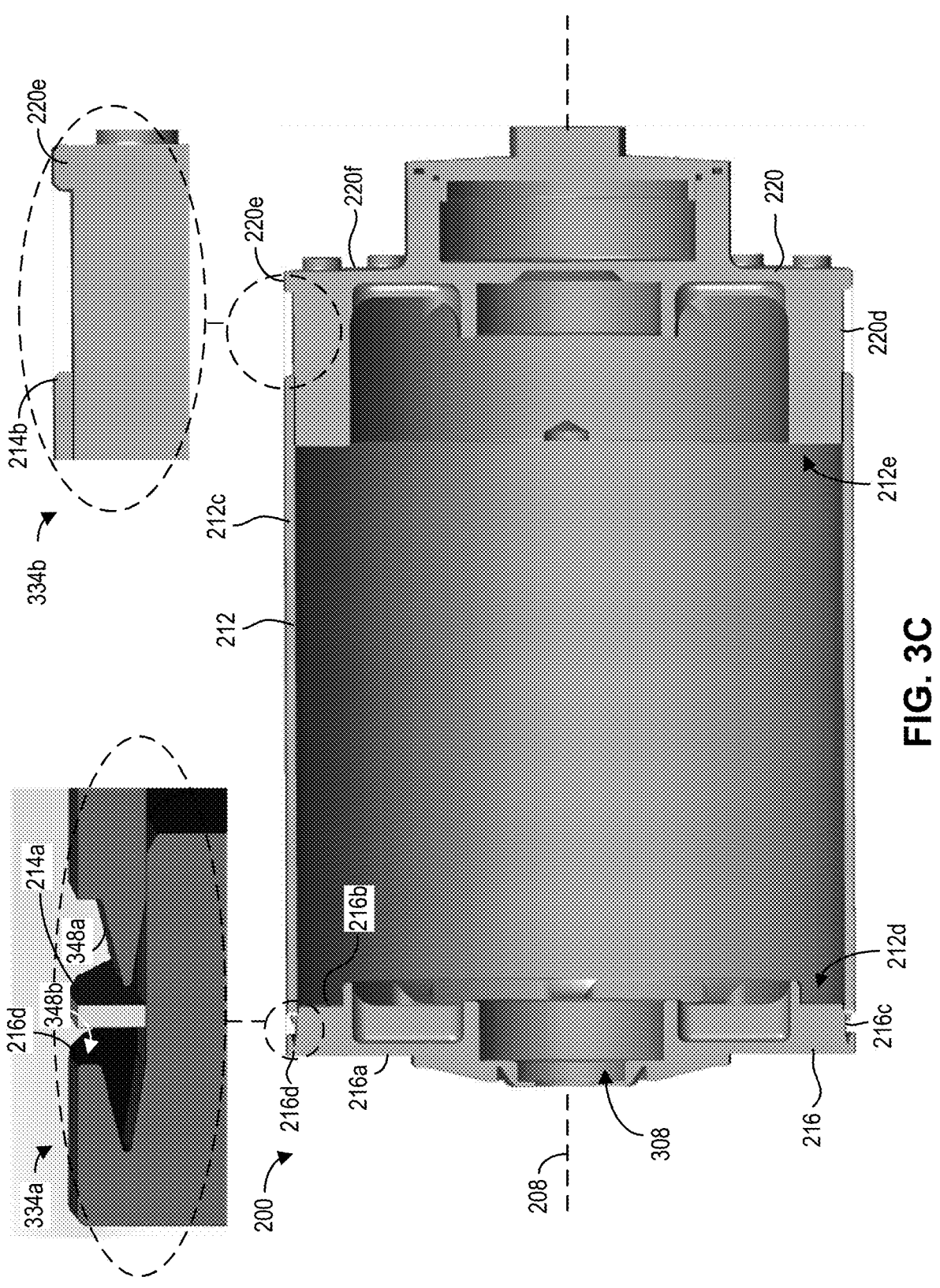
FIG. 3C is an elevation view of the cross-sectional view of the housing assembly in FIG. 3A, and showing the housing assembly in a partially disassembled state.
Figure 3D:
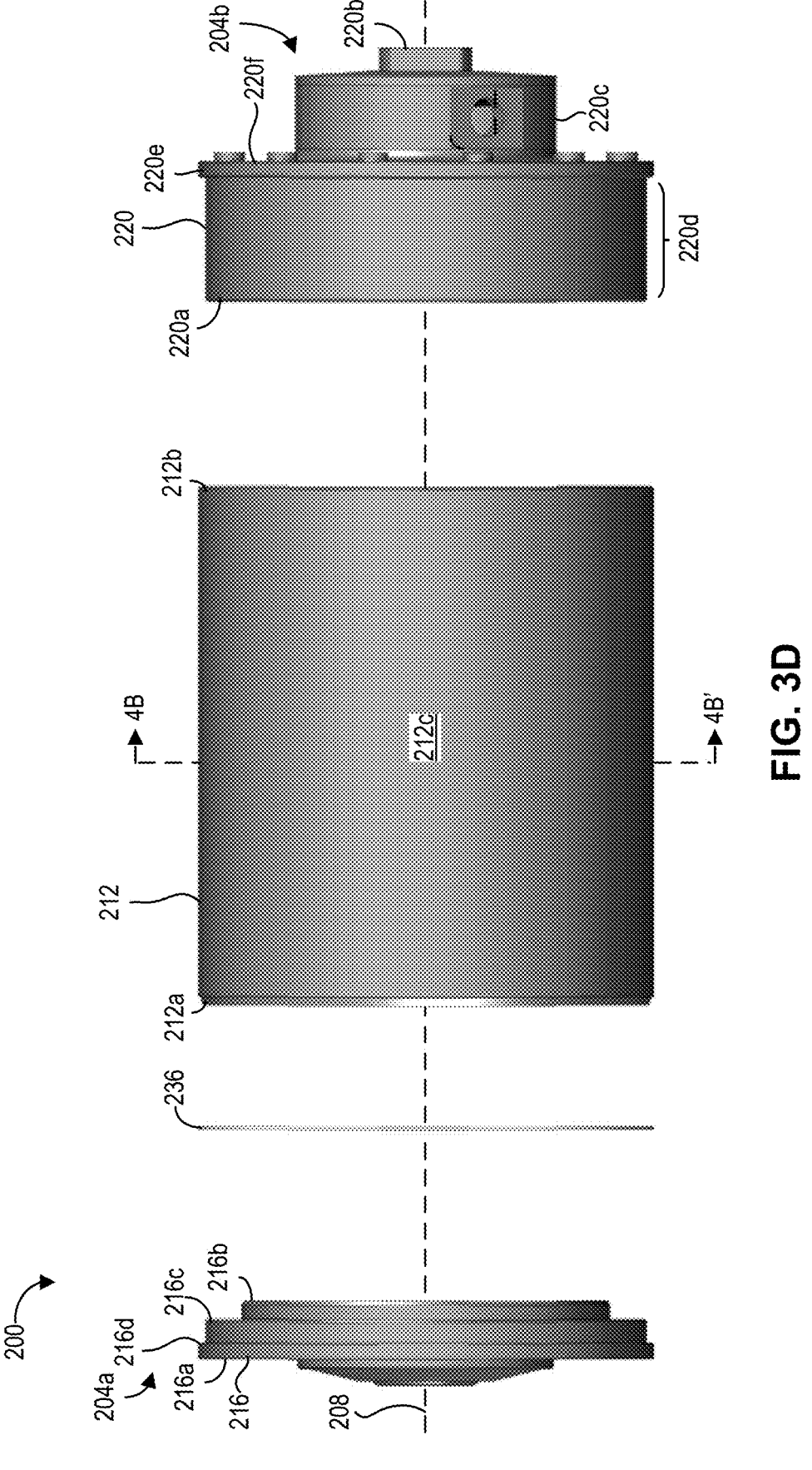
FIG. 3D is an exploded side elevation view of the housing assembly of FIG. 3A.

As shown in FIG. 3D, body portion 212 can comprise an elongated member defined by a lateral surface (or sidewall) 212c. Body 212 extends axially, along housing axis 208, between a respective first and second body end 212a, 212b. Each of the first and second ends 212a, 212b includes a respective opening 212*d*, 212*e* (FIGS. 3E, 3F) into the hollow interior, e.g., defining the hollow housing interior 224. As best exemplified in FIG. 4B, in embodiments where housing 200 has a generally cylindrical configuration, body portion 212 may be defined by a cross-sectional diameter 404 sized to at least receive the volume of the electric motor assembly 502.

Referring now to the front flange member 216—front flange member 216 may removably couple to one end of the body 212, e.g., the first body end 212*a*. In coupling to the body 212, the front flange 216 effectively seals the front body opening 212*d*.

As exemplified in FIGS. 3A-3D, front flange 216 may comprise an external front surface 216*a* (or first surface) and an opposed internal rear surface 216*b* (or second surface). In the coupled state, the internal surface 216*b* is directed towards the body portion 212, along housing axis 208. Further, the external surface 216*a* is directed away from the body 212. Accordingly, in the assembled sate, the external flange surface 216*a* may define the front-most housing surface 204*a*.

Referring briefly to FIGS. 4C-4F, the front flange 216 can include a shaft-receiving opening 308. Shaft-receiving opening 308 extends axially through the front flange 216, and is sized to accommodate the motor shaft 520 (FIGS. 3A-3B). Preferably, in the coupled state, the shaft-receiving opening 308 is substantially aligned with both the housing axis 208 and motor axis 504 in order to receive shaft 520 (FIG. 3B).

Optionally, the interior front flange end 216*b* can include one or more annular protruding rims 350*a*, 350*b* (FIGS. 4E, 4F). Radial inner rim 350*a* defines a bearing-receiving cavity (or groove) 352. In particular, inner rim 350*a* surrounds the shaft-receiving opening 308. Further, the defined cavity 352 is dimensioned to receive and positionally secure the first bearing assembly 524*a*, of rotor assembly 508 (FIG. 3B).

Radial outer rim 350*b* is dimensioned to wrap around, and secure the stator assembly 512 (FIG. 3B). Further, one or more radial ribs 354 extend between the inner and outer rims 350*a*, 350*b* to axial space the stator assembly 512 away front flange end 216*a*, e.g., to absorb force impact, etc.

Figures 3E, 3F:
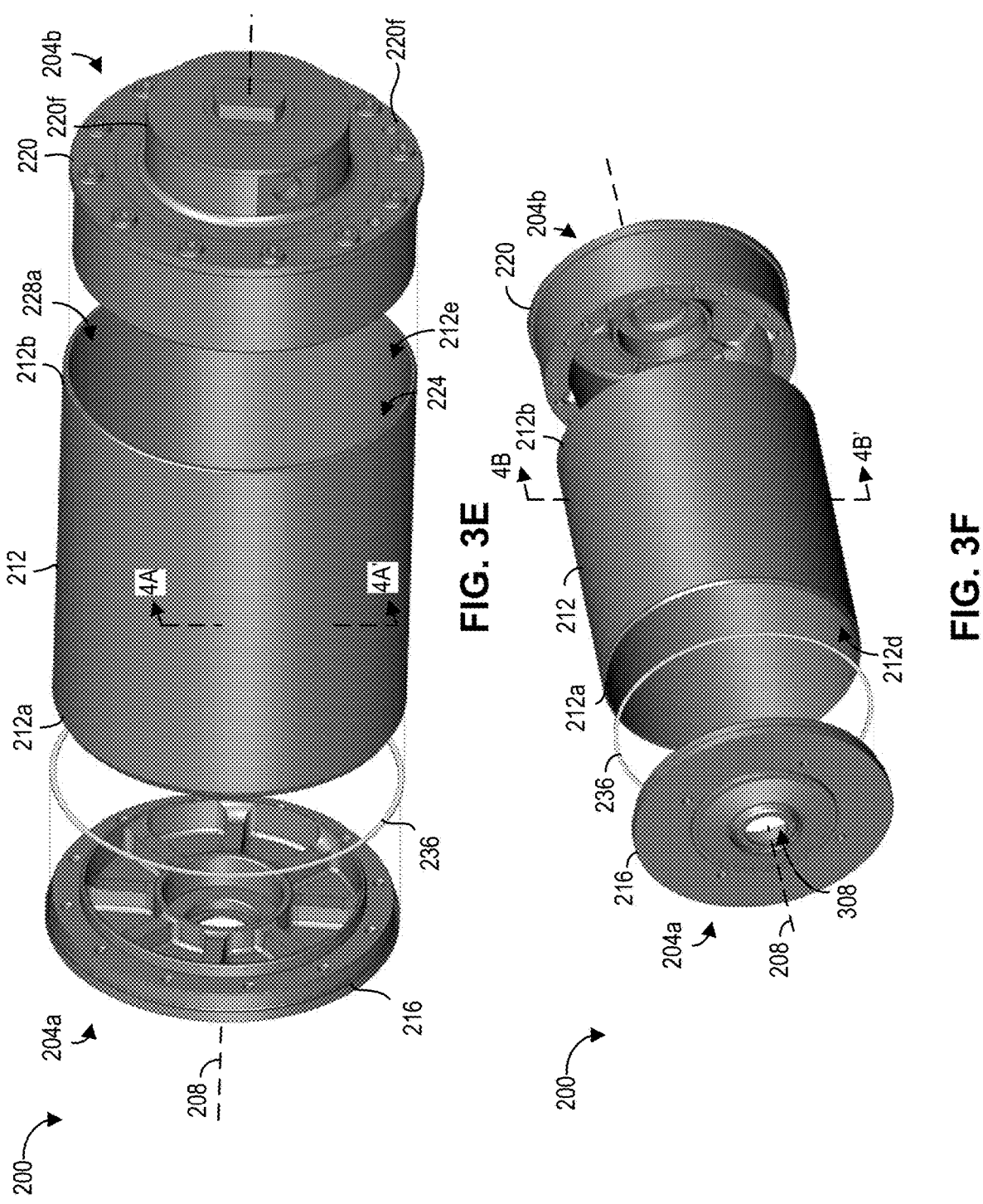
FIG. 3E is an exploded front perspective view of the housing assembly of FIG. 3A.
FIG. 3F is an exploded rear perspective view of the housing assembly of FIG. 3A.

Referring back to FIGS. 3A-3D, rear flange member 220 may also be removably coupled to the rear body end 212*b*, so as to seal the rear body opening 212*e* (FIGS. 3D, 3E). As exemplified, rear flange member 220*e* may also include an inner front surface 220*a* (or first surface), and an external rear surface 220*b* (or second surface) (FIG. 3D). In the coupled state, the inner surface 220*a* faces—along housing axis 208—towards the body portion 212, while external surface 220*b* faces away.

As shown in FIGS. 4I-4L, the inner front surface 220*a*, of the rear flange 220, may also include a bearing-receiving cavity 230. Cavity 230 is defined within an annular rim 370.

As exemplified in FIG. 3B, the cavity 230 may be sized and dimensioned to positionally secure the rotor assembly's rear bearing assembly 524*b*. Rear flange 220 may also include one or more radially extending ribs 380, which also axially space the stator assembly 512 away from the flange surface.

Figure 3G:
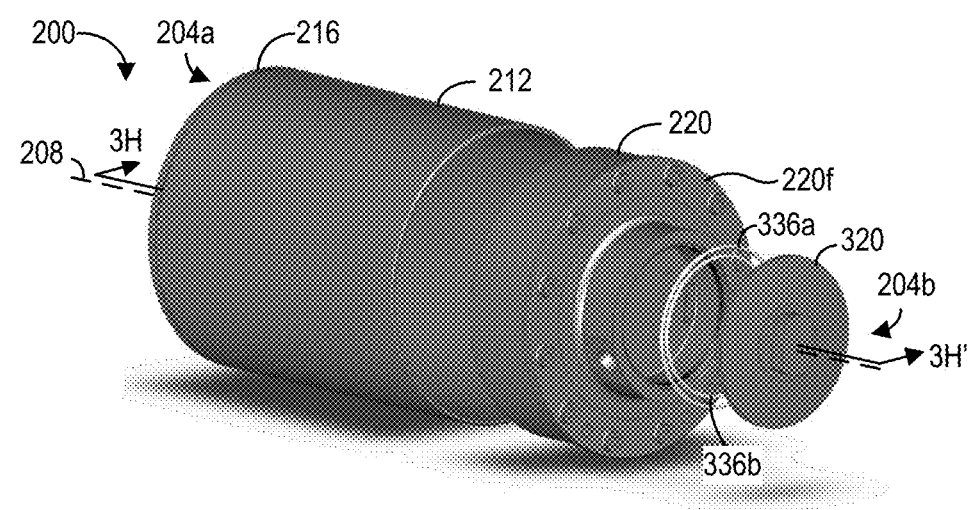
FIG. 3G is a partially exploded rear perspective view of the housing assembly of FIG. 3A.
Figure 3H:
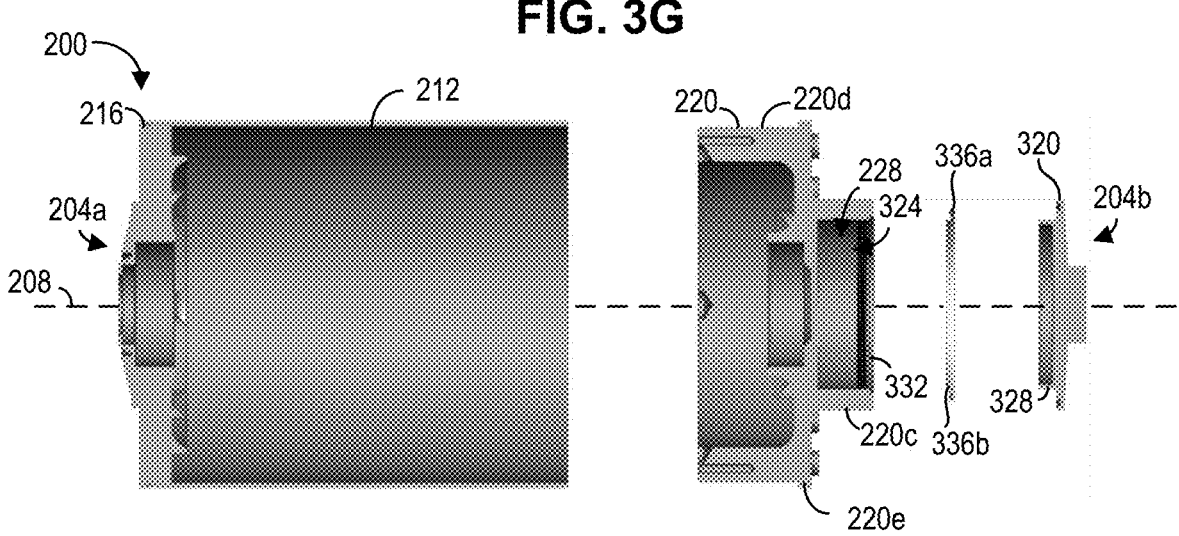
FIG. 3H is a partially exploded cross-sectional side elevation view of the housing assembly of FIG. 3A, taken along the section line 3H-3H' of FIG. 3G.
Figure 3I:
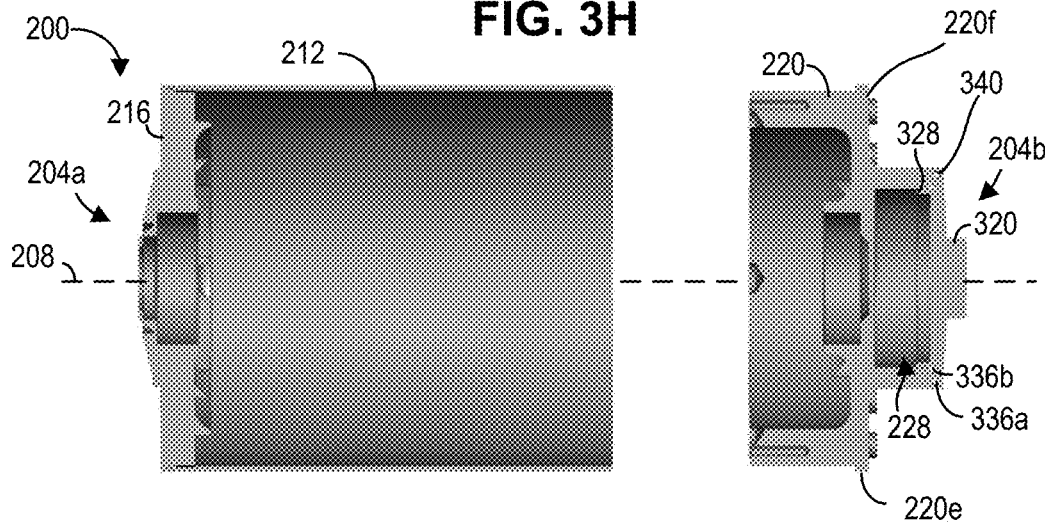
FIG. 3I is a partially exploded cross-sectional side elevation view of the housing assembly of FIG. 3A, taken along the section line 3H-3H' of FIG. 3G.

As exemplified in FIGS. 3G-3I, optionally, rear flange 220 may also encapsulate a rear compartment 228. Rear compartment 228 is defined within a rear compartment wall portion 220*c*. The rear compartment wall portion 220*c* extends rearwardly from the exterior flange end 220*b*. As shown in FIG. 3B, the rear compartment 228 may house a heat sink 232.

Optionally, as exemplified in FIGS. 3G-3I, a removable lid 320 may overlay and cover the rear compartmented 228. Lid 320 is positioned, rearwardly of the rear compartment potion 220*c*. Lid 320 is removable to expose an opening 324 providing access to the rear compartment 228. Lid 320 may be removably coupled to the rear compartment portion 220*c* in any manner. In at least one embodiment, a portion 328 of the lid 320 may be threaded, such as to mate in threaded engagement with a threaded portion 332 of the rear compartment 220*c* (FIG. 3I).

Optionally, one or more sealing members 336*a*, 336*b* (e.g., O-rings) are provided, to provide a water-resistant sealing at the interface 340 where the lid 320 couples to the compartment portion 220*c*.

In the exemplified embodiment, the housing assembly 200—and in particular the interior housing volume 224—is generally shaped to complement the shape of the electric motor assembly 502. For example, the interior housing volume 224 has a generally cylindrical configuration, complementing the quasi-cylindrical design of the motor assembly 502. In other cases, however, and as provided herein, the housing assembly 200 may have any other desirable shape or configuration.

ii. Slide-and-Fit Assembly Configuration for Housing Assembly

The following is a discussion of an example embodiment of a design and method for assembling a motor housing assembly. The disclosed embodiments enable for a slide-and-fit engagement between one or more end flanges and a body portion of the motor housing. In particular, the slide-and-fit engagement structure is used for coupling the front and rear flange members 216, 220 to the body portion 220. The disclosed assembly structure and method may be used by itself or with one or more other aspects of this disclosure.

Referring now to FIGS. 3A-3D, as exemplified, each of the front and rear flanges 216, 220 may be slidably translated, along housing axis 208, into engagement with the body portion 212.

As best exemplified in FIGS. 3A, 3C and 3D, a portion of each of the front and rear flanges 216, 220 may define an engagement portion 216*c*, 220*d*, respectively (see also FIGS. 4C, 4D, 4I, 4K). Engagement portions 216*c*, 220*d* slidably engage body portion 212 in the coupled state.

For example, the front flange includes engagement portion 216*c*, which extends axially from the flange's inner surface 216*b*. Engagement portion 216*c* may be slidably received, along housing axis 208, through the front body opening 212*d* (FIG. 3C). Accordingly, in the coupled state, engagement portion 216*c* nests, and engages inside, the body's lateral side wall 212*c* (FIG. 3A).

A similar configuration is used for the rear flange member 220. Rear flange includes an engagement portion 220*d*, axially extending from the rear inner flange surface 220*a*. Engagement portion 220*d* may be slidably translated, along housing axis 208, through the rear body opening 212*e* (FIG. 3C). Accordingly, in the coupled state, the engagement portion 220*d* is also nested and engage with the body's lateral side wall 212*c* (FIG. 3A).

Figures 4A, 4B:
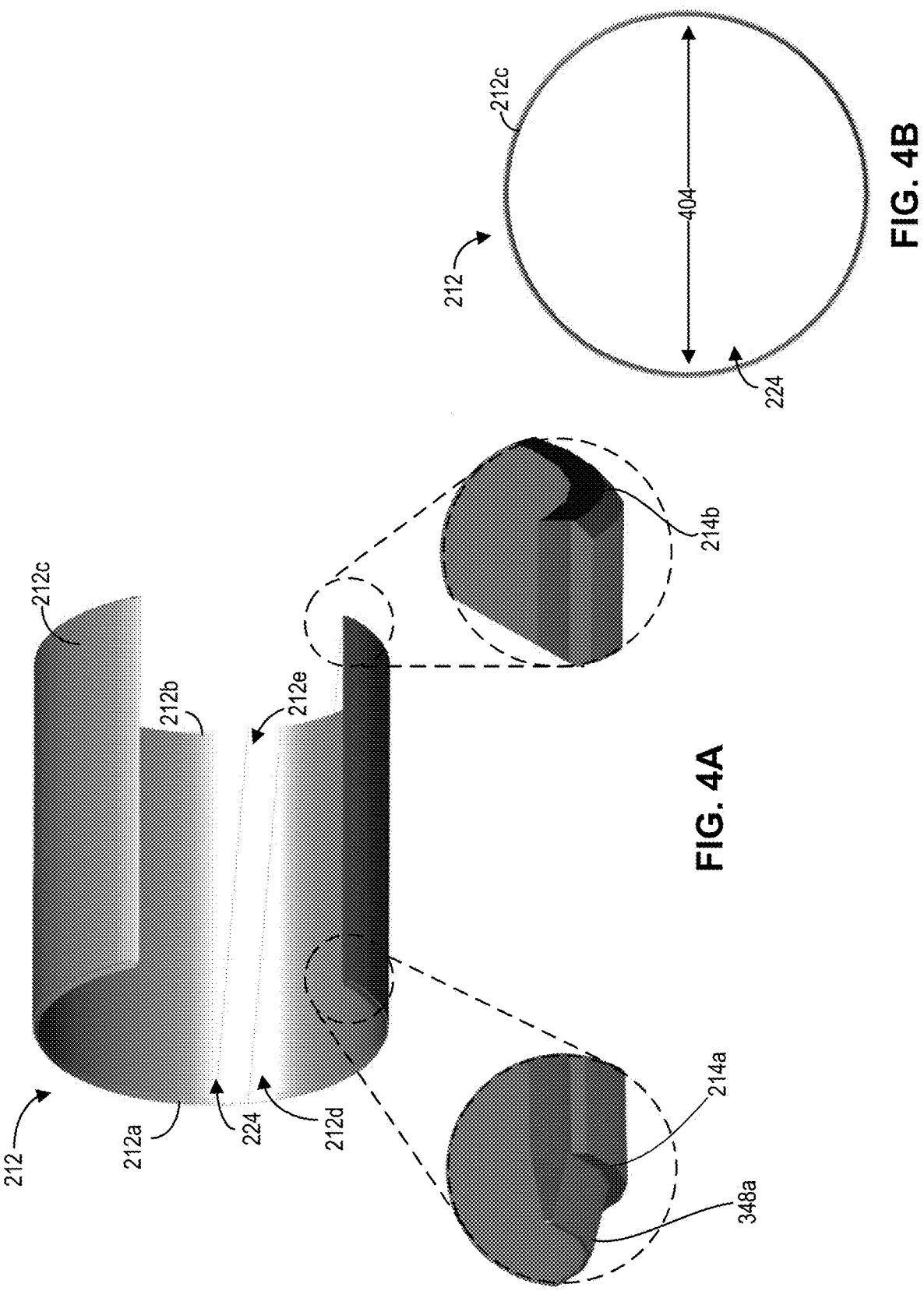
FIG. 4A is a cross-sectional view of a housing body portion of the housing assembly of FIG. 3A, taken along the section line 4A-4A' in FIG. 3E.
FIG. 4B is a cross-sectional view of the housing body portion, taken along the section line 4B-4B' in FIG. 3F.
Figure 4H:
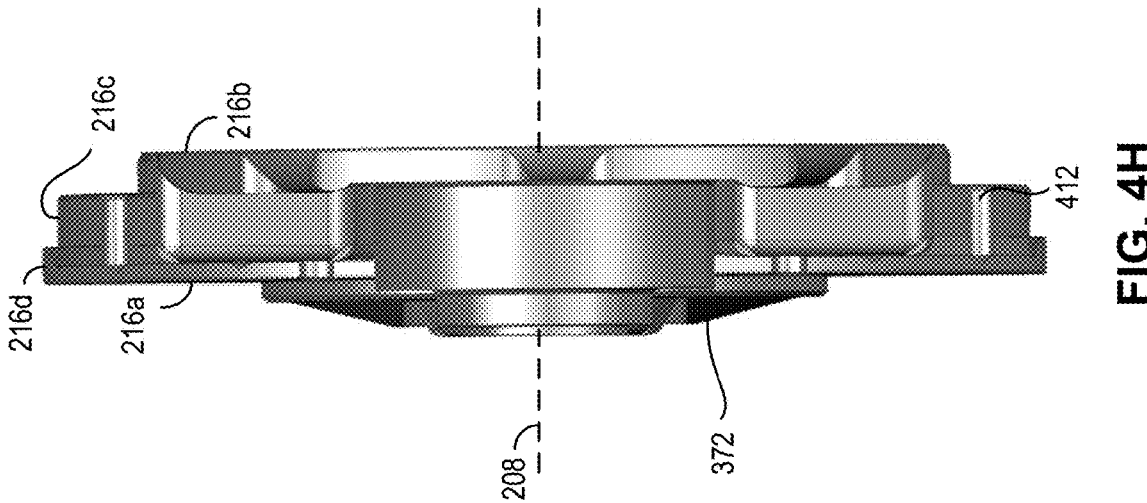
FIG. 4H is a front cross-sectional view of the front end flange member, taken along the section line 4H-4H' of FIG. 4C.

Preferably, to provide a tight-fit engagement, flange engagement portions 216*c*, 220*d* are dimensioned (e.g., sized and shaped) to complement the body portion 212. For example, as exemplified in FIGS. 4F and 4J—the inner surface 216*b* of the front flange 216 (FIG. 4F), and the inner surface 220*a* of the rear flange member 220*a* (FIG. 4J), may have a circular cross-sectional shape which complement the circular cross-sectional shape of the body portion 212 (FIG. 4B). For example, the respective diameters 312, 316 (FIGS.

4F, 4J) of each engagement portion 216c, 220d may be substantially equal to the cross-sectional body diameter 404 (FIG. 3B). The engagement fit may prevent the various seals (e.g., seal 236 in FIG. 3D) from shifting position, and in turn, increase ingress protection.

As best exemplified in FIG. 3D, preferably, each of the flange members 216, 220 comprises a positive stop (or lip). The lip limits axial sliding of the flange members 216, 220 through the body portion 212.

For example, front flange member 216 includes a lip 216d. Lip 216d may axially extend rearward of the flange's engagement portion 216c. Lip 216d may comprise an overhanging portion, radially extending beyond the diameter 312 of the engagement portion 216c (FIG. 4E). In this configuration, when the front flange 216 is axially slid into the body portion 212, the lip 216d abuts against the first body end 212a to prevent further axial motion.

Figure 4G:
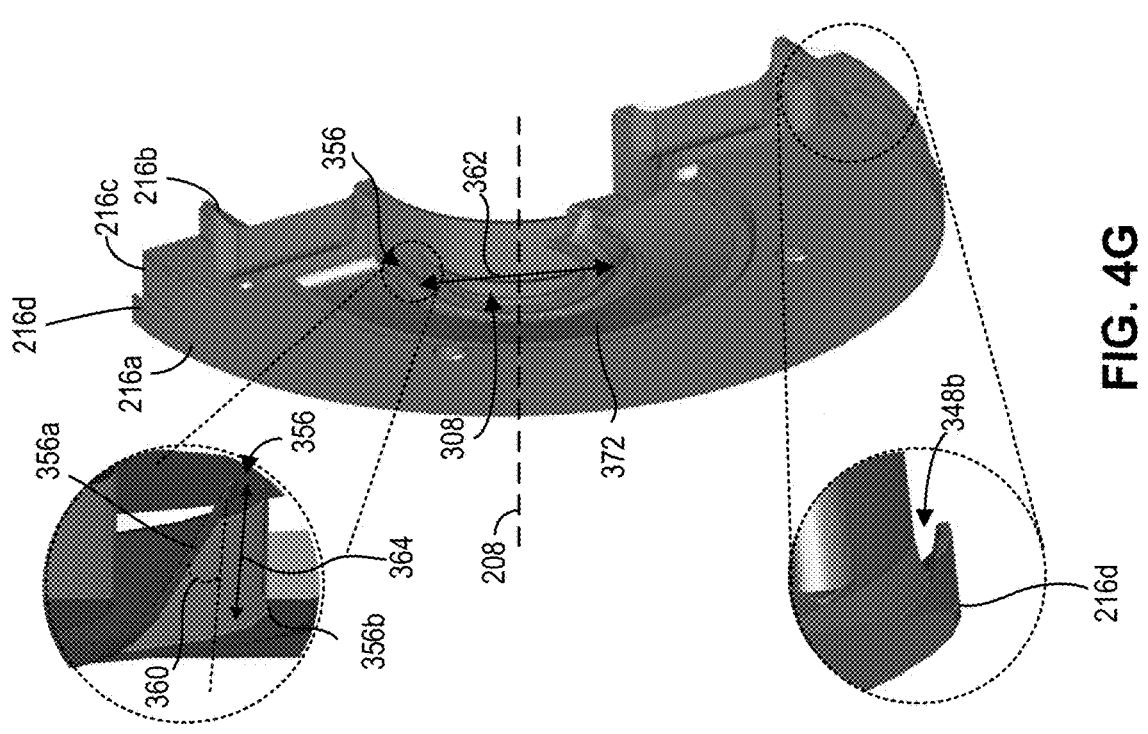
FIG. 4G is a front cross-sectional view of the front end flange member, taken along the section line 4G-4G' of FIG. 4C.
Figures 4I, 4J, 4K, 4L:
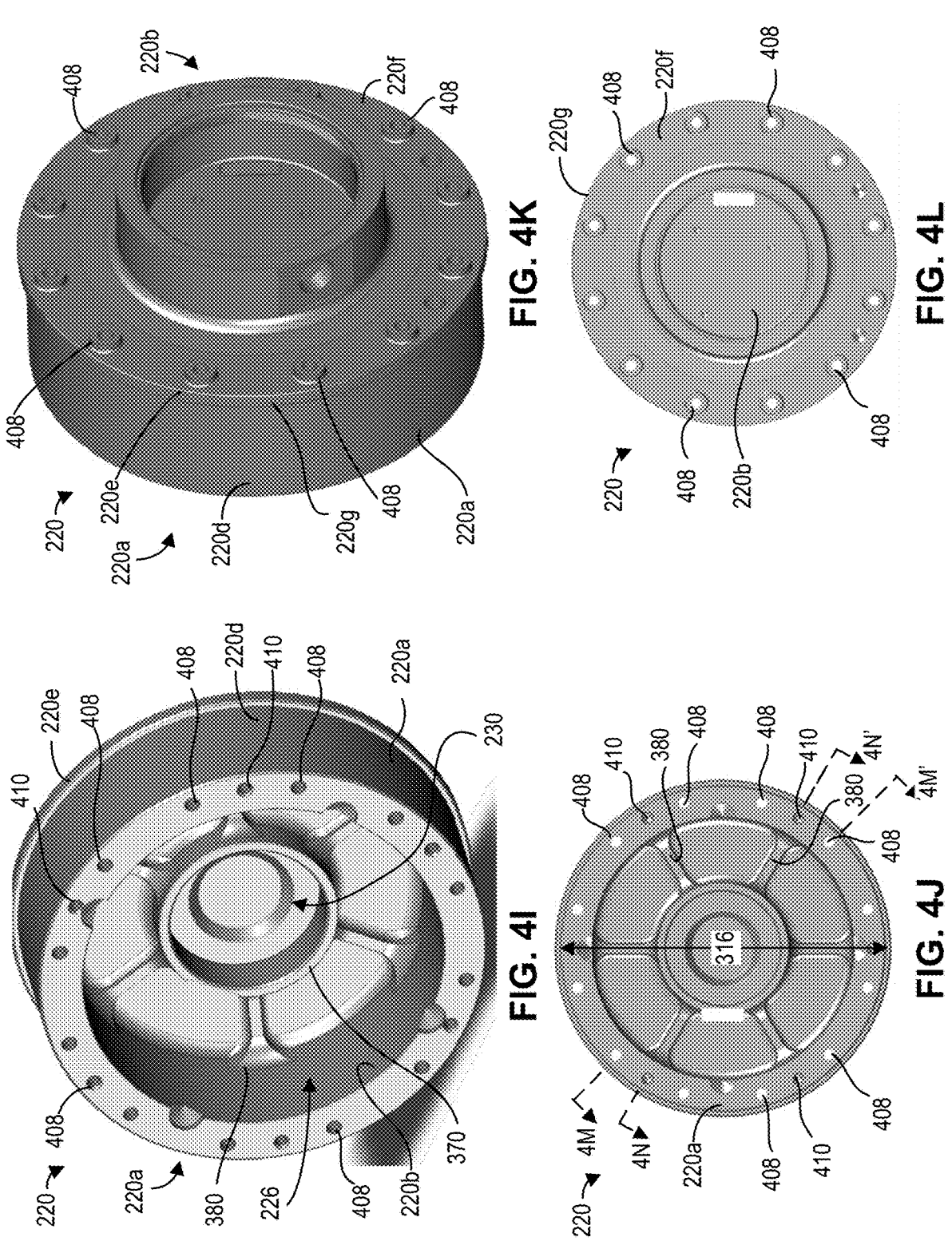
FIG. 4I is a front perspective view of a rear end flange member, of the housing assembly of FIG. 3A.
FIG. 4J is a front elevation view of the rear end flange member.
FIG. 4K is a rear perspective view of the rear end flange member.
FIG. 4L is a rear elevation view of the rear end flange member.

Similarly, rear flange 220 can also include its own lip 220e, also comprising an overhanging portion positioned forwardly, and extending beyond the diameter 316 of the flange's engagement portion 220c (FIG. 4L). Lip 220e can abut against the second body end 212b, to prevent further axial motion of rear flange 220.

Optionally, as best exemplified in FIGS. 3D and 3E, a sealing member 236 (e.g., an O-ring) is disposed between the front flange members 216 and the first body end 212a. For example, the sealing member 236 may be received between the flange's lip 216d of the front flange member 216, and the first body end 212a. This can provide added sealing functionality, and enhanced ingress protection.

As exemplified in FIG. 3C, in at least one embodiment, to further enhance the ingress protection, a mating configuration may be provided between each the flanges 216, 220 and the body portion 212 in the coupled state.

For example, a mating structure 334a is provided between the front flange 216 and the housing body 112 (FIG. 3C). The mating structure may comprise an axial protrusion (e.g., a V protrusion) 348a along all, or a portion, of the front edge 214a of the body 212 (see also FIG. 4A). In the assembled position, the protrusion 348a is receivable into a complementary groove 348b formed in the lip 216d of the front flange 216, e.g., on the inner surface 216b (FIGS. 3A, 3B and 4G). An advantage of this design is that the zig-zag formed by the V-like mating structure may accommodate for mismatch between the diameter size of the body 212 (e.g., 404 in FIG. 4B) and the front flange 216 (e.g., 312 in FIG. 4F), thereby reducing tolerance manufacturing requirements between the two components.

A similar mating structure 334b can also be provided, as between the rear flange 220 and housing body 212. For example, the body's rear edge 214b may comprise a planar surface, which abuts an inner planar surface of the rear flange's lip 220e.

iii. Securing Mechanism for Housing Assembly

The following is a discussion of an example embodiment for a design and method for securing the motor housing, in the coupled state, and which may be used by itself or with one or more other aspects of this disclosure. As provided herein, the disclosed design and method may involve using one or more elongated fasteners to secure the end flanges 216, 220 to the body 212. In some cases, once secured, the flanges 216, 220 may be welded to the body 212. In other embodiments, however, any other suitable method may be used to secure the end flanges 216, 220 to the body 220.

Figures 6A, 6B:
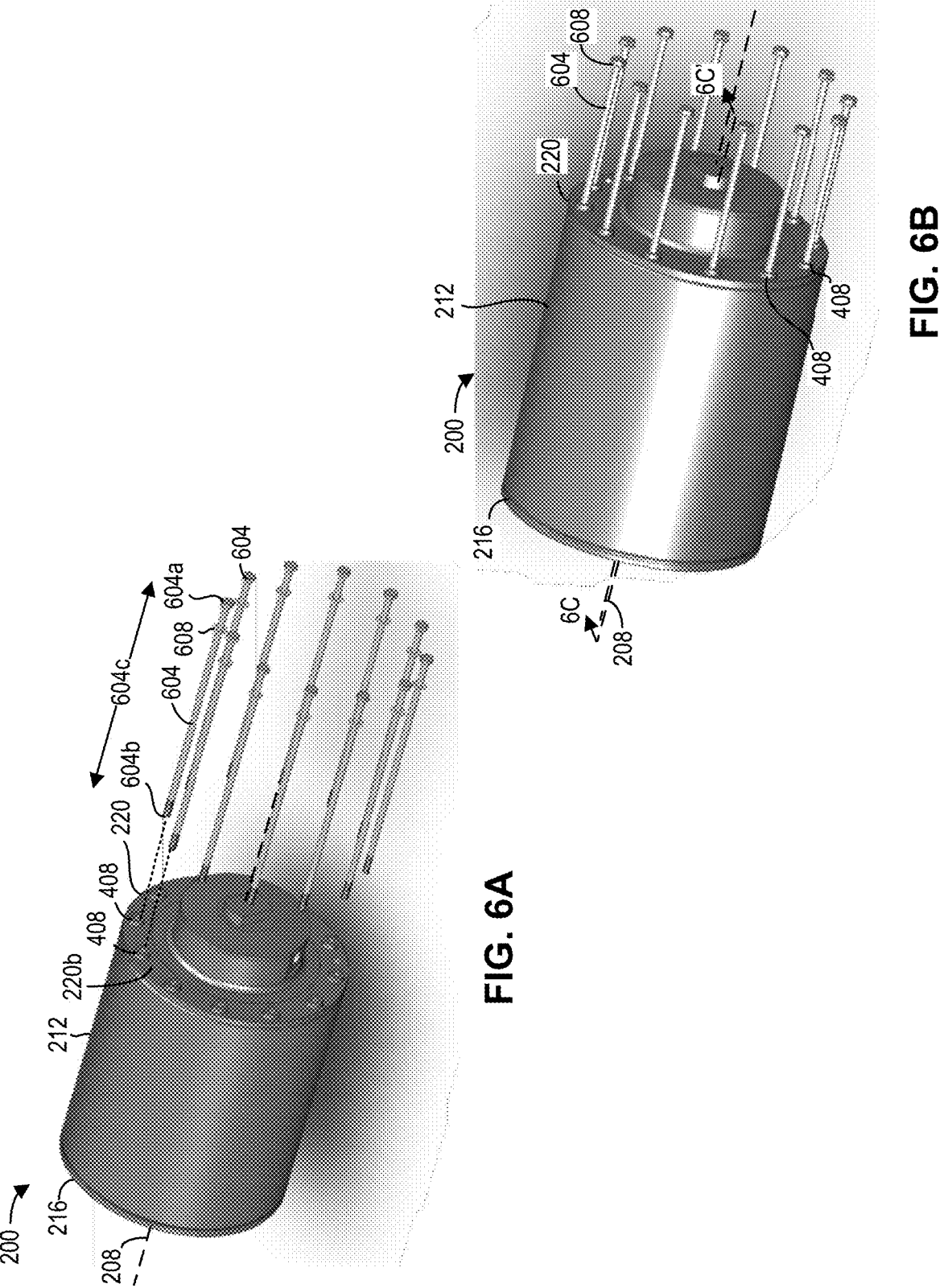
FIG. 6A is a partially exploded perspective view of the housing assembly and one or more housing fasteners.
FIG. 6B is a partially exploded perspective view of the housing assembly and one or more housing fasteners partially inserted into the housing assembly.
Figure 6C:
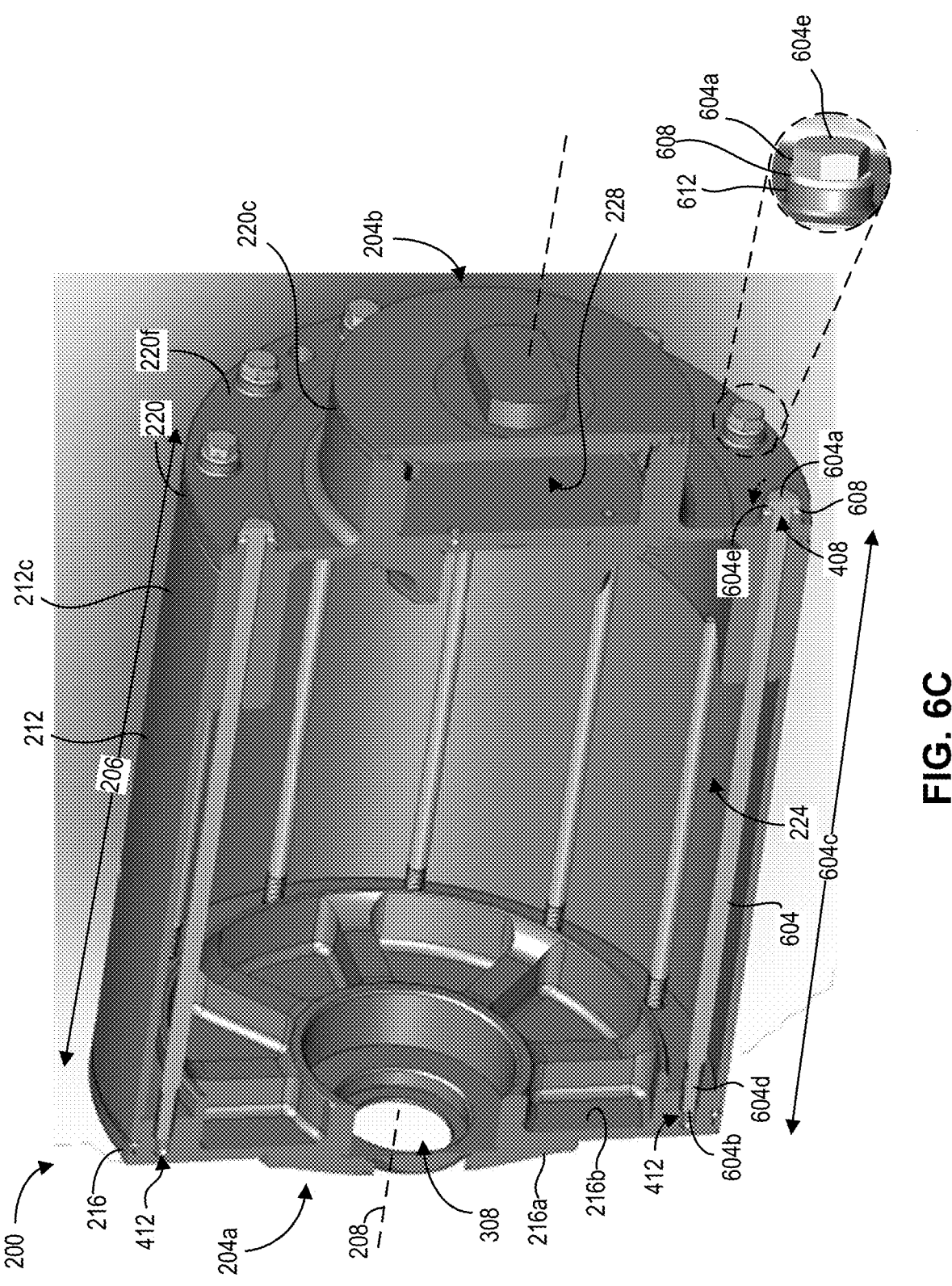
FIG. 6C is a perspective view of the housing assembly, taken along the section like 6C-6C' of FIG. 6B, and showing one or more housing fasteners mounted therein, and showing an enlarged view of a portion of the rear flange.

Reference is now made to FIGS. 6A-6C, which exemplify an embodiment of a securing mechanism for securing the motor housing 200 in the coupled state. Securing mechanism can be applied, for example, once the electric motor assembly 502—and various other components and elements described herein—are mounted inside the housing assembly 200.

As exemplified in the figures, the securing mechanism may comprise one or more elongated fasteners 604. Elongated fasteners 604 can comprise, for example, elongated bolts. As provided herein, the elongated fasteners 604 can extend through the housing interior, to secure the housing in the coupled state. To this end, each fastener 604 extends between a respective first and second fastener end 604a, 604b, and is defined by a corresponding length 604c (FIG. 6C). In some examples cases, sealing washers 608 are also provided with each corresponding fastener 604, which are used to enhance ingress protection and sealing of the housing.

Once the housing assembly 200 is in the coupled state—e.g., the end flanges 216, 220 are engaged with the body 212, such as through a slide-and-fit engagement—elongated fasteners 604 are inserted through the rear flange 220 (FIG. 6A).

As shown in FIG. 4I-4L, as well as FIGS. 6A-6B, rear flange 220 may include one or more fastener-receiving openings 408. Each opening 408 is sized to receive a fastener 604. As exemplified in FIG. 4N, each opening 408 may extend through the rear flange 220, between the flange's inner and outer surfaces 220a, 220b. In one example, openings 408 may extend through the flange's engagement portion 220d, e.g., the extended portion which nests under the body 212.

In FIGS. 6A-6B, the fasteners 604 are inserted through the respective fastener-receiving openings 408, along an axis parallel to the housing axis 208. In this manner, each fastener 604 is translated between an unfastened position (FIG. 6A) and a fastened position (FIG. 6C). In the fastened position (FIG. 6C), the fasteners 604 extend axially between the rear flange 220 and front flange 216.

As exemplified in FIG. 6C, fasteners 604 may be slid through the body interior 224, until the fastener's distal second end 604b engages the front flange 216. That is, each fastener 604 may have a length 604c substantially equal to the motor housing length 206.

Each fastener 604 may also include a head portion 604e proximal the first end 604a. Head portion 604e is sized to be larger than the openings 408 on the rear flange 220. Accordingly, the head portion 604e limits axial sliding of the fastener 604 through the housing interior.

Referring to FIGS. 4E, 4F and 6C, the front flange 216 may be designed to receive the fasteners 604. For example, the inner surface 216b, of front flange 216, may include one or more fastener-receiving openings 412. Each opening 412 is adapted (e.g., sized) to receive a fastener's distal end 604b (FIG. 6C). In the coupled state, front flange openings 412 may be axially aligned with the complementary rear flange openings 408, e.g., along housing axis 208. In some cases, openings 412 may not extend completely though the front flange 216, but may stop short of the flange's external surface 216a.

In at least one embodiment, each fastener 604 may have a threaded portion 604d along it's distal end 604b (FIG. 6C). The threaded portion 604d engages with internal threading inside the front flange openings 412. Accordingly, the fastener's head portion 604a can be rotated (e.g., by a user or machine) to threadedly mate the fastener's distal end 604b with the front flange's threaded opening 412. This, in turn, enables the fasteners 604 to secure the housing's front and rear flanges 216, 220 to the body portion 212.

In the exemplified embodiment, each fasteners 604 may extend proximal the body's sidewall 212*c*. In this manner, fasteners 604 do not occupy space inside of the body where the motor assembly 502 is otherwise received. For example, in FIG. 4L, rear flange openings 408 may be spaced proximal an outer edge 220*g*. Similarly, in FIG. 4F, front flange openings 412 may also be spaced proximal an outer edge 216*e*.

While the exemplified embodiment illustrates twelve (12) fasteners 604, it will be understood that any number of fasteners 604 (as well as complementary rear and front flange openings 408, 416) may be provided. Further, the fasteners 604 may disposed in any other suitable configuration. In some cases, the fasteners 604 may be inserted through the front flange 216 as opposed to the rear flange 220.

In at least one embodiment, once the fasteners 604 are secured, the end flange 220 may be further secured to the body portion 212, such as by welding the components together.

iv. Elevated Openings on Rear Flange

The following is a discussion of a design configuration for the rear flange, which may be used by itself or with one or more other aspects of this disclosure. As provided herein, the disclosed design uses embossed, rather than embedded, features on the rear flange 220 to minimize pooling of fluids and other detritus, and to increase ingress protection of the housing assembly.

In more detail, as exemplified in FIG. 6C, rear flange 220 can include raised, or elevated, fastener seat elements 612 (e.g., raised bolt seats). Each raised bolt seat 612 defines an opening 408, to receive one of the elongated fasteners 604. Each elevated seat element 612 extends or protrudes axially, from the external rear flange surface. In the exemplified embodiment, the raised elements 612 may protrude from a lateral flange surface 220*f*, surrounding rear compartment wall portion 220*c*.

An advantage of the elevated bolt seats 612 is to increase ingress protection, and to prevent water from pooling. For example, many conventional designs may include depressions in the end flange for receiving fasteners 604 (e.g., depressions 118 in FIG. 1). However, these depressions may collect fluid and detritus, over time, especially when the motor housing 200 is positioned in an upright position (e.g., the front flange 216 is positioned vertically above the rear flange 220). In turn, these depressions may become failure points over time, through which fluids (e.g., corrosive chemicals), may penetrate through the housing 200. For this reason, ingress protection is only achieved if the conventional motor housing 100 is oriented laterally. However, using elevated bolt seats 612, fluid pooling regions are eliminated, thereby increasing ingress protection in various mounting orientation of housing 200. To this end, by preventing fluid pooling regions, there is less chance of bacterial growth, thereby improving the overall sanitization of the motor housing.

v. Front Sealing Assembly

The following is a discussion of a sealing assembly disposed around the front housing flange, which may be may be used by itself or with one or more other aspects of this disclosure. The sealing assembly may provide enhanced ingress protection around the shaft opening 308, defined in the front flange 216 (FIGS. 4C-4F). More particularly, it has been appreciated that the flange's shaft opening is a significant source for ingress of fluids and detritus, and that existing designs may fail to provide adequate ingress protection around this area.

More particularly, existing designs often rely only on a simple sealing assembly around the flange shaft opening 308. For example, only a radial shaft seal is employed around the shaft opening. The radial shaft seal surrounds the motor shaft, and is disposed inside the motor housing. A problem, however, is that the radial shaft seal may become contaminated, which accelerates wear over time, thereby resulting in ingress of fluids and detritus through the flange shaft opening 308. To mitigate this concern, some conventional designs complement the radial shaft seal with a "flinger cover". As explained herein, the flinger cover is positioned exterior to the front flange 216, and surrounds the shaft opening. The flinger cover is meant to provide an added layer of protection to the radial shaft seal and is self-cleaning due to centrifugal force.

Existing flinger cover designs, however, suffer from two important drawbacks: (i) first, the flinger cover and front flange 216 are not designed to effectively eliminate pooling of water/detritus around the flange shaft opening 308, which may cause potential for damage to the radial shaft seal (see e.g., the design in FIG. 1 which is prone to fluid/detritus pooling around shaft 108); and (ii) second, the flinger cover and front flange 216 are also not designed to effectively accommodate for axial movement of the shaft 520 and pre-loaded axial spring 532 (FIG. 5E) during operation of the motor, as previously explained.

Accordingly, to at least partially mitigate these challenges, embodiments herein provide for a three-part sealing assembly, as well as a unique flinger seal and front flange design for enhanced ingress protection.

Reference is now made to FIGS. 7A-7K, which exemplify embodiments of a sealing assembly 704, in accordance with the teachings herein. Sealing assembly 704 can minimize ingress though the shaft-receiving opening 308, along front flange 216.

Figure 7A:
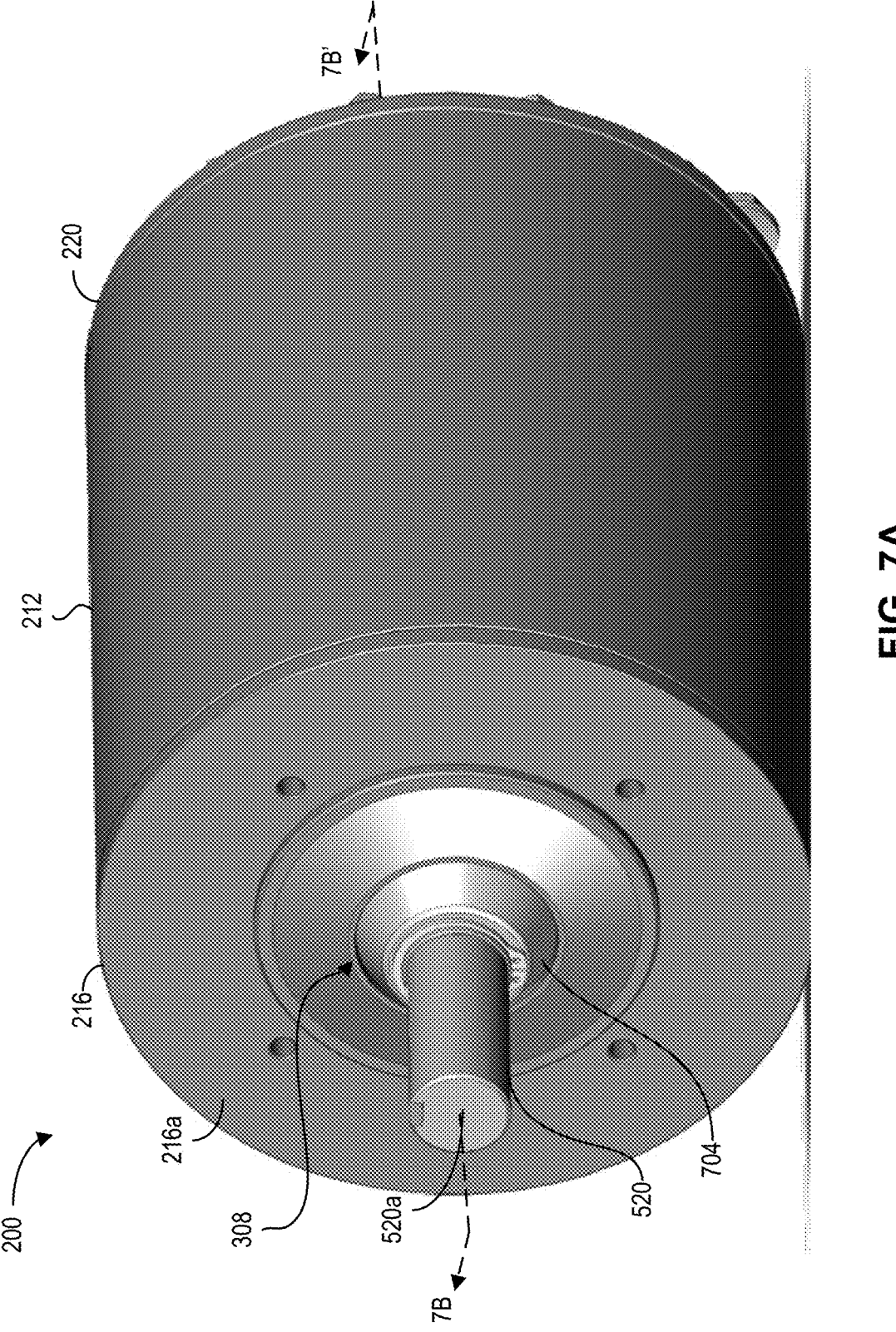
FIG. 7A is a perspective view of the housing assembly, with the electric motor mounted therein.
Figure 7B:
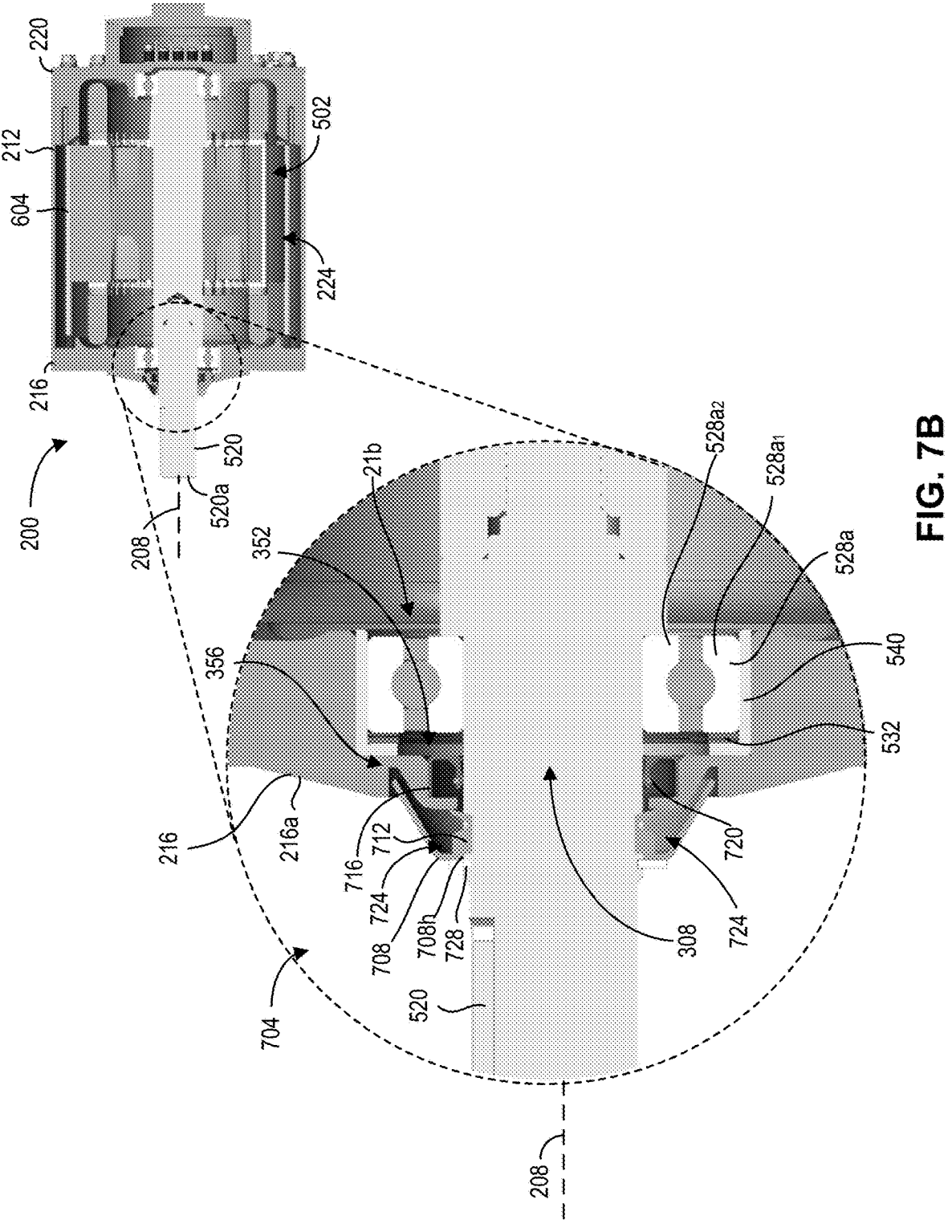
FIG. 7B is an elevation cross-sectional view of the housing assembly and electric motor in FIG. 7A, taken along the section line 7B-7B' of FIG. 7A, and showing an enlarged view of sealing assembly disposed at a front portion of the cross-sectional view.

As exemplified in FIG. 7B, the sealing assembly 704 can comprise one or more of: (i) a flinger seal 708, (ii) a contact seal 712 and (iii) a radial shaft seal 716. Each of seals 708, 712 and 716 is disposed around the front flange's shaft-receiving opening 308, and radially extends about housing axis 208.

As explained, radial shaft seal 716 is the primary sealing mechanism for preventing ingress of fluids and other detritus through shaft opening 308. In general, radial shaft seal 716 is in tight-fit engagement around shaft 520. In the exemplified embodiment, radial shaft seal 716 is disposed forwardly of the front flange's bearing-receiving cavity 352 (FIG. 4E), and above the bearing end cap 540.

Radial shaft seal 716 may have any design or configuration, as is known in the art. FIGS. 7O-7P exemplify an embodiment of the radial shaft seal 716. As exemplified the seal 716 may have an annular design, with opposed first and second sides 716*a*, 716*b*. An elastic spring 720 (FIG. 7Q) may wrap around the radial shaft seal 716, and may function to maintain contact between the seal 716 and shaft 520. In some example cases, spring 720 is received within a channel 716*c* along seal 716 (FIG. 7P).

As explained, over time, the radial shaft seal 716 is susceptible to wear, tear and degradation. This results, for example, from elongated exposure to fluids and other detritus which pool around the shaft opening 308. As the radial shaft seal 706 degrades with time, there is a concern that fluids and solids may leak into the motor housing 200, thereby damaging the motor assembly 502.

In view of the foregoing, embodiments herein provide for added layers of sealing protection, comprising a flinger seal 708 and/or a contact seal 712. These sealing layers provide enhanced protection to the the radial shaft seal 716 from premature wear. In turn, the sealing mechanisms 708, 712 enhance ingress protection around shaft 520.

The flinger seal 708 is now described in greater detail. As exemplified in FIG. 7B, the flinger seal 708 is disposed externally to the motor housing 200, and along the flange's external surface 216a. The flinger seal 708 is connected to shaft 520, such that flinger seal 708 rotates with the shaft 520 during operation of the motor. A function of the flinger seal 708 is to rotate, and "fling" away fluids and detritus from around the shaft 520, thereby preventing pooling and ingress of the fluid and detritus around the flange's shaft opening 308.

Figures 7C, 7D, 7E:
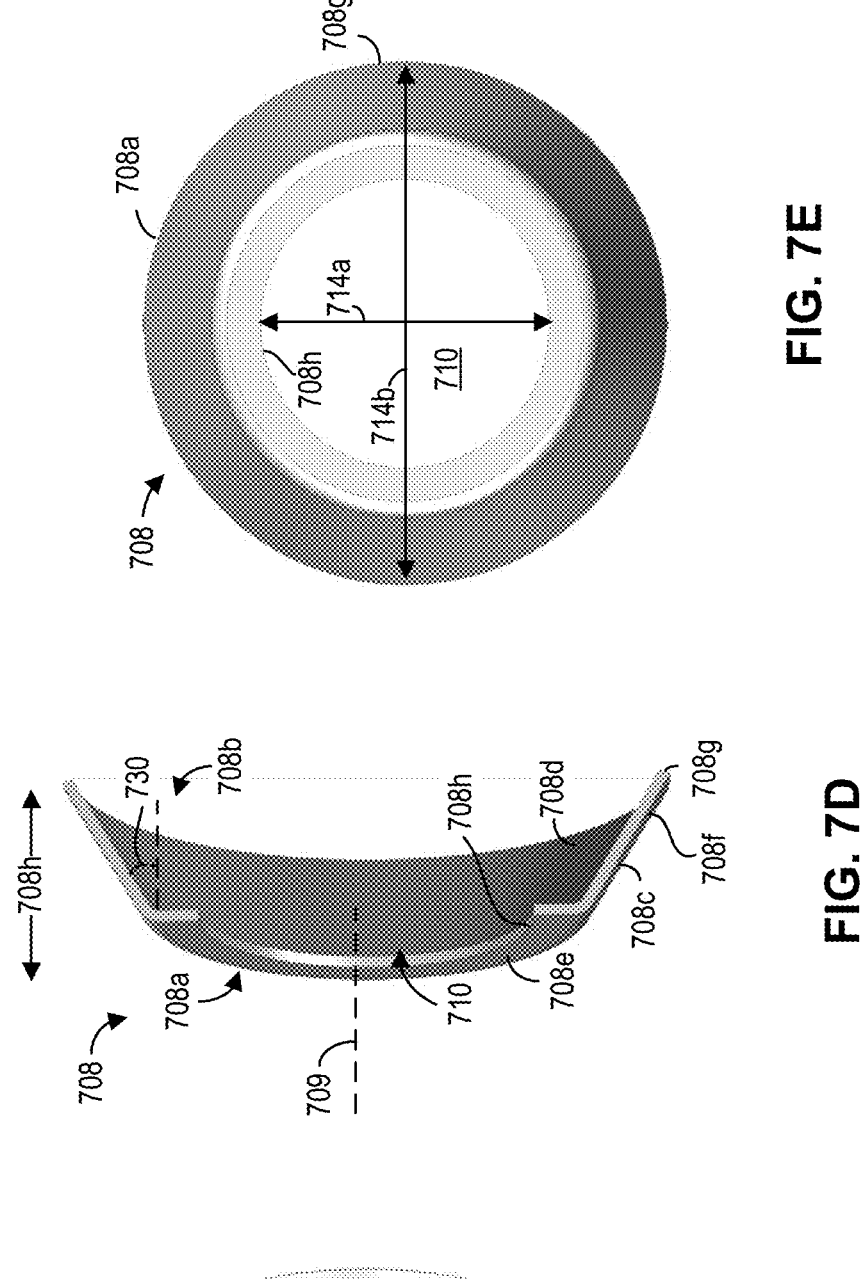
FIG. 7C is a perspective view of an example embodiment of a flinger seal, in accordance with some embodiments.
FIG. 7D is a cross-sectional view of the flinger seal of FIG. 7C, taken along the section line 7D-7D' of FIG. 7C.
FIG. 7E is a top plan view of the flinger seal of FIG. 7C.

FIGS. 7C-7E exemplify an embodiment of the flinger seal 708. As exemplified, flinger seal 708 extends axially between a front end 708a and an opposed rear end 708b, along axis 709. In the mounted position, axis 709 aligns with housing axis 208. A shaft-receiving opening 710 extends between the front and rear seal ends 708a, 708b. Exterior and interior surface 708a, 708b, respectively, also define the flinger seal 708.

In the exemplified design, the flinger seal 708 includes two portions: (i) a planar portion 708e, and (ii) a tapered portion 708f (FIG. 7D). In some cases, the planar portion 708a may be only optionally provided.

Planar portion 708e is located proximal the front seal end 708a. The planar portion 708e extends orthogonally to axis 709. The planar portion 708e can include a radially inward circular edge 708h, which defines the shaft-receiving opening 710. Edge 708h may be couplable (e.g., removably couplable), with the shaft 520 (FIG. 7B), such as to secure the flinger seal 708 to shaft 520.

As exemplified in FIG. 7E, the inner edge 708h may define a diameter 714a, that is substantially equal to the diameter of shaft 520. In some cases, the planer portion 708e may be coupled to a retaining ring 728, which is attached to shaft 520 (FIG. 7B).

Flinger seal 708 also includes the tapered portion 708f. Tapered portion 708f tapers radially outwardly, to define a frustoconical shape. As exemplified in FIG. 7D, tapering portion 708f terminates at outer rear edge 708g, which defines the second seal end 708b.

In the mounted position, the front seal end 708a is axially displaced away from front flange 216. Further, the second seal end 708b engages the front flange 216.

More particularly, the seal's tapered portion 708f facilitates dispelling of fluids and other detritus from around shaft 520. For example, owing to the angled shape of tapered portion 708f, fluids and solids may slide away from around the shaft 520. In turn, this minimizes pooling of fluids and detritus around shaft 520, and thereby prevents ingress of fluids and detritus into housing 200. Additionally, as the shaft 520 rotates, the flinger seal 708 also rotates. In rotating, the tapered portion 708f may further "fling" away fluids and detritus away from shaft 520. This is shown, by way of example, in FIGS. 7K-7N, whereby fluid 736 is expelled by rotation of the tapered portion 708f.

The tapered portion 708f may taper at any suitable tapering angle 730, relative to the axis 709 (FIG. 7C). In some embodiments, the tapering 708f may be at an angle of between 0.1° to 89.9° relative to axis 709. In at least one embodiment, the tapering angle 730 is substantially 45° relative to axis 709.

The flinger seal 708 may also be formed of any suitable material, e.g., metal, plastic or the like.

As exemplified in FIG. 7B, seal assembly 704 may also include a contact seal 712. Contact seal 712 may provide still an additional layer of ingress protection to the radial shaft seal 716, over the protection offered by the flinger seal 708.

As shown, contact seal 712 is disposed underneath of the flinger seal 708, and protects against fluids and detritus that leak underneath the flinger seal 708. In this manner, contact seal 712 provides further protection for the radial shaft seal 716, against leaking fluids and detritus.

As exemplified, the contact seal 712 is disposed below the flinger seal's inner surface 708d, and within the void area 724 formed underneath the flinger seal. The contact seal 712 may tightly wrap around the shaft 520, to prevent ingress into the motor housing interior.

FIGS. 7H-7J exemplify a non-limiting example design for the contact seal 716. As shown, contact seal 712 may have a front surface 712a, and an axially opposed rear surface 712b, along axis 713. An opening 718 extends between the front and rear surfaces 712a, 712b to accommodate the motor shaft 520. The seal opening 718 may have a diameter 722a (FIG. 7H) that is slightly smaller to the shaft diameter, to provide a tight fit engagement (e.g., the seal opening 718 may expand, and snap around the shaft 380 to provide the tight fit engagement).

In the mounted position, the contact seal's front surface 712a may engage with the inner surface 708d, of the flinger seal 708 (FIG. 7B). That is, the contact seal 712 may be disposed behind the flinger seal's planar portion 708e. Accordingly, the planar portion 708e can accommodate the shape and design of the contact seal 712.

The contact seal's rear surface 712 may engage with the outer surface 216a of front flange 216. To this end, the contact seal 712 may have an outer diameter 722b (FIG. 7H), that is larger than the diameter of the flange's shaft-receiving opening 308. This, in turn, allows the contact seal 712 to sit over the housing front flange 216.

As exemplified in FIGS. 7M and 7N, in this position configuration, contact seal 712 blocks fluids and detritus 736, which seep underneath the flinger seal 708, from further entering the motor housing 200.

A unique feature of the exemplified design is the ability of the flinger and contact seals 708, 712 to expel fluid and detritus—which seep underneath the flinger seal 708—overtime. For instance, as exemplified in FIG. 7N, centrifugal force—generated by rotation of the flinger seal 708 and contact seal 712 with shaft 520—slowly expel, or force out, fluid and detritus from underneath the flinger seal 708. This, in turn also prevents pooling of fluids and detritus under the flinger seal 708, which may also slowly degrade at least the contact seal 712. In other words, the centrifugal force provides for a self-cleaning ability of the seal assembly during motor operation.

In view of the above discussion, it will now be appreciated that the combination of the flinger seal 708 and contact seal 712 operate to protect the radial shaft seal 708 (e.g., the main sealing element), from wear and degradation as a result of: (i) the tapered design of the flinger seal 708, which prevent pooling around the shaft 520 by "flinging" away fluids or detritus; (ii) the contact seal 712, positioned to block ingress fluids or detritus seeping underneath the flinger seal; and (iii) the centrifugal force generated by rotation of the flinger and contact seals, i.e. with shaft 520, which expel fluids or detritus seeping underneath the flinger seal, thereby preventing further pooling of the fluids and detritus.

In particular, while conventional housing designs may only offer ingress protection in certain mounting orientations of the housing—the disclosed sealing assembly may provide ingress protection, in one of a number of mounting orientations (see e.g., FIGS. 7K-7N).

As stated previously, the flinger seal 708 and front flange 216 are additionally uniquely designed to accommodate for axial movement of the shaft 520 and pre-loaded axial spring 532. As explained herein, this is achieved through a groove, along the front flange 216, which accommodates axial movement of the flinger seal 708 with shaft 520. In particular, the flinger seal 708 may displace axially within the groove—e.g., as a result of movement of shaft 520—while still providing ingress protection.

Referring now to FIGS. 4G and 7B, as exemplified, the tapered portion 708*f*—of flinger seal 708—is disposed within an annular groove 356 on the front flange 216. Annular groove 356 is formed on the flange's exterior surface 216*a*, and at least partially surrounds shaft opening 308. Annular groove 356 may have a diameter 362, that is generally equal to the diameter 714*b* of the rear edge 708*g* of flinger seal 708 (FIG. 7E).

Figures 7F, 7G:
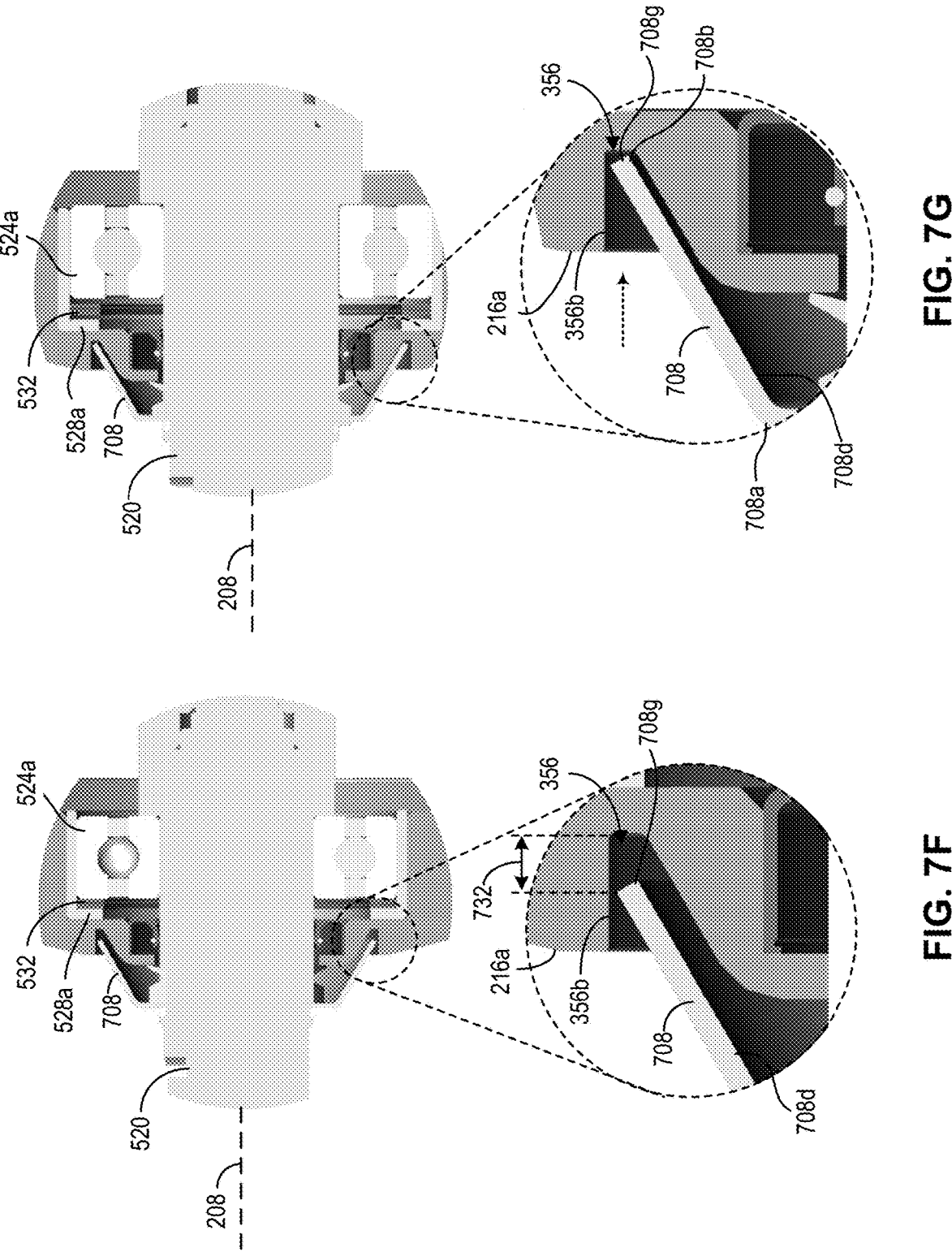
FIG. 7F is an enlarged view of a portion of the housing assembly and electric motor in FIG. 7A, taken along the section line 7B-7B' of FIG. 7A, and showing the flinger seal in an untranslated position.
FIG. 7G is an enlarged view of a portion of the housing assembly and electric motor in FIG. 7A, taken along the section line 7B-7B' of FIG. 7A, and showing the flinger seal in a translated position.
Figures 7O, 7P, 7Q:
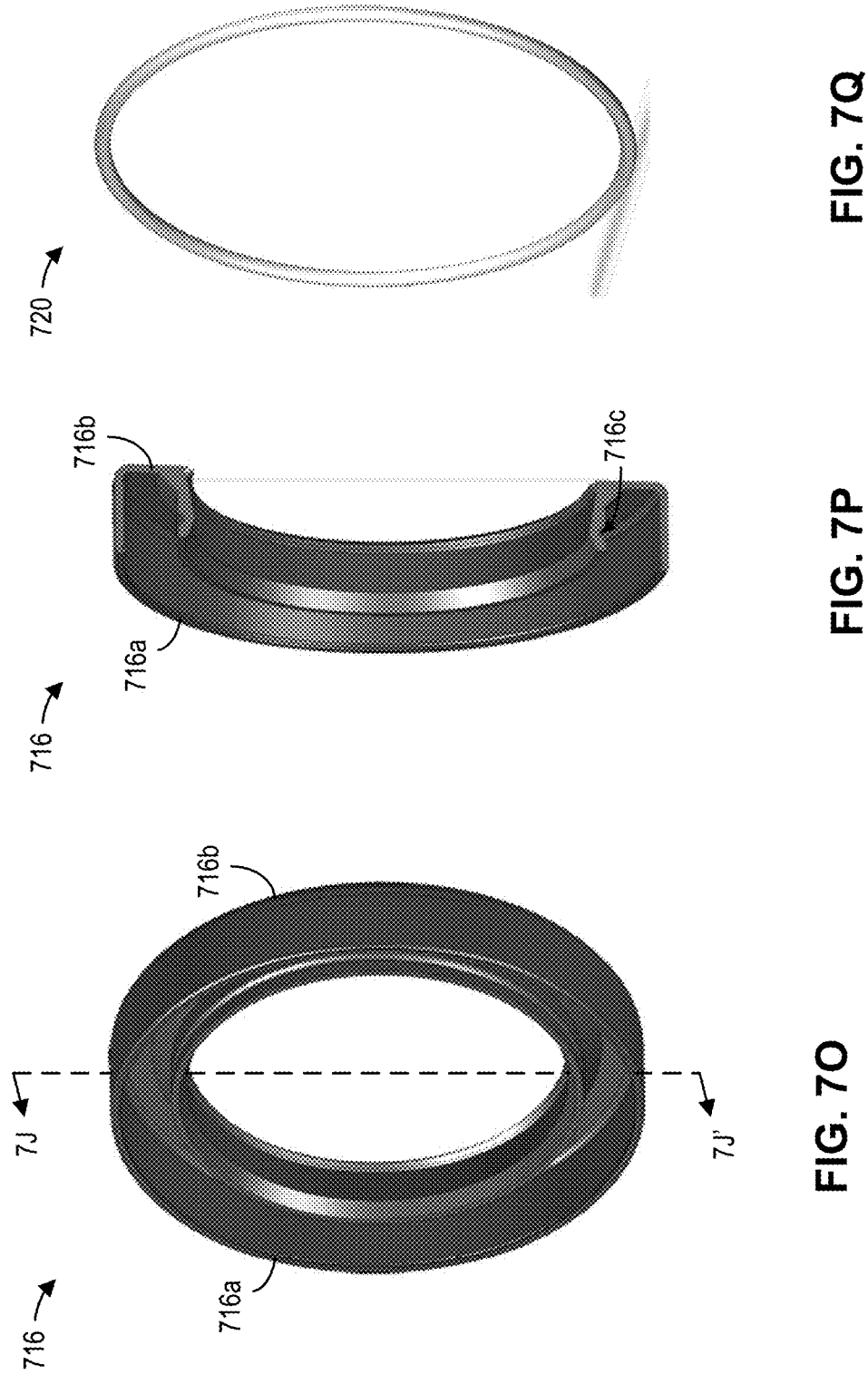
FIG. 7O is a perspective view of a radial shaft seal, in accordance with some example embodiments.
FIG. 7P is a perspective cross-sectional view of the radial shaft seal of FIG. 7O, taken along the section line 7J-7J' of FIG. 7O.
FIG. 7Q is a perspective view of an annular spring.

As exemplified in FIGS. 7F and 7G, groove 356 provides space for axial motion of the flinger seal 708, along housing axis 208. The axial motion is the result of the flinger seal 708 moving with the shaft 520—which can result from a number of causes (e.g., shaft vibration, thermal expansion/contraction or due to variability on manufacturing and fabrication of components). For instance, as shown in FIGS. 7F and 7G, the flinger seal 708 may translate axially within the groove 356, between an untranslated position (FIG. 7F) and a translated position (FIG. 7G).

In the translated position (FIG. 7G), the flinger seal 708 is axially translated toward the front flange 732, by a displacement distance 732. The axial displacement is a result of the shaft 520 moving inwardly. In turn, the flinger's tapered edge 708*g* also translates within groove 356 by displacement distance 732.

However, when the pre-loaded axial spring 532 contracts under its biasing force—e.g., to oppose axial movement of shaft 520—the flinger seal 708 reverses and translates axially away from the front flange 216, and back into the untranslated position (FIG. 7F). In this position, the flinger seal's tapered edge 708*g* translates axially outwardly, within groove 356.

In either case, the flinger seal's tapered edge 708*g* is always disposed within the groove 356 (e.g., irrespective of the shaft and pre-loaded axial spring position), which minimizes ingress of fluids and detritus, irrespective of the axial position of the flinger seal 708.

Here, it will be appreciated that, in the absence of groove 356, one of two configurations and outcomes are likely:

(a) In the absence of a groove, the flinger seal is deprived from space for further axial movement towards the front flange 216. Accordingly, the flinger seal 708 collides with the front flange 216 while attempting to move into the translated position (FIG. 7G). This, in turn, damages the flinger seal 708 and/or otherwise prevents axial displacement of the shaft 520 and axial spring 532.

(b) Alternatively, to accommodate the axial movement—in the untranslated position, the flinger seal 708 may be initially spaced away from the front flange surface 216. In other words, in the untranslated position, there may be no contact between the flinger seal 708 and the front flange 216. By initially spacing the flinger seal 708 away from front flange 216, the flinger seal 708 is provided space to then move into the translated position (FIG. 7G), and without colliding with the front flange 216. In this case, however, as the flinger seal 708 is initially spaced away from the front flange 216 in the untranslated position—liquids and detritus may easily penetrate in the space between the flinger seal 708 and the front flange 216. Accordingly, in the untranslated position, the flinger seal 708 offers no ingress protection.

Accordingly, the use of the annular groove 356, which accommodates axial movement of the tapered flinger seal 708, addresses the above-noted challenges. In particular, the flinger seal's outer edge 708*g* is always recessed within the groove's inner surface, thereby ingress protection is always provided, irrespective of the axial position of the flinger seal 708.

In more detail, as exemplified in FIG. 4G, groove 356 is shaped to generally complement the tapered flinger seal 708. For instance, groove 356 may have a radial inner surface portion 356*a*, which tapers similar to the flinger seal's tapered portion 708*f*.

In some cases, the groove's inner portion 356*a* may have a tapering angle 360, e.g., relative to axis 208, substantially equal to tapering angle 730 of the flinger seal 708. In particular, the tapered design of the groove 356 provides an appreciated advantage of ensuring that liquids and detritus do not pool around the contact seal 712. Groove 356 may also have a radial outer surface portion 356*b* that is substantially planer, e.g., parallel to housing axis 208.

Groove 356 may also have a depth dimension, e.g., defined along axis 208, that is substantially equal to the displacement distance 732 (FIG. 7G).

As exemplified in FIG. 4G, a portion of the front flange 216 may also define a sloped section 372. The sloped section 372 may be disposed on the front flange surface 216*a*, and may slope radially away from the groove 356 (e.g., the slope has a higher elevation around the groove 356). The sloped section 372 can provide further ingress protection around the shaft opening 308. For example, the sloping can further prevent pooling of fluids and detritus by allowing fluids and detritus to slide away from shaft opening 308. In one example, fluids and detritus dispelled by the tapered flinger seal 708, are further dispelled by the flange's sloped section 372.

Similar to the flinger seal 708, the contact seal 712 may also accommodate axial movement of shaft 520. For instance, as exemplified in FIG. 7H, the contact seal 712 may have a radially indent 712*e*, and may have a partial cone-like shape. The radial indent 712*e* may provide some elasticity to the seal 712 to accommodate expansion and compression of the seal, owing to axial movement of the flinger seal 708 (FIGS. 7F, 7G).

vi. Example Method of Mounting Motor Assembly Inside Housing Assembly

The following is a discussion of a method for mounting the motor assembly inside the housing, which may be used by itself or with one or more other aspects of this disclosure.

As provided herein, the disclosed method has a number of appreciated advantages, including: (i) enabling more accurate alignment between housing 200 and the motor assembly 502; (ii) loosening manufacturing tolerances for dimensions of the housing 200. In particular, in contrast to conventional designs (e.g., FIG. 1), a tight fit is not required between the housing 200 and the motor assembly 502. This, in turn, simplifies and reduces manufacturing costs; (iii) improving ingress protection by more effectively sealing air gaps and voids inside the housing 200 (e.g., air voids 114 in FIG. 1). This, in turn, can result in less external contaminants being drawn into the housing, and less build-up of moisture; (iv) ease of maintenance of the motor assembly 502. In particular, the disclosed methods overcome drawbacks in previous designs, whereby injected encapsulant prevents opening of the housing end flanges for accessing and maintaining the rotor assembly. Further advantages will become appreciated in view of the foregoing discussion.

Reference is now made to FIG. 8, which shows a process flow for an example method 800 for mounting a motor assembly to the motor housing. Concurrent reference is also made to FIGS. 10-24, which further illustrate the various acts of method 800.

Figures 9A, 9B, 9C:
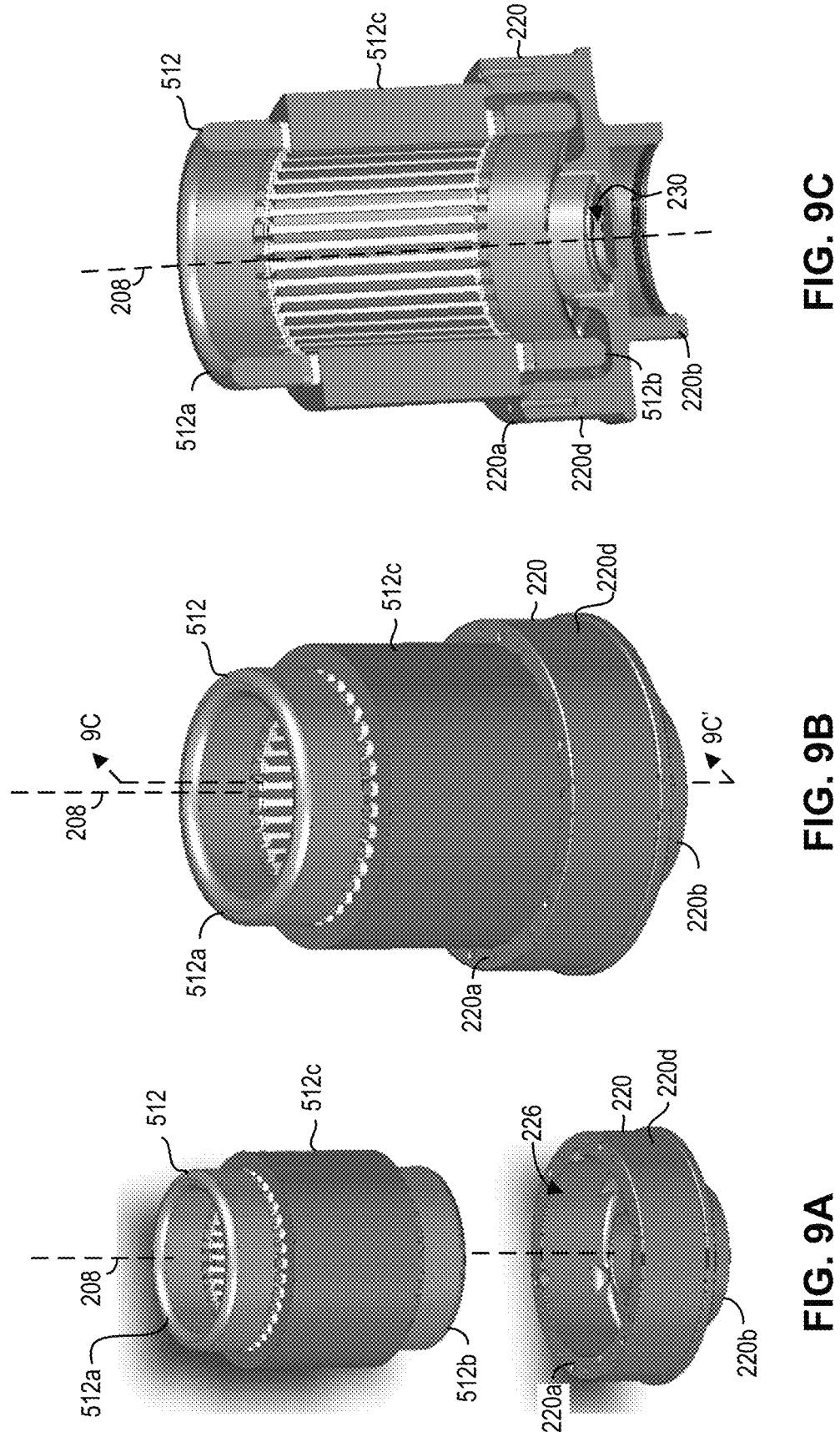
FIG. 9A is a partially exploded perspective view of a stator assembly and housing rear flange.
FIG. 9B is a perspective view of a stator assembly received in the housing rear flange.
FIG. 9C is a cross-sectional view of the stator assembly and rear flange in FIG. 9B, taken along the section line 9C-9C' of FIG. 9B.

At 802, the stator assembly 512 is mounted (or positioned) over the rear flange 220. For example, as shown in FIGS. 9A-9B, the second end 512b, of the stator assembly 512, is received along housing axis 208 through the first end 220a of rear flange 220. The second stator end 512b may engage the rear flange 220 as previously described with respect to the discussion in FIGS. 3A-3B and 4J-4O.

As exemplified, the rear flange 220 may comprise a hollow interior 226 for receiving the stator assembly 512. The hollow interior 226 is defined by engagement sidewall portion 220d. In at least one embodiment, the engagement portion 220d protrudes axially, e.g., along axis 208, to act as a support structure for retaining the second stator end 512b. That is, the engagement portion 220d may provide a function in positionally securing, at least the second end 512b of the stator assembly 512. In the exemplified embodiment, the engagement portion 220d extends to at least the position of the stator stack 512d.

With continued reference to FIG. 8, at 804, a compression ring may be mounted and secured over the stator assembly 512.

For example, as shown in FIGS. 10A-10D, compression ring 1004 is axially mounted over the first stator end 512a, along housing axis 1004. Compression ring 1004 may rest over a portion of the stator 512, e.g., over the stator stack 512d proximal the first stator end 512a. As provided herein, compression ring 1004 provides a number of functions, including positionally securing the stator assembly 512 inside the housing assembly 200, such as to prevent displacement of the stator assembly 512, e.g., due to vibration. Compression ring 1004 also acts to hold the rotor and stator assemblies in radial alignment, inside the housing 200.

FIGS. 11A-11E illustrate various perspective and cross-sectional views of the compression ring 1004. As shown, compression ring 1004 extends between a first and second end 1004a, 1004b, respectively.

One or more openings 1008 extend through the compression ring 1004, between the first and second ends 1004a, 1004b. Openings can include first openings 1008a and second openings 1008b. As provided in greater detail, first openings 1008a receive fasteners which secure the compression ring 1004 to the housing assembly 200. Further, second openings 1008b allow passing through of the elongated fasteners 604 (FIGS. 6A, 6B), which secure the housing assembly 200 in the coupled state. To this end, the compression ring 1004 may have a thickness which accommodates the diameter of openings 1008.

Figures 10A, 10B, 10C, 10D:
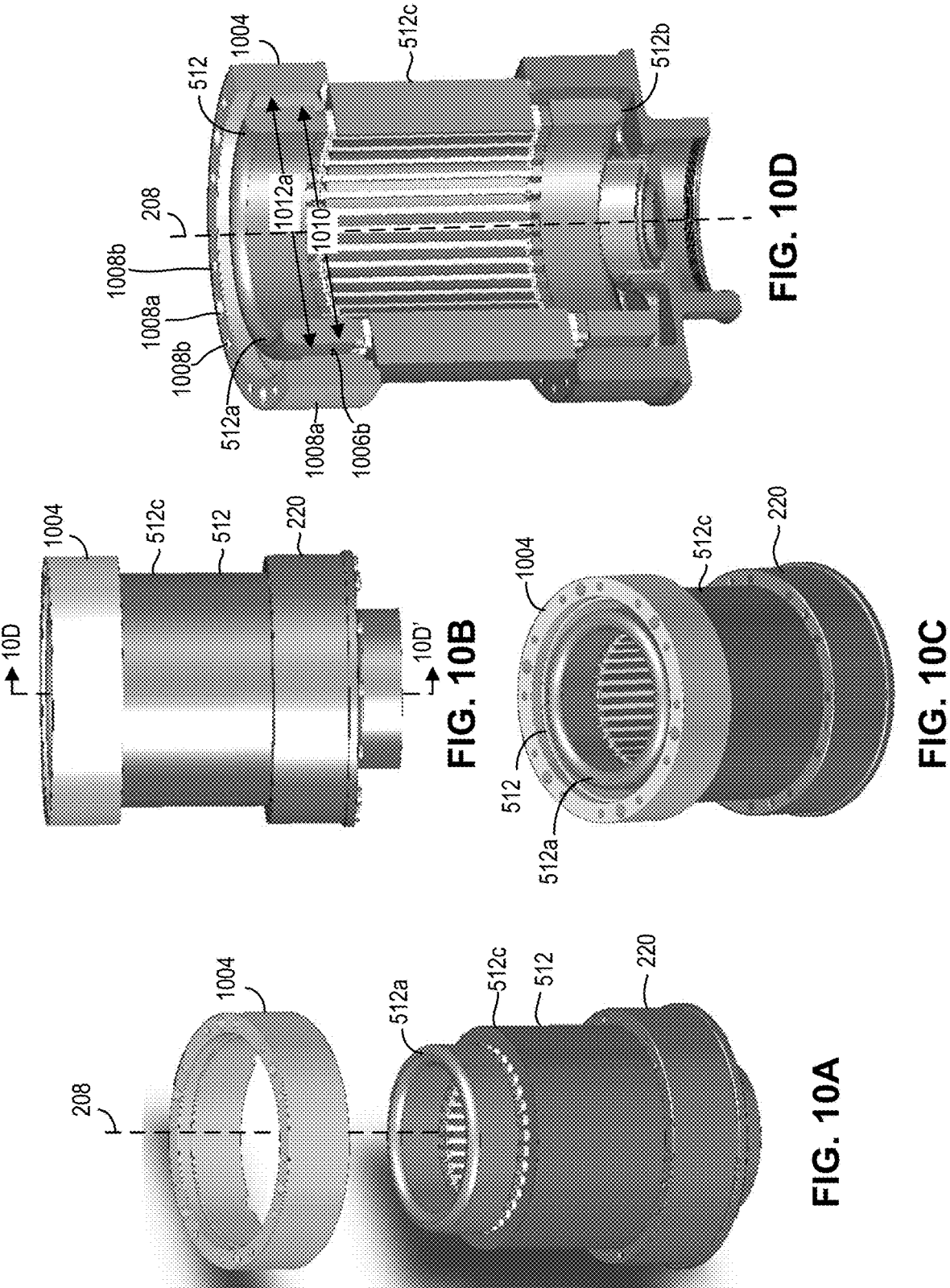
FIG. 10A is a partially exploded perspective view of a compression ring, stator assembly and housing rear flange.
FIG. 10B is a side elevation view of the compression ring positioned over a stator assembly and housing rear flange.
FIG. 10C is a perspective view of the compression ring positioned over a stator assembly and housing rear flange.
FIG. 10D is a perspective cross-sectional view of the compression ring positioned over the stator assembly and housing rear flange, taken along the section line 10D-10D' of FIG. 10C.

More generally, as exemplified, compression ring 1004 includes an exterior surface 1006a and an opposed interior surface 1006b. In the mounted position, the interior surface 1006b is directed towards the stator assembly 512 (FIG. 10D). In at least one embodiment, as exemplified in FIG. 11C, the compression ring 1004 may have an internal diameter 1012a, which is substantially equal to the outer diameter 1010 of the stator assembly 512 (e.g., outer diameter of the windings of the stator stack 512c) (FIG. 10D). In this manner, the compression ring 1004 provides a tight-fit engagement around at least a portion of the stator assembly 512.

Figures 12A, 12B, 12C, 12D:
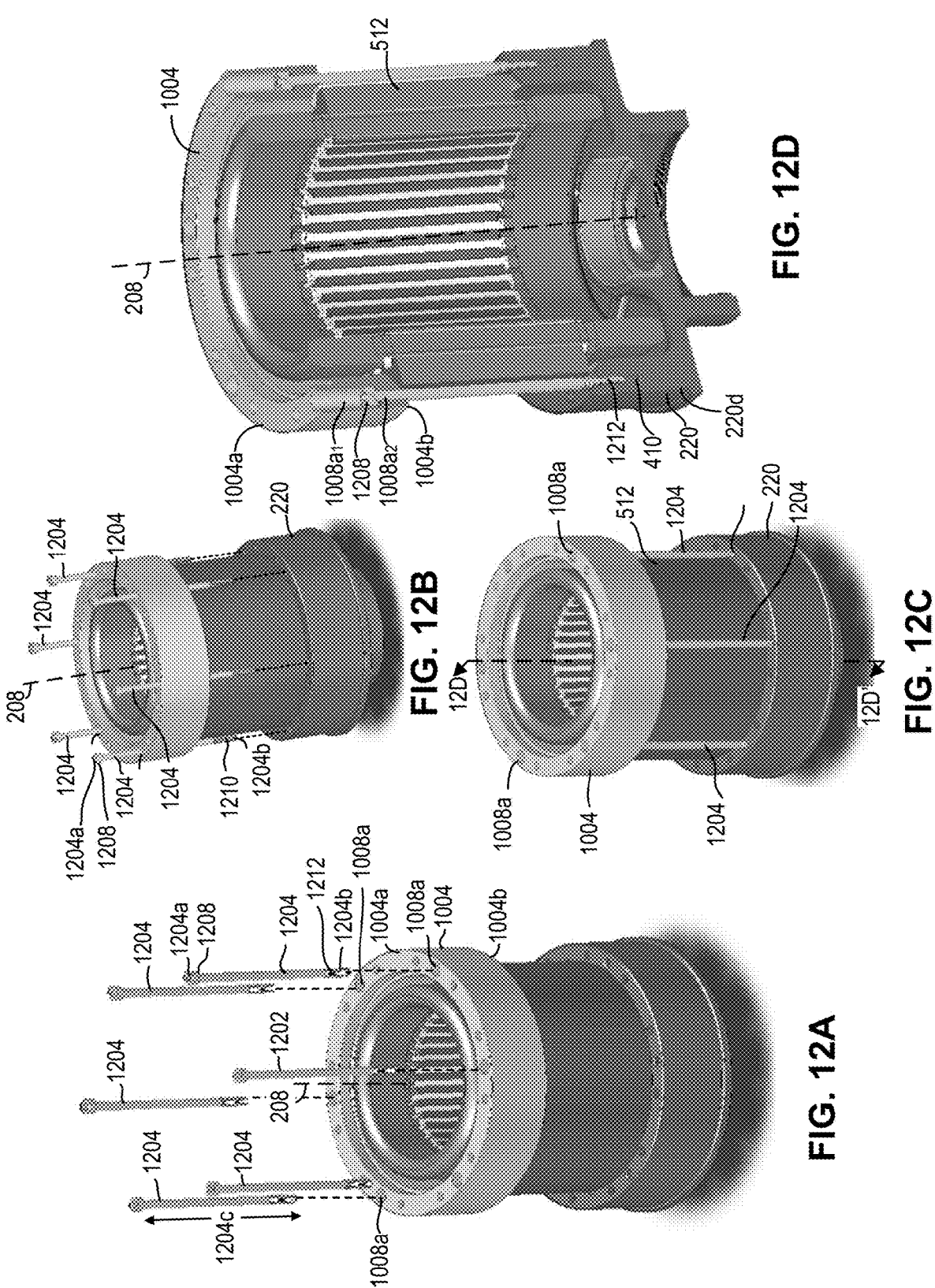
FIG. 12A is a partially exploded perspective view showing one or more compression ring fasteners and a compression ring, stator assembly and housing rear flange.
FIG. 12B is a partially exploded perspective view showing one or more compression ring fasteners partially received through the compression ring positioned over a stator assembly, which itself is disposed over a rear housing flange.
FIG. 12C is a perspective view of an compression ring secured to the rear housing flange.
FIG. 12D is a perspective cross-sectional view, taken along the section line 12-12D' of FIG. 12C.

FIGS. 12A-12D exemplify an example process for securing the mounted compression ring 1004 over the stator assembly 512 during act 804. As shown, one or more compression ring fasteners 1204 are used to secure the compression ring 1004. In the exemplified embodiment, each fastener 1204 may extend, along an axis parallel to housing axis 208, between a respective first and second fastener end 1204a, 1204b. Each fastener 1204 may be inserted through a first opening 1008a of compression ring 1004 (e.g., via the first end 1004a of the compression ring 1004). The fasteners 1202 may then pass through the openings 1008a until they engage rear flange 220, i.e. along housing axis 208 (FIGS. 12C, 12D).

Figure 4N:
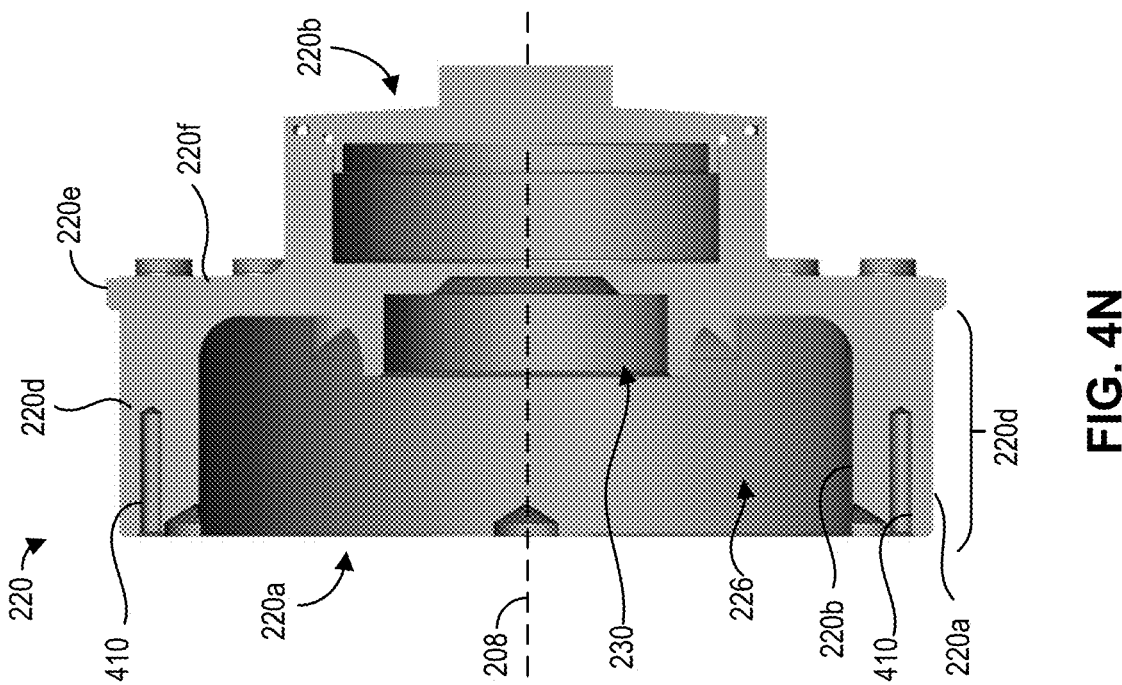
FIG. 4N is a cross-sectional elevation view of the rear end flange member, taken alone the section line 4N-4N' of FIG. 4J.

As best exemplified in FIGS. 4N and 12D, rear flange 220 includes one or more corresponding fastener-receiving openings 410. Fastener-receiving openings 410 receive the compression ring fasteners 1204.

In more detail, as exemplified in FIG. 4N, the fastener openings 410—on the rear flange 220—extend axially, parallel to housing axis 208. In the exemplified embodiments, openings 410 extent at least partially through the sidewall 220d defining the engagement portion.

Accordingly, each compression ring fastener 1204 may extend between a respective opening 4008a, in the compression ring 1004, and a corresponding opening 410 in the rear flange 220. Opening 410 in the rear flange 220 may axially align with compression ring openings 4008a.

As shown in FIG. 12A, each fastener 1204 may have an axial length dimension 1204c, that allows the fastener 1204 to extend between the compression ring 1004 and the rear flange 220.

In some embodiments, each fasteners 1204 may include a second distal end 1204b which comprises a thread portion 1212 (FIGS. 12A and 12D). This threaded portion 1212 may threadedly engage with threads in the fastener-receiving holes 410, in rear flange 220.

Further, each fastener 1204 may include a head portion 1208, proximal the first fastener end 1204a. As best exemplified in each of FIGS. 11E and 12D, the compression ring openings 1008 may have a variable axial diameter (e.g., they may be counterbored). For example, a first opening portion 1008a₁ may have a wider diameter than a second opening portion 1008a₂. The smaller second opening portion 1008a₂ prevents the head portion 1208 and the fastener 1208, from sliding entirely through compression ring 1004.

Once the fasteners 1204 engages corresponding fastener-receiving holes 410, in rear flange 200—a user may engage a driver (e.g., a screw driver) to rotate the fastener head 1208, such as to screw the fasteners 1204 into engagement with the rear flange 220. In this manner, the fasteners 1204 secure the compression ring 1004 in the mounted position, to the rear flange 220. In some cases, the fasteners 1208 is initially only loosely tightened at this stage.

Figure 4M:
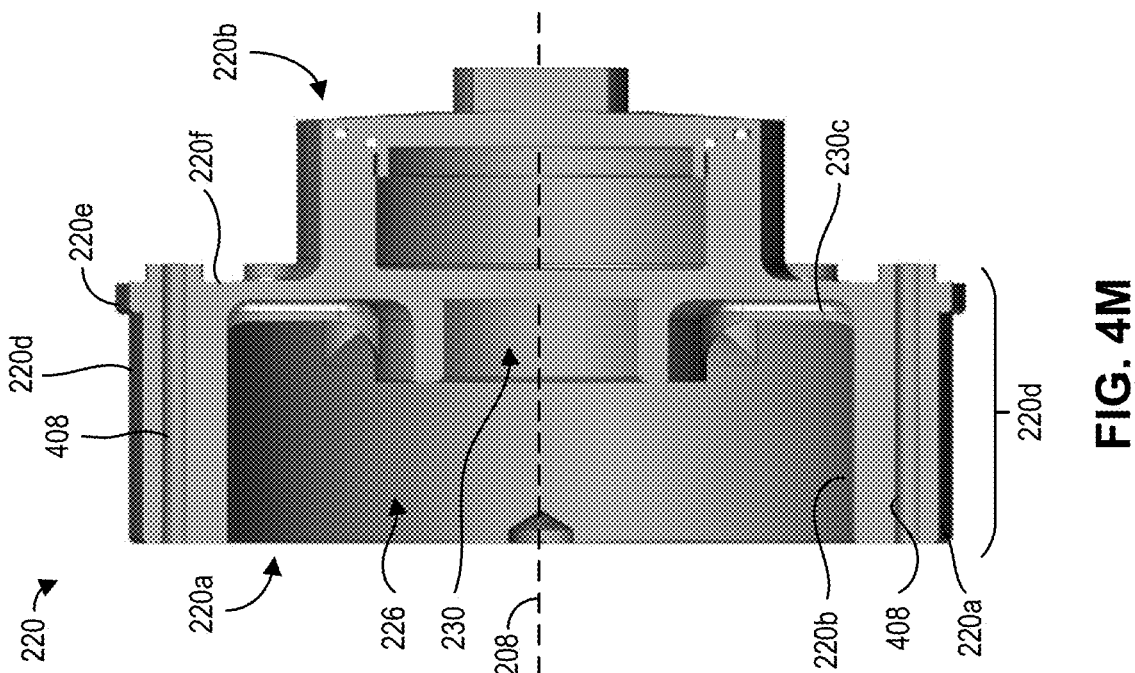
FIG. 4M is a cross-sectional elevation view of the rear end flange member, taken alone the section line 4M-4M' of FIG. 4J.

It will now be understood, with reference to FIGS. 4L-4N, that the rear flange 220 has two sets of fastener-receiving openings. The first set of openings 408 (FIG. 4M) were previously described as receiving housing fasteners 604 (FIGS. 6A-6C), for securing the housing assembly 200. The second set of openings 410 (FIG. 4N) receive compression ring fasteners 1204 (FIGS. 12A-12D). As exemplified in FIGS. 4J and 4L, first and second openings 408 and 410 are spatially separated.

As exemplified in FIG. 12D, once the compression ring 1004 is secured by fasteners 1204—the compression ring 1004 now positionally secures the stator assembly 512. In particular, the compression ring 1004 may prevent radial displacement of the stator assembly 512 relative to the housing assembly 200. In the exemplified embodiment, the compression ring 1004 may secure the first stator end 512a, while the rear flange (e.g., flange sidewall 220d) may secure the second stator end 512b.

As provided herein, an advantage of the compression ring 1004 is to provide for looser manufacturing tolerances in designing the housing body 212. More particularly, and as provided previously—in conventional housing designs (e.g., FIG. 1), a tight fit is required between the housing body 212 and the motor assembly 502. The tight or interference fit is required because the housing body 212 plays an important role in securing the motor assembly 502, and preventing displacement of the motor assembly 502 inside the housing, (e.g., preventing the assembly sliding in the housing during operation due to vibration). Accordingly, there are significant manufacturing costs and complexity in designing a housing body 212 that is dimensioned exactly to slide over the outside stator 512, and in perfect engagement with the rear flange 220 (e.g., diameter, length, etc.). Still further, when welding the housing components together, it is likely that the extreme welding temperature will deform the housing body 212, such that the housing body 212 is no longer in interference fit engagement with the motor assembly 512. Further, it is often necessary to use a sturdy and thick housing body 212, so as to enable the body 212 to effectively secure the motor assembly 512. This, in turn, increase the manufacturing cost and total weight of the housing 200.

In contrast, in the disclosed design, it is the compression ring 1004—rather than the housing body 212—that acts to positionally secure the motor assembly 502, and prevent displacement of the motor assembly 502 inside housing 200. In turn, there is no requirement for the housing body 212 to be machined with tight tolerances such as to provide an interference fit engagement between body 212 and the motor assembly 502. Accordingly, this significantly reduces manufacturing cost and complexity of the housing 200. As well, it is possible to use thinner and lighter weight housing 212, as the housing is again not performing an analogous function of securing the motor assembly 502, e.g., against vibration. Additionally, by allowing use of large housing bodies 212, the housing body 212 may accommodate various sizes of electric motors.

The compression ring 1004 also has other appreciated advantages when combined with the alignment plug 1404, as explained further below.

Referring back to FIG. 8, at 806, once the stator assembly 512 is positionally secured via the compression ring 1004, the body portion 212 may be slid over the stator assembly 512.

For example, as exemplified in FIGS. 13A-13D, the body portion 212 may be axially slid over compression ring 1004 and stator assembly 512, e.g., along housing axis 208. Body portion 212 may also engage and couple with rear flange 220, as previously explained.

Figures 11A, 11B, 11C, 11D, 11E:
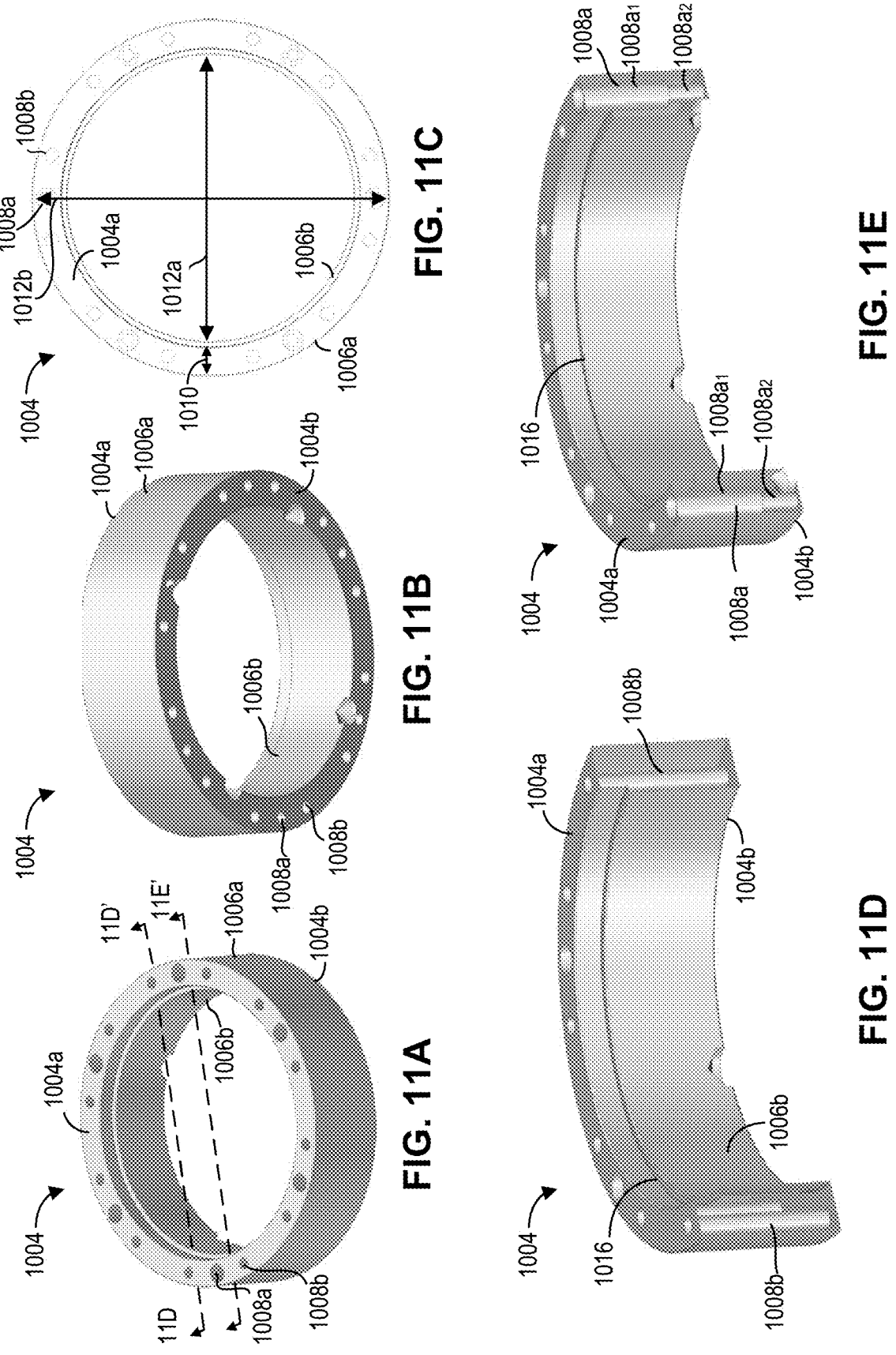
FIG. 11A is a top-down perspective view of a compression ring, according to an example embodiment.
FIG. 11B is a bottom-down perspective view of the compression ring.
FIG. 11C is a top plan view of the compression ring.
FIG. 11D is a perspective cross-sectional view of the compression ring, taken along the section line 11D-11D' of FIG. 11A.
FIG. 11E is a perspective cross-sectional view of the compression ring, taken along the section line 11E-11E' of FIG. 11A.
Figures 13A, 13B, 13C, 13D:
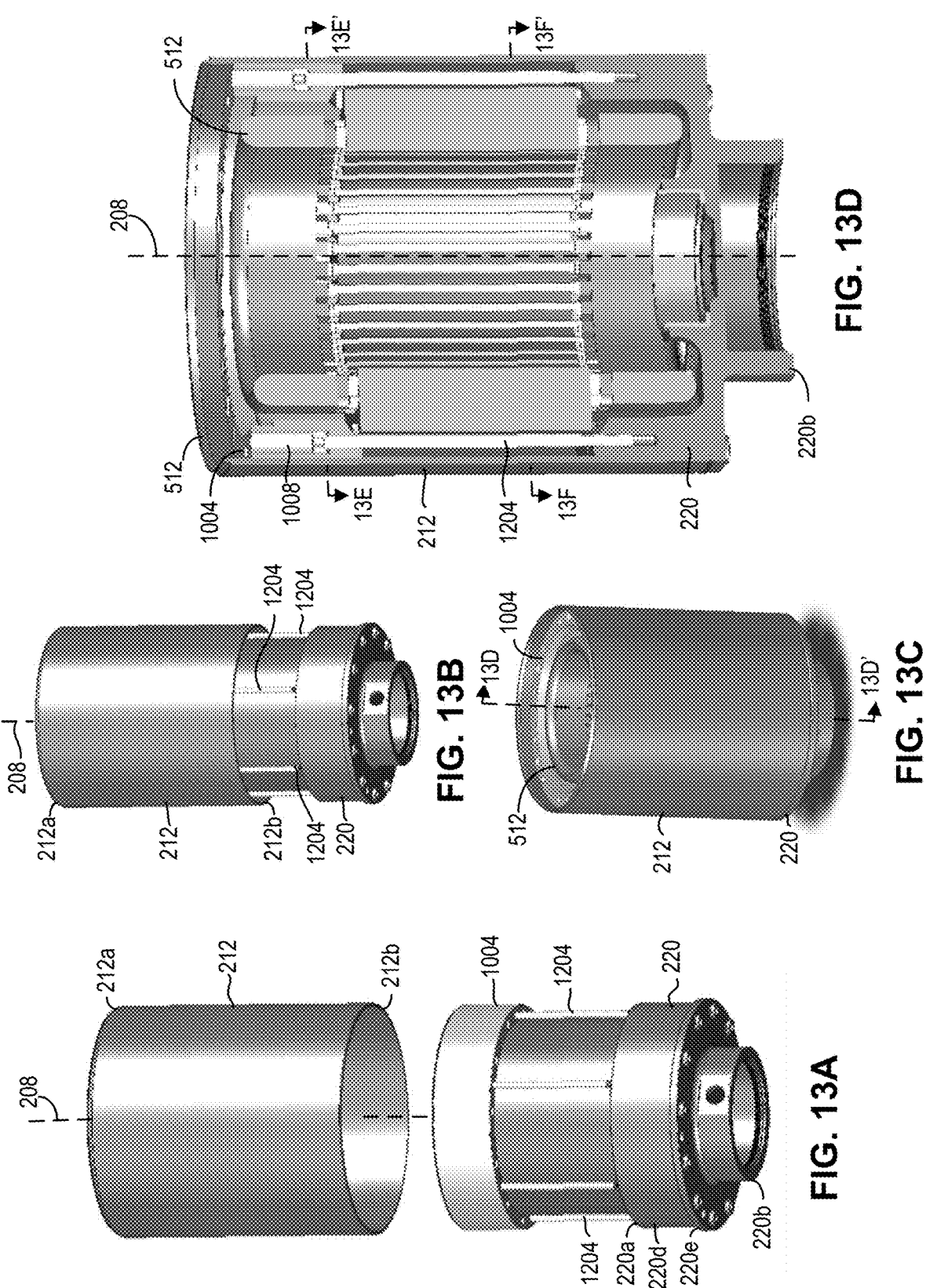
FIG. 13A is a partially exploded perspective view showing a housing body being translated over a stator assembly secured by a compression ring.
FIG. 13B is a partially exploded perspective view showing a housing body partially translated over a stator assembly secured by a compression ring.
FIG. 13C is a perspective view showing a housing body partially translated over the stator assembly secured by a compression ring.
FIG. 13D is a cross-sectional view, taken along the section line 13D-13D' of FIG. 13C.
Figure 13F:
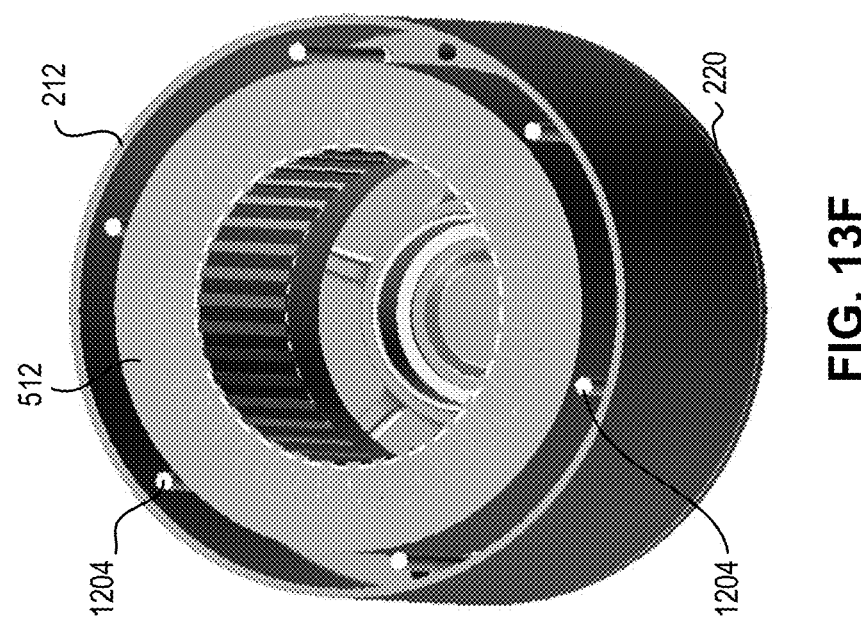
FIG. 13F is a cross-sectional view, taken along the section line 13F-13F' of FIG. 13D.
Figure 13E:
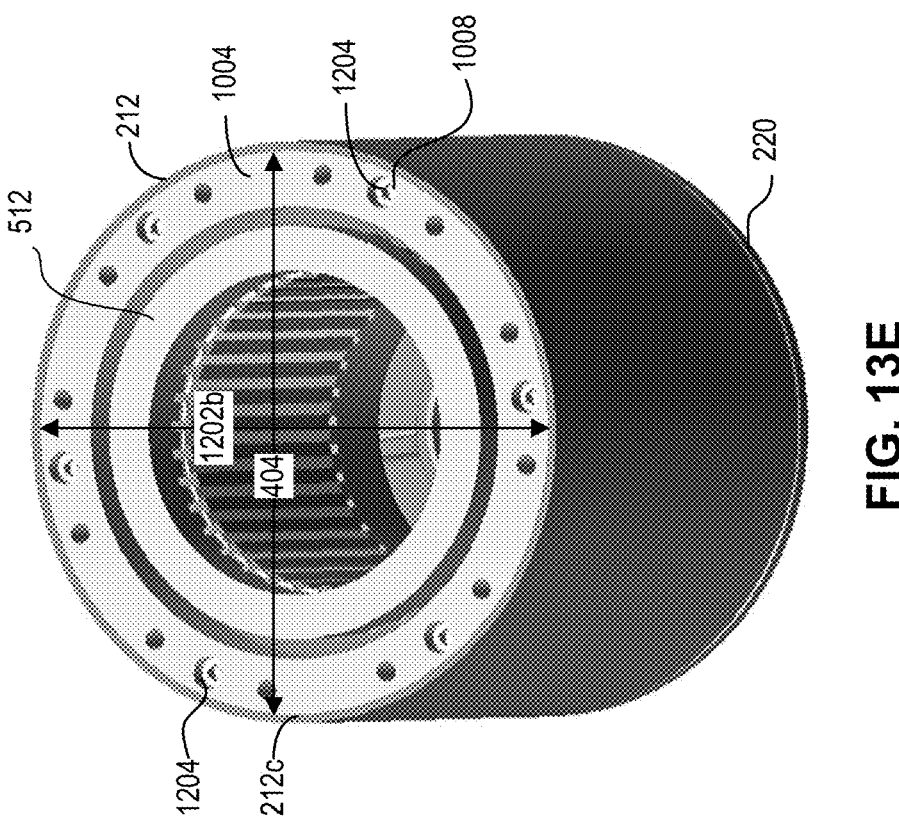
FIG. 13E is a cross-sectional view, taken along the section line 13E-13E' of FIG. 13D.

In the mounted position, the body portion 212 effectively surrounds the compression ring 1004 (FIGS. 13D-13F). That is, the internal diameter 404-of the body portion 212 (FIGS. 4B, 13E)—may be substantially equal or larger than the external diameter 1202b of the compression ring 1004 (FIGS. 11C, 13E).

At 808, in FIG. 8, an alignment plug 1404 may be slid through the stator assembly 512 (FIGS. 14A-14D). For instance, the alignment plug is slid, along housing axis 208, through the stator's hollow interior 512d.

As explained herein, the alignment plug may serve several functions, including: (i) in combination with the compression ring 1004, ensuring radial alignment of the stator assembly 512 relative to the bearing-receiving grooves/cavity 352 (e.g., FIG. 4E, on the front flange as shown in FIG. 4E) and 230 (e.g., FIG. 4I, on rear flange 220). In particular, this helps ensure that once the rotor assembly 508 is inserted into the housing, the rotor assembly 508 (which includes the bearing assemblies 524) are correctly concentrically aligned with the stator assembly 512. This, in turn, helps ensure that the air gap between the rotor and stator cores is consistent and tight. and (ii) providing an intermediate structure for guiding encapsulant injected into the housing assembly 200, to increase ingress protection.

In more detail, as exemplified in FIGS. 15A-15E, the alignment plug 1404 may extend between a first end 1404a and a second end 1404b. Each of the first and second ends 1404a, 1404b may define a respective surface. Each of the first and second ends 1404a, 1404b may be axially opposed along longitudinal axis 1408. When sliding plug 1404 through the stator assembly 512, longitudinal axis 1408 may align with housing axis 208.

As further exemplified, alignment plug 1404 may comprise multiple portions. These portions can include: (i) a head portion 1412a, (ii) an elongated stem 1412b, and (iii) an end portion 1412c.

Head portion 1404a and end portion 1412c may be disposed proximal the first and second plug ends 1404a, 1404b, respectively. Further, stem portion 1412b may extend between the head and end portions 1412a, 1412c. To this end, the alignment plug 1404 has a generally symmetric design about its axis 1408, so as to provide a symmetric alignment function.

The alignment plug 1404 is shaped to complement (e.g., accurately complement) the interior volume shape formed by the compression ring 1404, stator assembly 512 and the bearing-receiving groove 230 on the rear flange 220.

In particular, as exemplified, in the mounted position (FIG. 14E), head portion 1404a may rest over the compression ring 1004 (e.g., over the first end 1004a). The stem 1412b may extend axially through the hollow interior 512d of the stator assembly 512, from the first assembly end 512a to the second state assembly end 512b. The stem 1412b may have a length 1416a (FIG. 15C) slightly less than the housing length 206. Further, the end portion 1412c may be received inside the bearing-receiving groove 230, e.g., inside the rear flange 220.

Alignment plug 1404 may also be shaped for a near tight-fit engagement in the mounted position. For example, the stem 1412b may have a cross-sectional diameter 1416c (FIG. 15D), generally equal to the diameter inside the stator assembly 512d. The end portion 1412c may have a diameter 1416d generally equal to the diameter of the flange's bearing-receiving groove 230.

In the exemplified embodiment, the plug's head portion 1404a may rest over the compression ring 1004. For example, the head portion 1404a may have a diameter 1416b (FIG. 15D) greater than the compression ring's external diameter 1012b (FIG. 11C), but substantially equal to the housing body's internal diameter 404 (FIG. 4B).

Figures 15A, 15B, 15C, 15D, 15E:
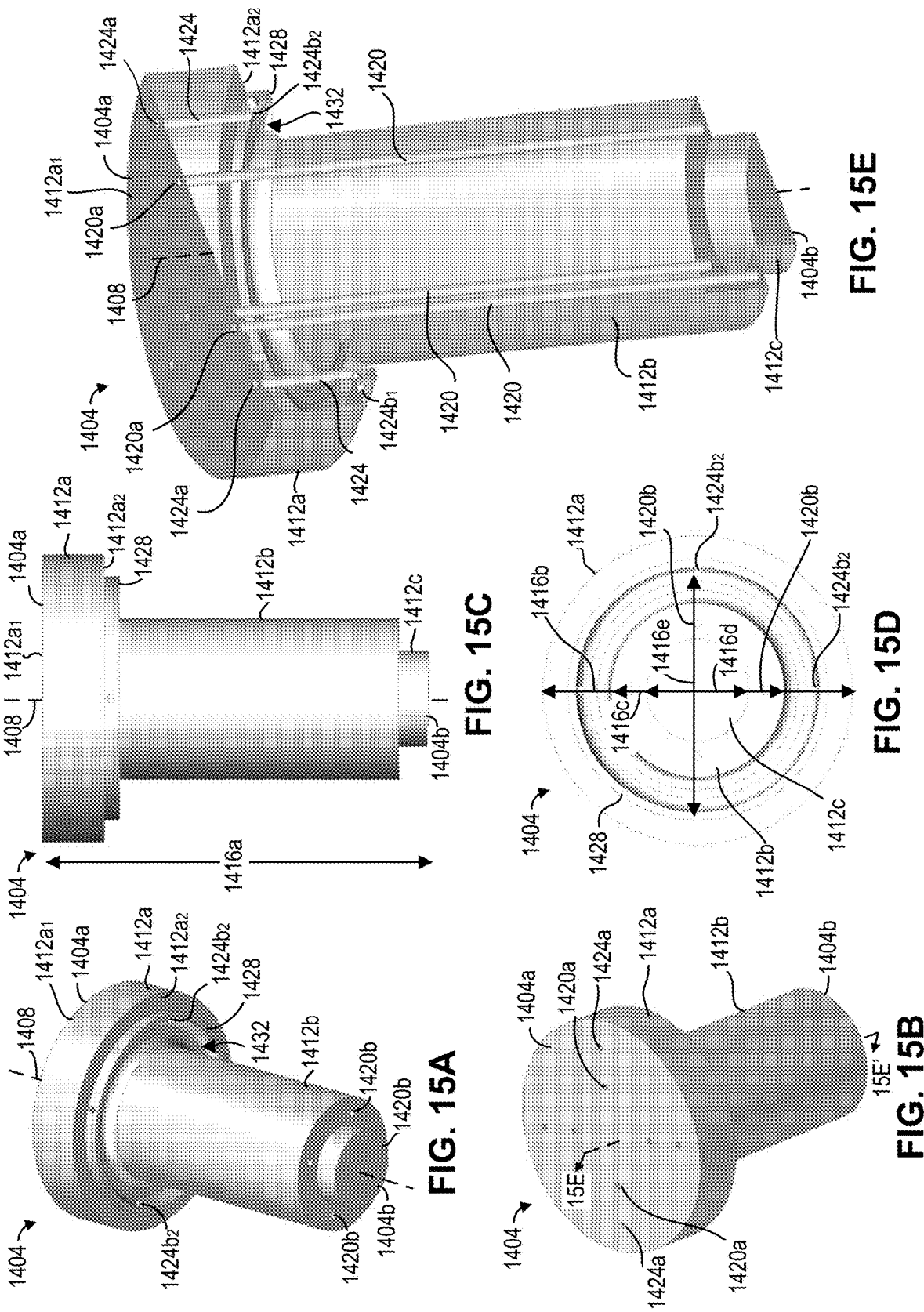
FIG. 15A is a bottom-up perspective view of the alignment plug, according to an example embodiments.
FIG. 15B is a top-down perspective view of the alignment plug.
FIG. 15C is a side-elevation view of the alignment plug.
FIG. 15D is a bottom plan view of the alignment plug.
FIG. 15E is a cross-sectional view of the alignment plug, taken along the section line 15E-15E' of FIG. 15B.

As best exemplified in FIGS. 15C and 15E, the plug's head portion 1404a may comprise a first head end 1404a₁ and a second head end 1404a₂.

Figures 14A, 14B, 14C, 14D, 14E:
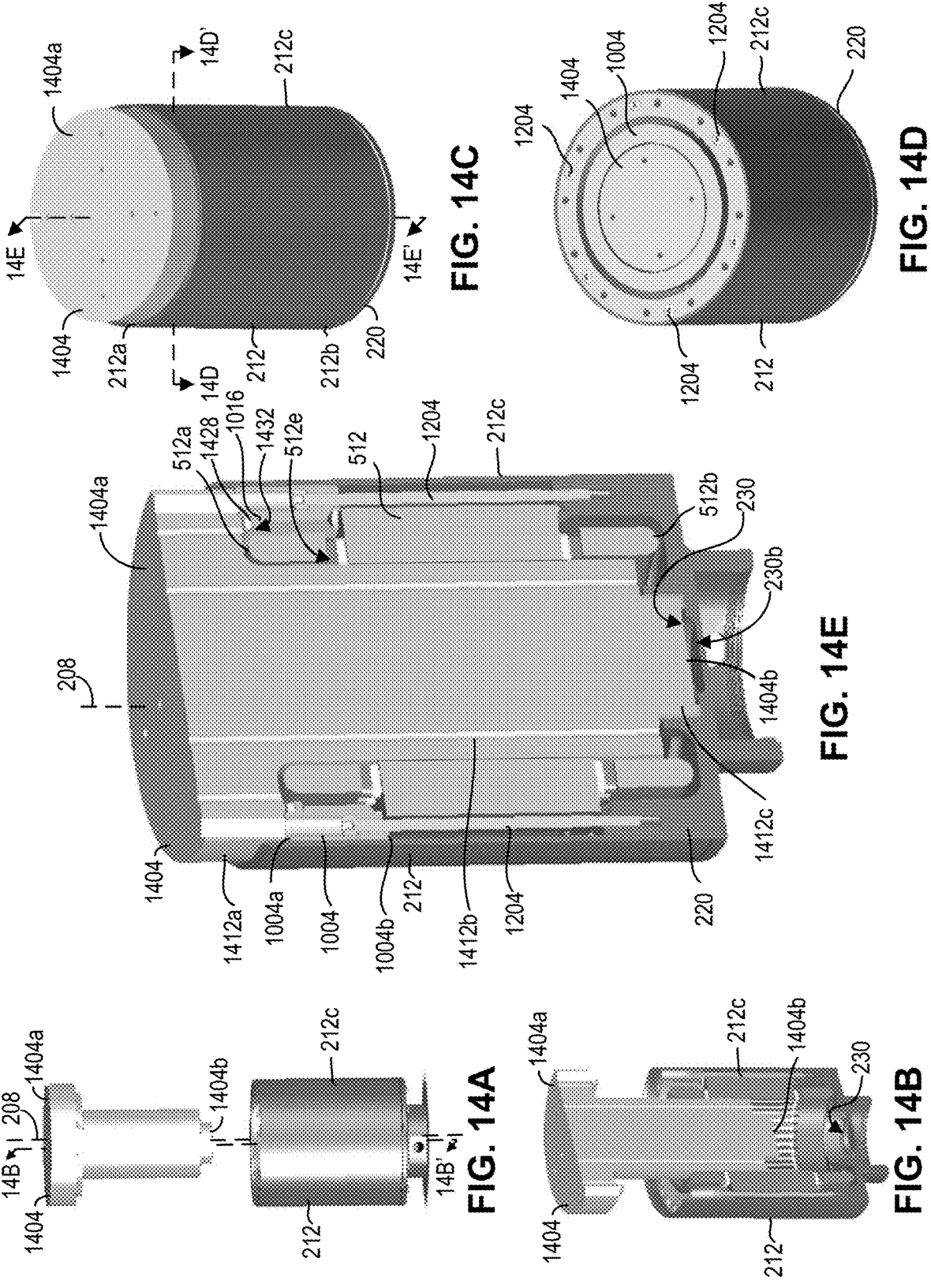
FIG. 14A is a partially exploded perspective view of an alignment plug being received inside of a housing assembly retaining a stator assembly.
FIG. 14B is a cross-sectional view, taken along the section line 14B-14B' of FIG. 14A, and showing the alignment plug partially received through the stator assembly.
FIG. 14C is a perspective view of the alignment plug received through the stator assembly.
FIG. 14D is a cross-sectional view, taken along the section line 14D-14D' of FIG. 14C.
FIG. 14E is a cross-sectional view, taken along the section line 14E-14E' of FIG. 14C.

Second head end 1404a2 may define an overhang portion 1428. As best exemplified in FIG. 14E, overhang 1428 is designed to wrap around the first stator end 512a (e.g., the inner stator). More particularly, overhang 1428 is received between the first stator end 512a and compression ring 1004. As shown in FIGS. 11D and 14E, in at least one embodiment, the plugs' overhang portion 1428 may sit over a portion of the compression ring 1004. For instance, in FIG. 11D, the compression ring 1004 may have a lip 1016, which at least partially encircles the compression ring's inner surface 1006b.

In view of the foregoing, in the mounted position, the alignment plug 1404 can better ensure radial alignment between the housing assembly 200, compression ring 1004 and bearing-receiving grooves 352, 230 (e.g., on the front and rear flanges 0). In particular, this achieved by a combination of: (i) the tight fit engagement of the plug's concentric head portion 1412a with the housing body 212 (FIG. 14E), (ii) the tight fit engagement of the plug's stem portion 1412b with the stator's hollow interior 512d; and/or (iii) the tight fit engagement of the plug's end portion 1412c with the rear flange's bearing-receiving groove 230.

In at least some embodiments, with everything radially aligned, the compression ring fasteners 1204 may be further tightened to better positionally secure the stator assembly 512.

Referring back to FIG. 8, at 810, once the alignment plug 1404 is in the mounted position, sealing encapsulant is injected through one or more of the plug's injection holes. The sealing encapsulant seals air gaps and voids surrounding the alignment plug 1402, and inside housing 200.

In particular, the alignment plug can include a number of injection feed passages (FIGS. 15A-15E). Injection passages 1420 are used to inject encapsulant. Alignment plug 1004 can also include one or more vent passages 1424. In the exemplified embodiment, the injection passages 1420 are provided radially inwardly of the vent passages 1242.

As exemplified, injection passages 1420 extend along axis 1408. Each injection passage 1420 can include a first opening end 1420a, disposed along the first plug surface 1404a, and an axially opposed second opening end 1420b, disposed along lateral surface 1404c. In the exemplified embodiment, only four injection passages are provided, however in other embodiments, any number of injection passages 1420 may disposed in the plug 1404.

Figure 16:
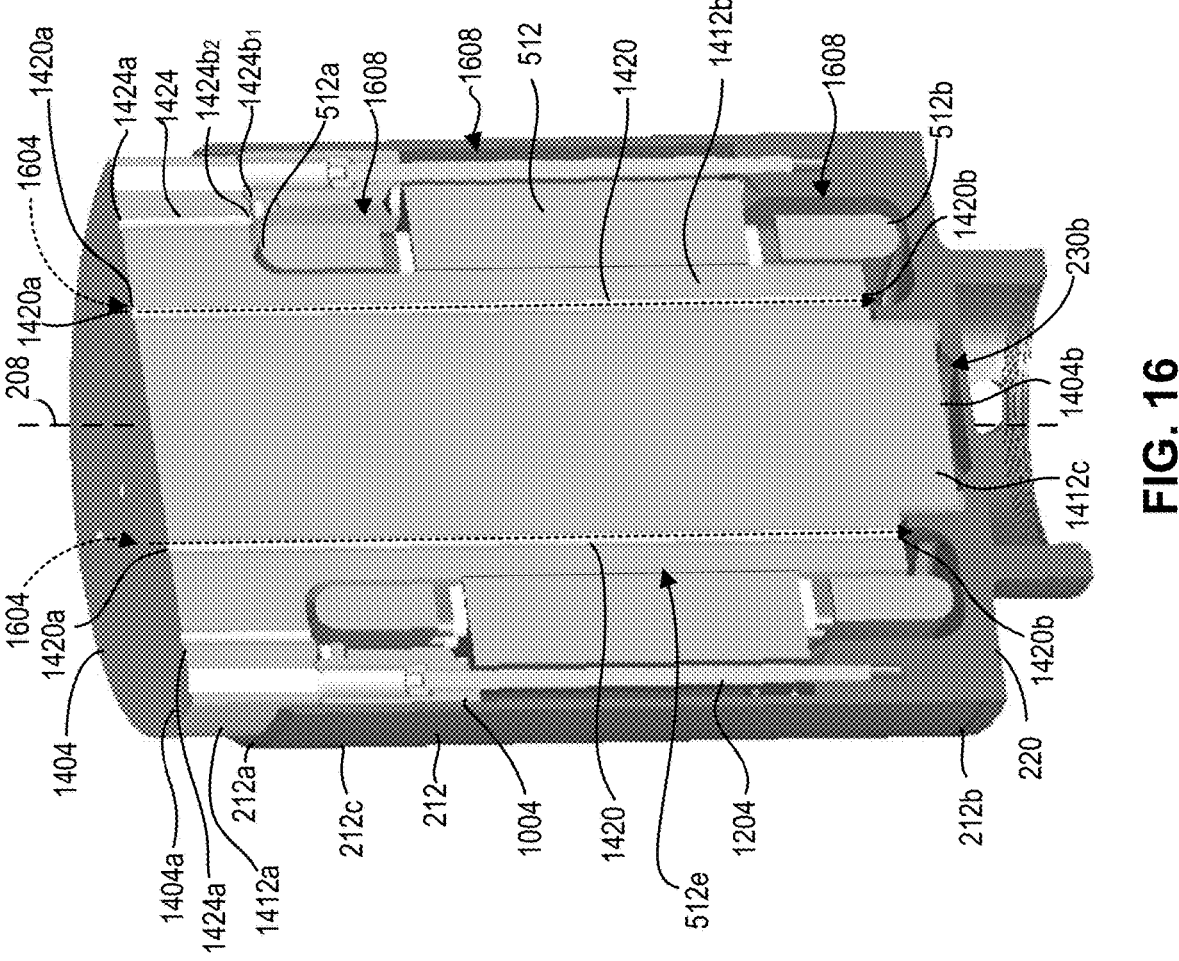
FIG. 16 is the cross-sectional view of FIG. 14E, and showing injection of encapsulant through the alignment plug.

As exemplified in FIG. 16, encapsulant 1604 may be fed through injection passages 1420, via the first opening 1420a. The encapsulant travels through the injection passages 1420, and exits through the second passage opening 1420a. From there, the encapsulant effectively fills the negative space (e.g., void) 1608 as between the stator assembly 512, body portion 212 and compression ring 1004.

In at least some cases, the alignment plug 1404 may also include the vent passages 1424. Vent passages 1424 may also extend axially along axis 1408. Each vent hole 1424 also includes a first opening end 1424a disposed along the plug's first surface 1404a, and a second opening end 1420b disposed in the previously-described overhang portion 1428. As the alignment plug 1404 generates positive seal, the vent passages 1424 allow venting to enable injection of the encapsulant. As exemplified in FIGS. 15A, 15D and 15E, in some embodiments, there may be two second opening ends 1420b1, 1424b2, disposed along a radially exterior and interior surface of the overhang edge 1428.

Figure 17:
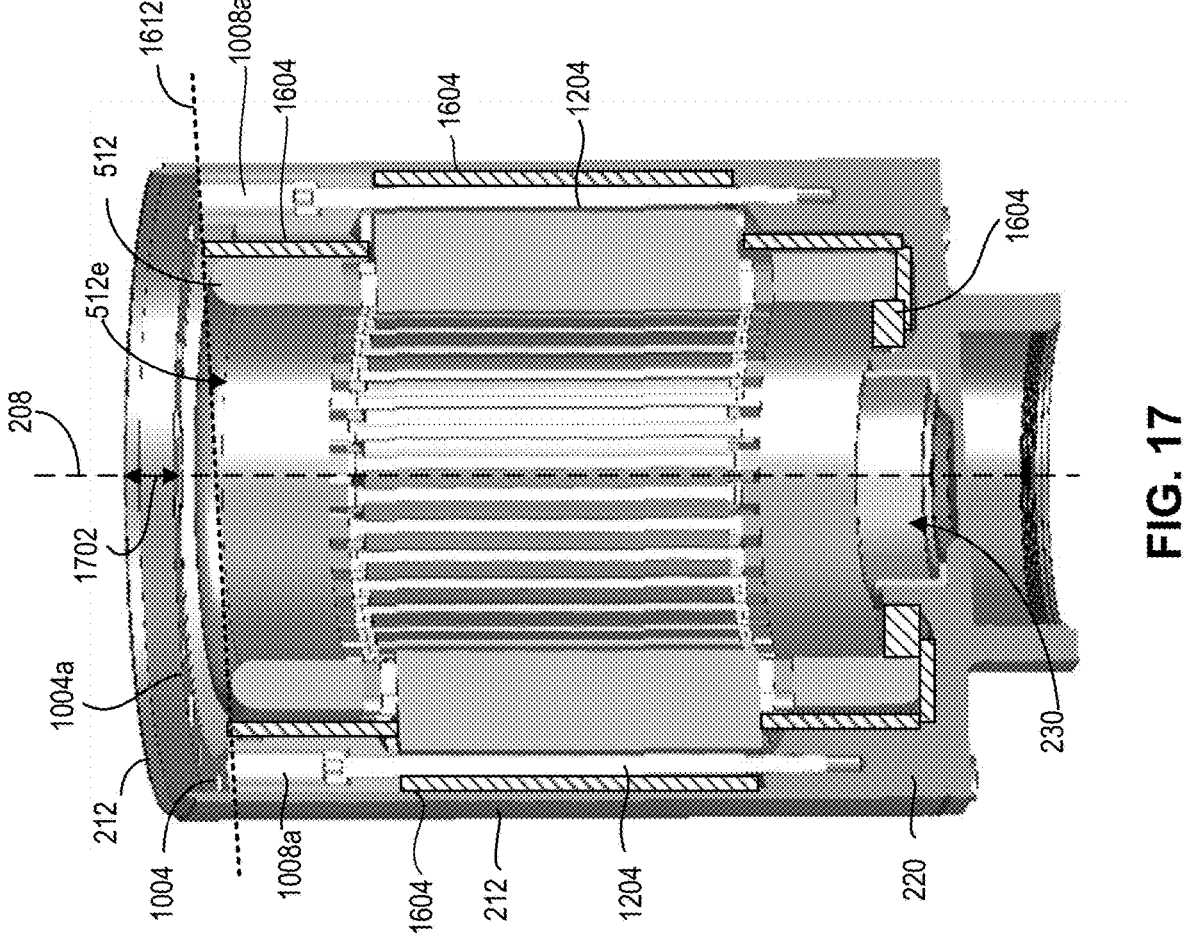
FIG. 17 is the cross-sectional view of FIG. 13D, and showing encapsulant inside the housing assembly.

Referring back to FIG. 8, at 812, the alignment plug 1404 is axially removed (FIG. 17). In some cases, to facilitate removal of the alignment plug—the alignment plug 1404 may be initially coated with a release agent prior to act 808. This, in turn, prevents the alignment plug 1404 from sticking to the encapsulant 1604, thereby preventing later removal at act 812.

As exemplified in FIG. 17, once the alignment plug 1404 is removed, the encapsulant 1604 fills the area previously defining the negative space 1608, around the stator assembly 512.

It will now become apparent that the alignment plug 1404 is designed to block the encapsulant from entering inside the stator assembly 512d, or otherwise the area to be occupied by the rotor assembly 508. In this manner, the rotor assembly 508 can be inserted through the stator assembly, once the alignment plug 1404 is removed.

Additionally, the alignment plug 1404 is also designed to block encapsulant from entering the bearing-receiving cavity 230, located in the rear flange 230. In turn, the cavity 230 can receive the rotor's bearing assembly 524b.

Still further, alignment plug 1404 blocks the encapsulant from entering openings 1008a in compression ring 1004. This is because the plug's head portion 1412a rested over the compression ring 1404. In this manner, even after injecting encapsulant, the compression ring fasteners 1204 are still accessible to be removed (e.g., via openings 1008a). This, turn, facilitates removing the compression ring 1404 and/or stator assembly 512 if desired.

In particular, owing to the design of the alignment plug 1404—the encapsulant 1604 only reaches the axial level 1612 (FIG. 17), which is disposed slightly below the first end 1004a of the compression ring 1004. In turn, this leaves an axial spacing 1702, which is not occupied by encapsulant. The advantage of the encapsulant-free axial spacing 1702 will become shortly apparent herein. Additionally, it will be appreciated that the alignment plug 1404 is generally shaped to resemble the inner surface of the end cap so as to minimize air voids.

Referring back to FIG. 8, at 814, the rotor assembly 508 is inserted into the interior void 512d of the stator assembly 512.

Figure 18B:
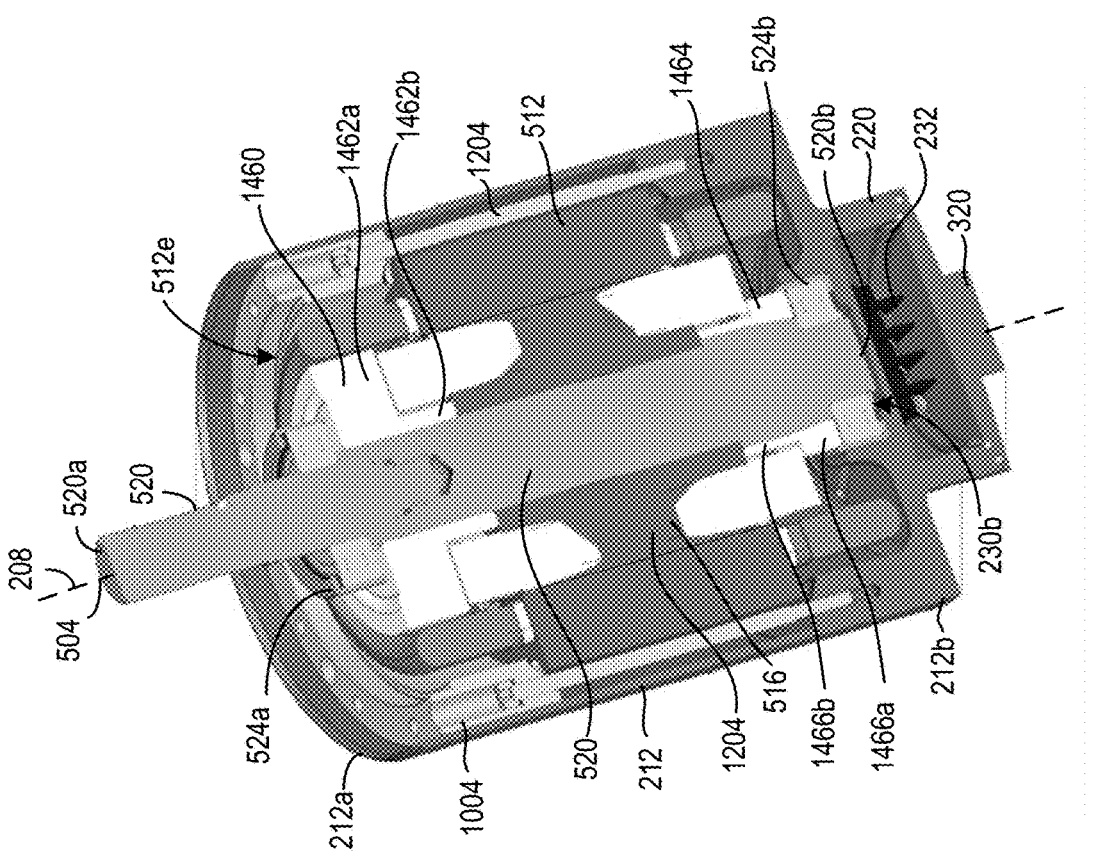
FIG. 18B is a perspective cross-sectional view, taken along the same plane as shown in FIG. 13D, and showing the rotor assembly received inside of the stator assembly.
Figure 18A:
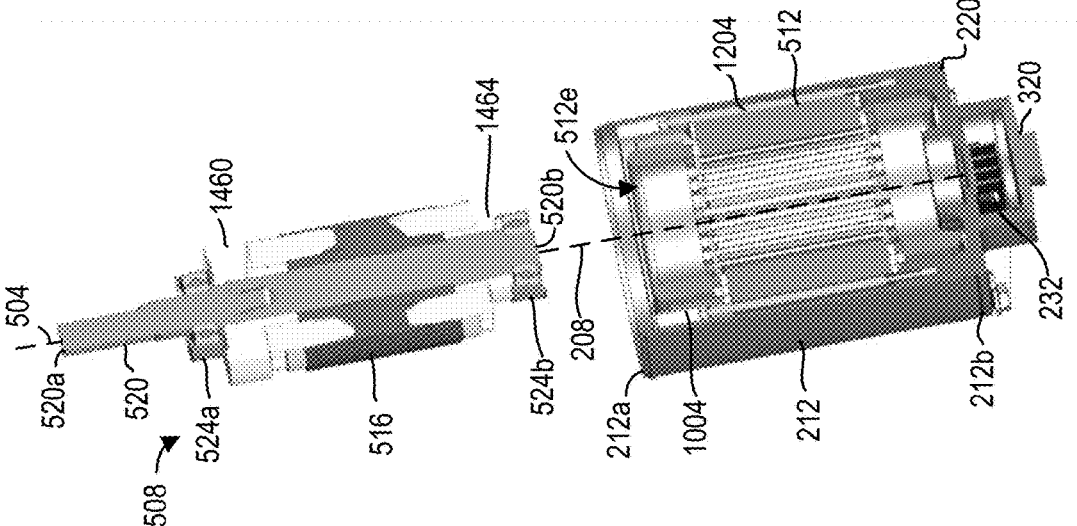
FIG. 18A is a partially exploded perspective cross-sectional view of a rotor assembly and a housing assembly retaining a stator assembly, wherein the cross-sectional view is taken along the same cross-sectional plane as shown in FIG. 13D.

This is exemplified in FIGS. 18A and 18B which show the previously described rotor assembly 508 (FIGS. 5C, 5D) being axially inserted, along housing and motor axes 208, 504, to nest within the stator assembly 512.

Figures 6D, 6E:
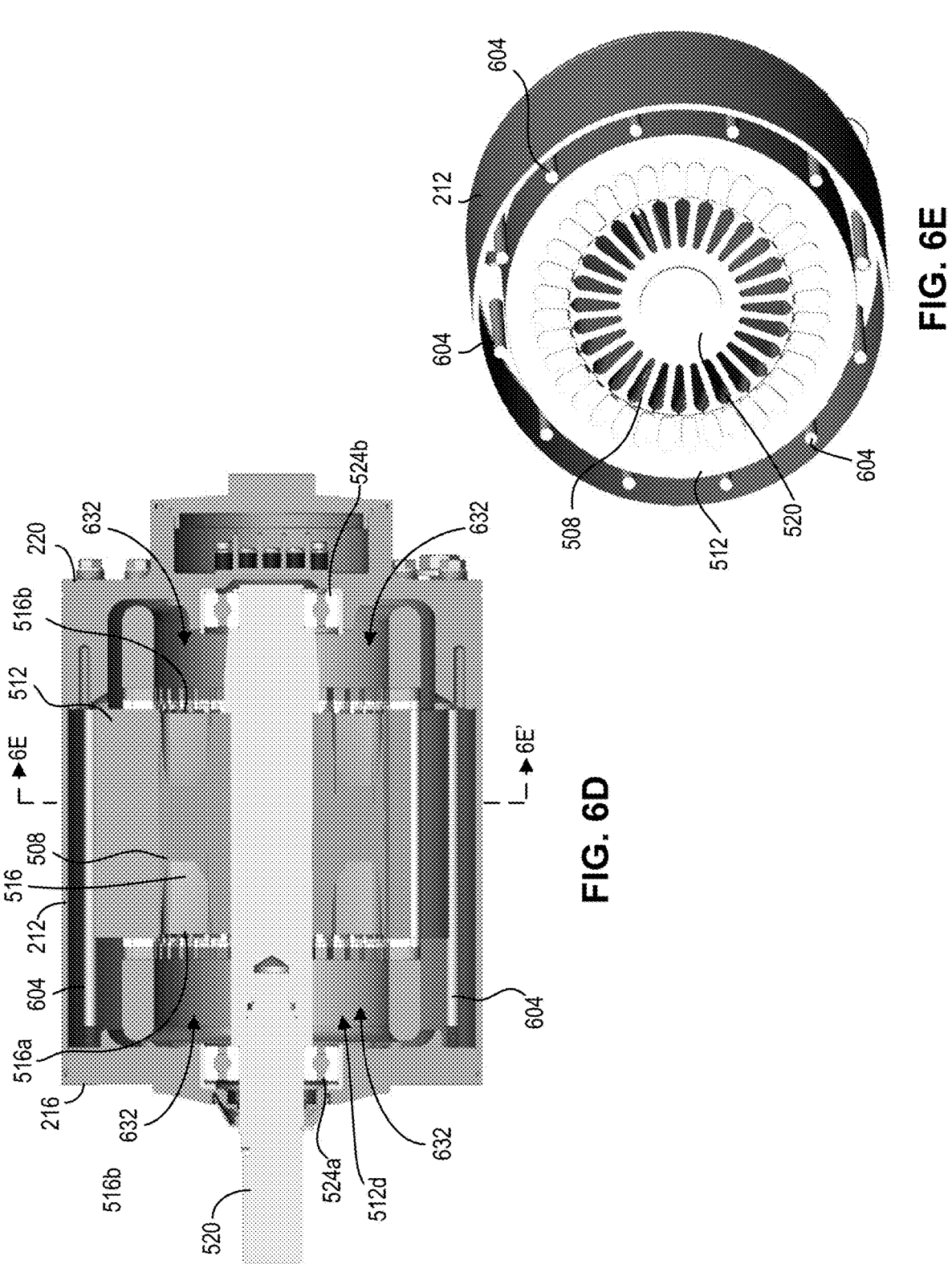
FIG. 6D is an elevation view of the housing assembly, taken along the section like 6C-6C' of FIG. 6B, and showing one or more housing fasteners mounted therein as well as the electric motor assembly.
FIG. 6E is a perspective view of the housing assembly, taken along the section like 6E-6E' of FIG. 6D, and showing one or more housing fasteners mounted therein as well as the electric motor assembly.

As best exemplified in FIG. 6D, once the rotor assembly 508 is mounted into the stator assembly 512—there may be large empty gaps 632 within the interior of the stator assembly 512 (e.g., areas not occupied by the rotor assembly 508). These gaps 632 are not filled with encapsulant, as the gaps 632 overlap with areas previously occupied by the alignment plug 1404 (e.g., disposed within the stator assembly interior 512d while encapsulant was injected) (FIG. 16). The gaps 632 are disposed on either end 516a, 516b of the rotor core 516—as between the rotor core ends 516a, 516b and the bearing assemblies 524a, 524b.

Accordingly, as exemplified in FIGS. 19A-19D, to enhance ingress protection and to block the voids 632—one or more cavity fillers 1460, 1464 may be attached (e.g., removable attached) around the rotor assembly 508. In particular, the fillers 1460, 1464 are used to eliminate air gaps which may draw in external containments or result in moisture build-up. As shown in FIG. 18B, when the rotor assembly 508 is mounted inside the stator assembly 512, the fillers 1460, 1464 may occupy the empty gaps 632 within the stator assembly 512.

Figure 19B:
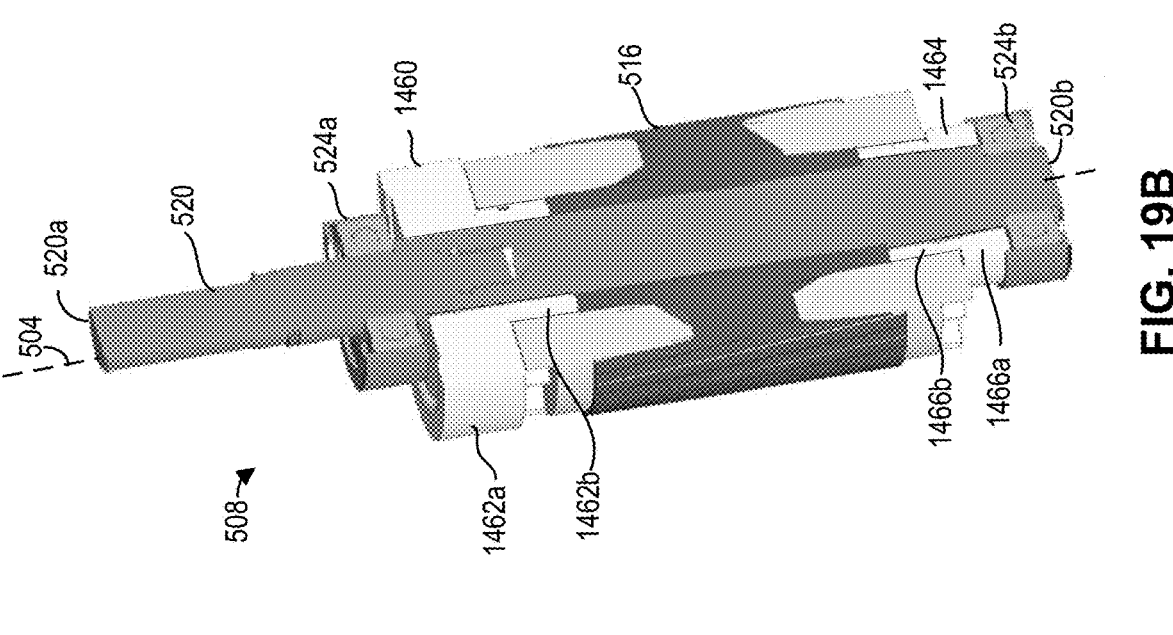
FIG. 19B is a perspective cross-sectional view, taken along the section line 19B-19B' of FIG. 19A.
Figure 19A:
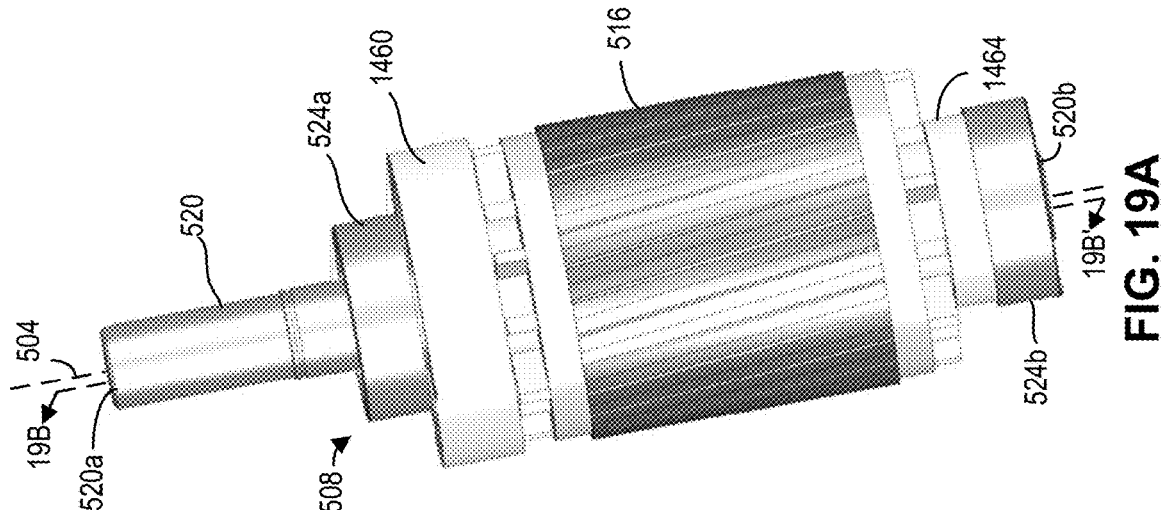
FIG. 19A is a perspective view of a rotor assembly, in combination with one or more rotor cavity fillers, in accordance with an example embodiment.
Figure 19D:
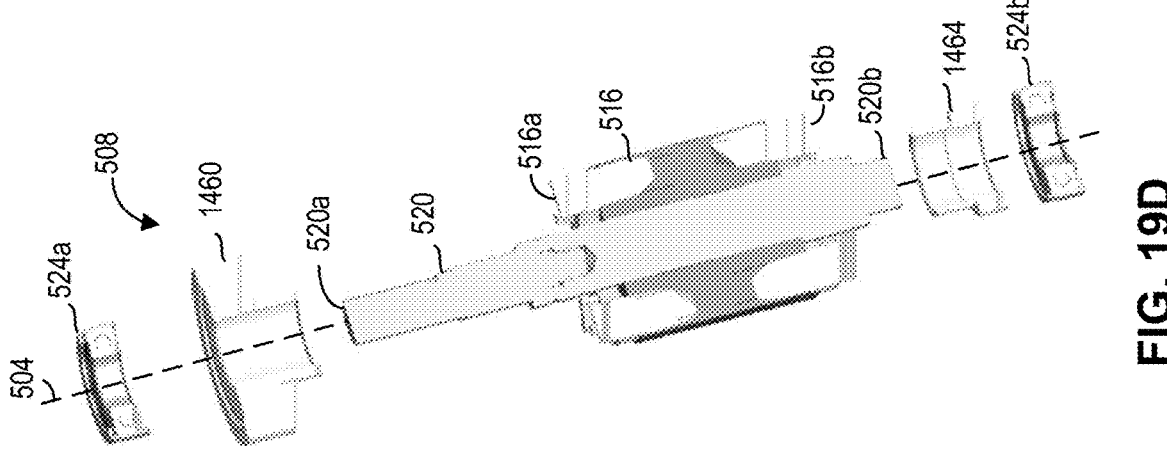
FIG. 19D is a perspective cross-sectional view, taken along the section line 19D-19D' of FIG. 19C.
Figure 19C:
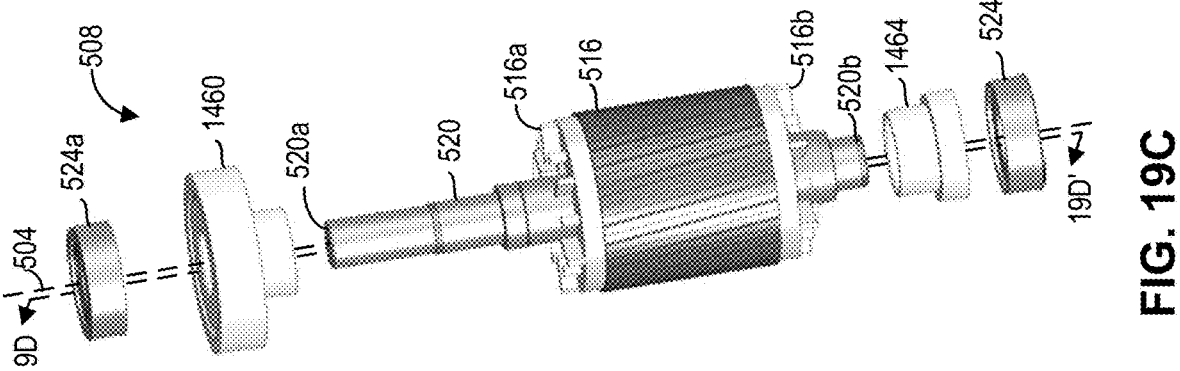
FIG. 19C is a partially exploded view of the combined rotor assembly and one or more cavity fillers.

As exemplified in FIGS. 19C and 19D, the fillers may include a first filler 1460 and a second filler 1464. First filler 1460 may be disposed between the first bearing assembly 524a and the first rotor core end 516a (e.g., in the axial space 544a) (FIG. 5C). Further, the second filler 1464 may be disposed between the second bearing assembly 524*b* and the second rotor core end 516*b* (e.g., in the axial space 544*b*) (FIG. 5C).

As exemplified in each of FIGS. 19C and 19D, each of the fillers 1460, 1464 may be designed to fit (or slide over) around the shaft 520.

Figures 20A, 20B, 20C, 21A, 21B, 21C:
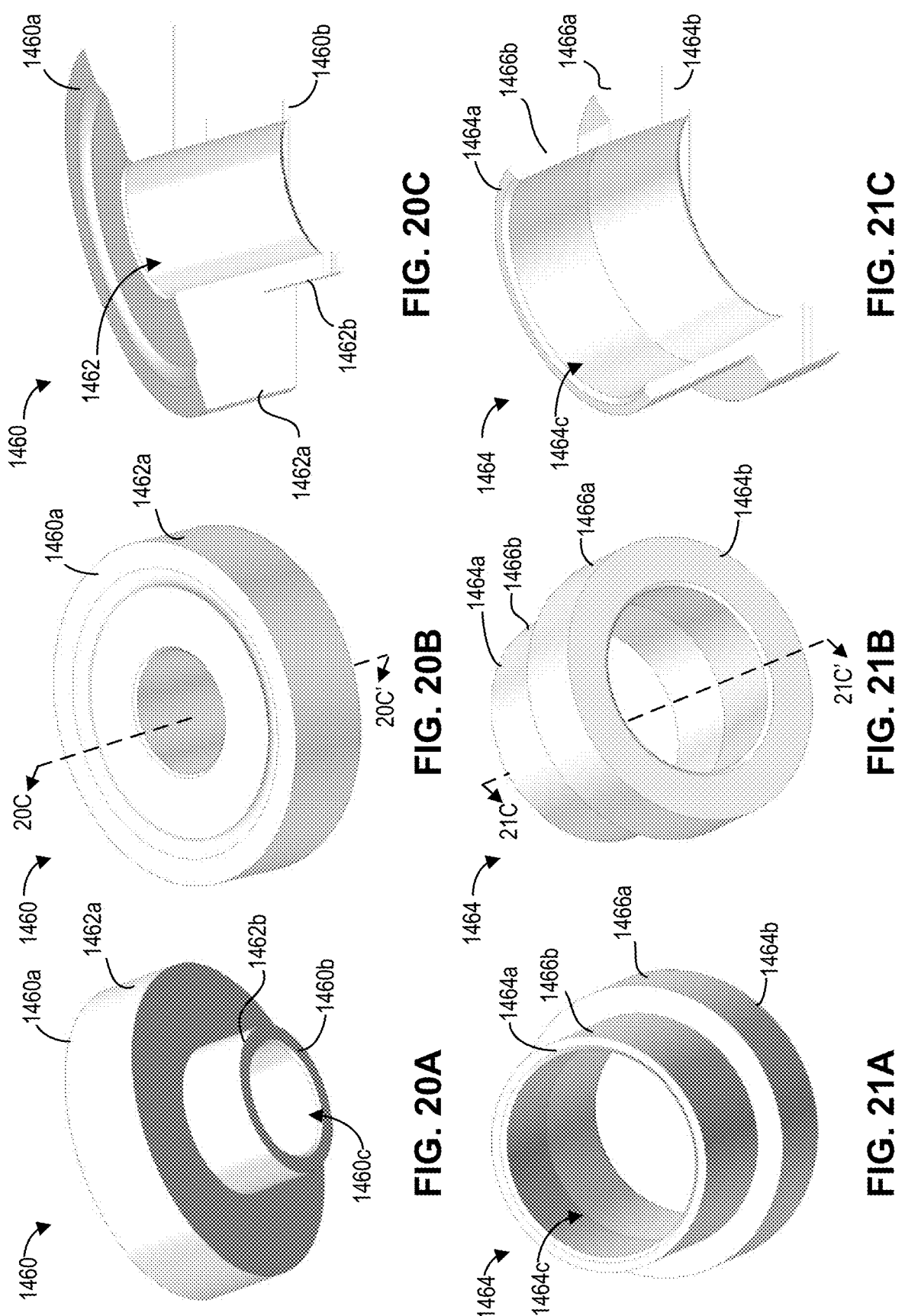
FIG. 20A is a bottom-up perspective view of a first rotor cavity filler, according to an example embodiment.
FIG. 20B is a top-down perspective view of the first rotor cavity filler.
FIG. 20C is a cross-sectional view of the first rotor cavity filler, taken along the section line 20C-20C' of FIG. 20B.
FIG. 21A is a bottom-up perspective view of a second rotor cavity filler, according to an example embodiment.
FIG. 21B is a top-down perspective view of the second rotor cavity filler.
FIG. 21C is a cross-sectional view of the second rotor cavity filler, taken along the section line 21C-21C' of FIG. 21B.

Fillers 1460, 1464 may have various designs and configurations. FIGS. 20A-20C exemplifies a design for the first filter 1460 in greater detail, while FIGS. 21A-21C exemplifies a design for the second filter 1464. In each case, the fillers 1460, 1464 axially extend between a respective first end 1460*a*, 1464*a* and second end 1460*b*, 1464*b*. A shaft-receiving passage 1460*c*, 1464*c* extends respectively between each first and second ends. The shaft-receiving passages 1460*c*, 1464*c* can be dimensioned to have a slightly smaller diameter to shaft 520, as to provide an interference fit engagement.

Each filler 1460, 1464 can also include a respective wider portion 1462*a*, 1466*a* and a narrower portion 1462*b*, 1466*b*. As exemplified in FIG. 18B, the wider portions 1462*a*, 1466*a* are sized and dimensioned to extend radially to fill the void between the shaft 520 and the stator assembly 512. Further, the narrower portions 1462*b*, 1466*b* are sized and dimensioned to nest within the rotor cage, such as to further secure the fillers 1460, 1464.

Referring back to FIG. 8, at 816, the front flange and the sealing assembly may be mounted.

Figures 22A, 22B, 22C:
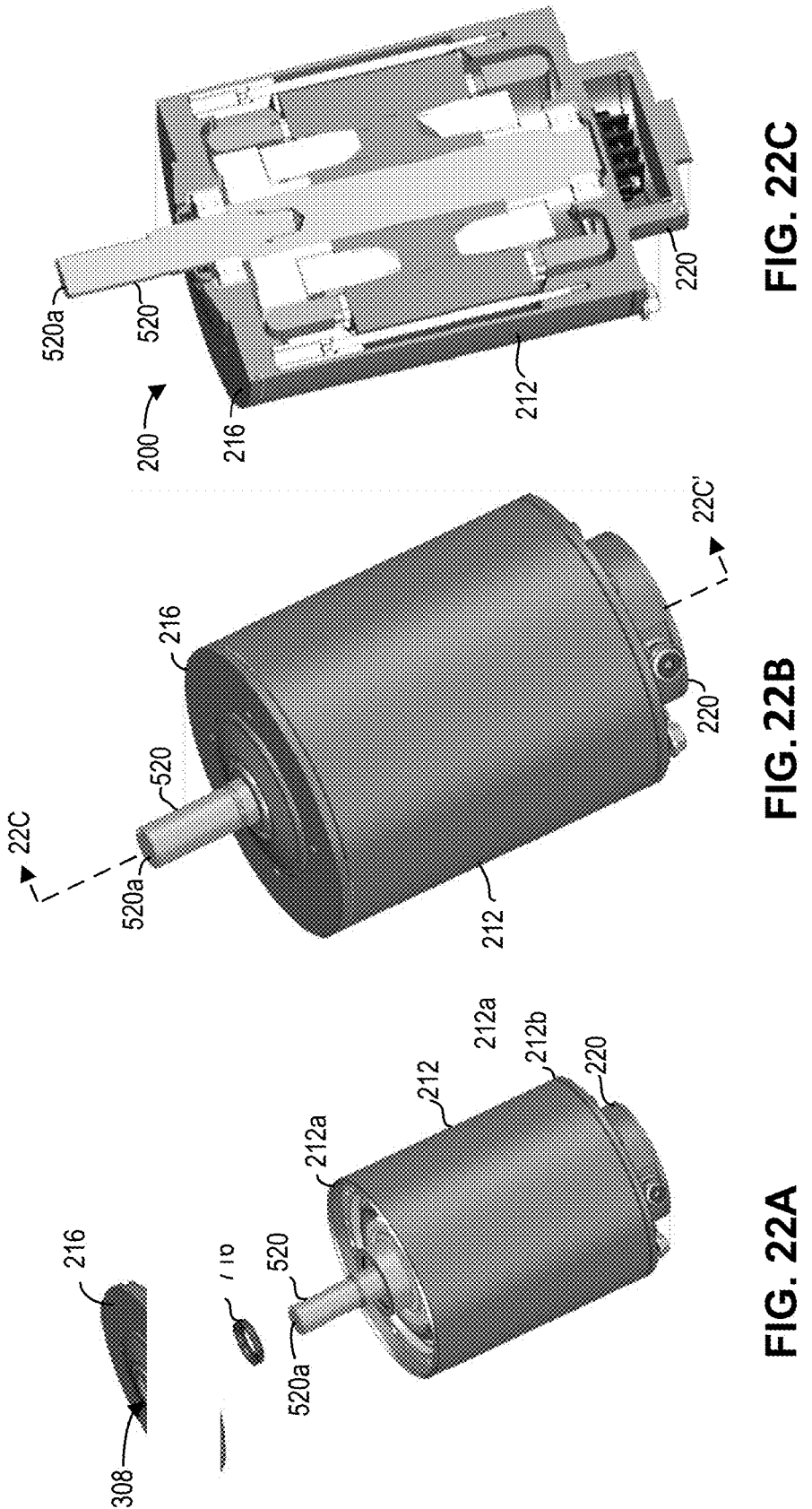
FIG. 22A is a partially exploded perspective view showing a front housing flange and radial shaft seal being applied to a housing assembly retaining an electric motor assembly.
FIG. 22B is a perspective view of the front housing flange and radial shaft seal applied to the housing assembly retaining the electric motor assembly.
FIG. 22C is a cross-sectional view, taken along the section line 22C-22C' of FIG. 22B.
Figure 23B:
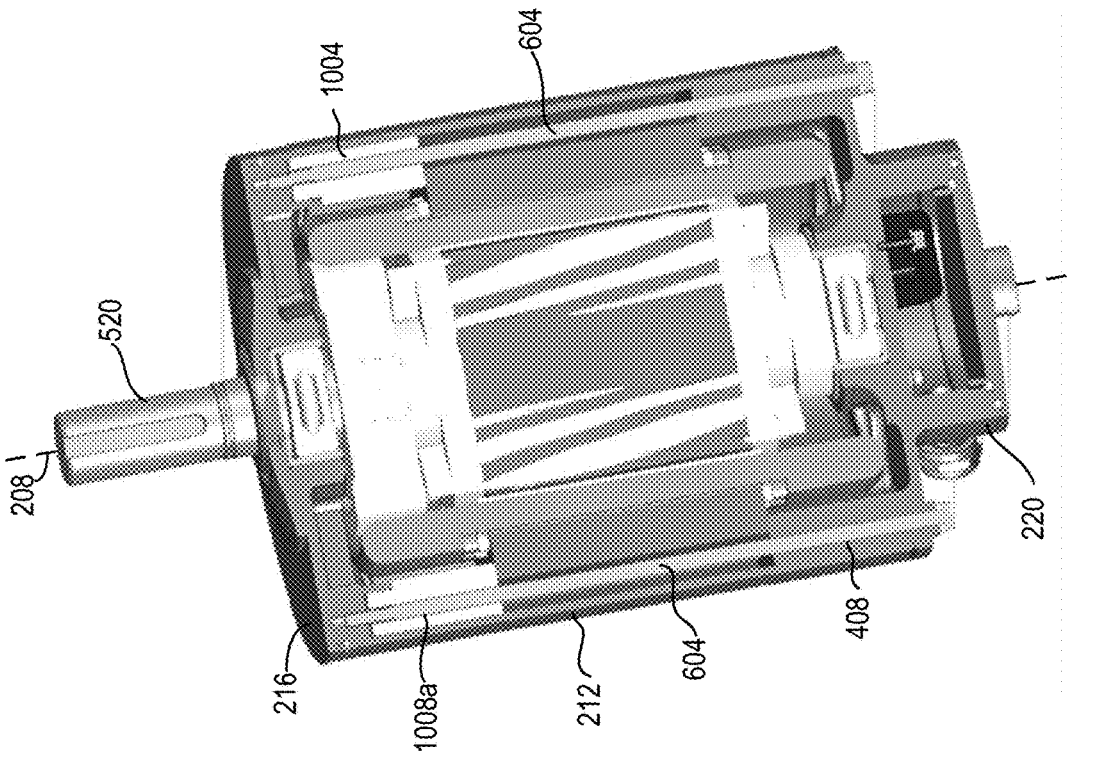
FIG. 23B is a cross-sectional view, taken along the same cross-sectional plane as FIG. 22C, and showing one or more housing fasteners received through the housing assembly.
Figure 23A:
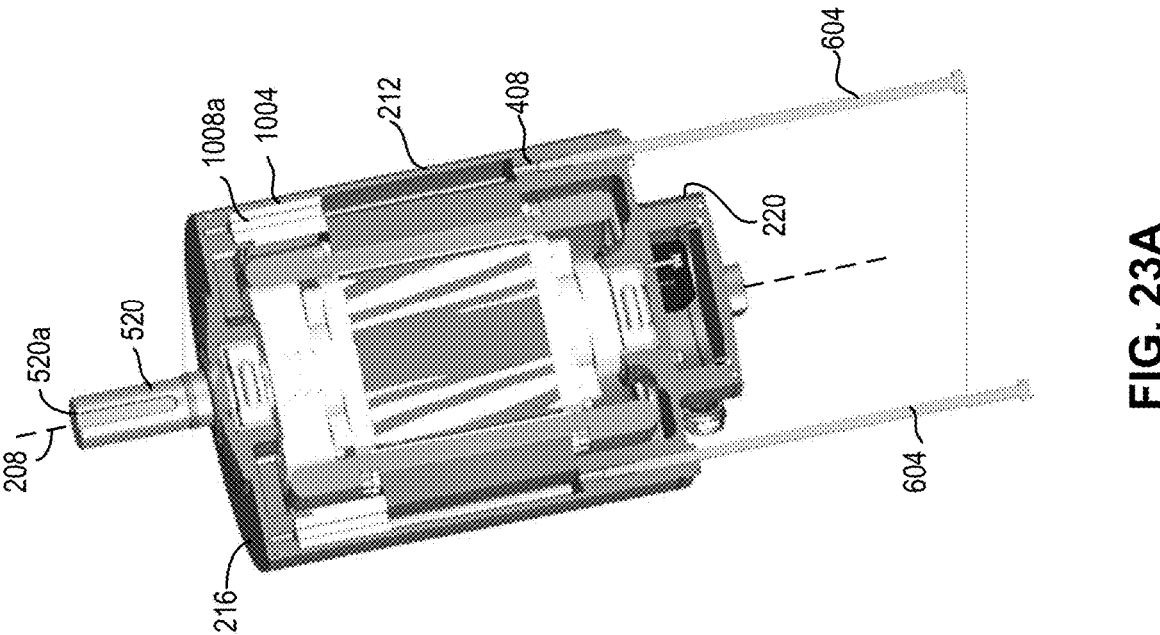
FIG. 23A is a partially exploded cross-sectional view, taken along the same sectional plane as FIG. 22C, showing one or more housing fasteners being receiving through the housing assembly.
Figure 24:
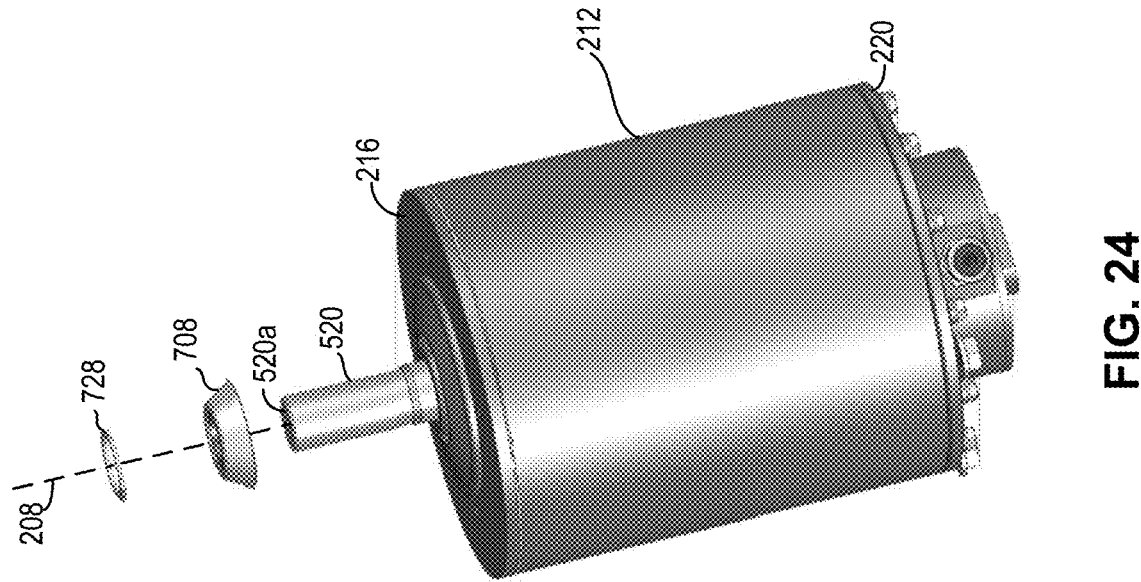
FIG. 24 is a partially exploded view showing a portion of a sealing assembly being applied over a front housing flange.

For instance, as exemplified in FIGS. 22A-22C, the radial shaft seal 716 and front flange 216 may be axially positioned over the first shaft end 520*a*, as previously explained in FIGS. 3C-3F, as well as FIG. 7B. In this manner, the housing assembly 200 is completed, and retains the motor assembly 500 therewithin.

At act 816, the flinger seal 708 and contact seal 712 (not shown) may be further mounted over the front flange 216, as well as the retaining ring 728 (FIG. 24), also as previously described in FIG. 7B.

Here, a number of important points will be appreciated: (i) as exemplified in FIG. 17, in the disclosed embodiment—an axial spacing 1702 is provided between the axial height of encapsulant 1604 and the front flange 216. As such, the encapsulant 1604 does not "stick" to the front flange 216, thereby preventing opening of the front flange 216 for ease maintenance of the bearing assembly 524*a* and sealing assembly 704. This is contrasted to previous designs (FIG. 1), in which the encapsulant prevents opening of the end cover 110, as the encapsulant 112 is injected after installing the end cover 110; (ii) the design of the alignment plug 1404 also ensures minimum air voids while facilitating end cover removal; and (iii) the positioning of the rotor fillers 1460 behind the first bearing assembly 524*a* and sealing assembly 704, also ensures that the rotor cavity filler 1460 does not obstruct access to the bearing assembly 524*a* and/or sealing assembly 704 for maintenance.

Accordingly, the disclosed embodiments enable for simplified bearing and seal assembly maintenance, which improves reliability and lifetime of the motor assembly 502.

Additionally, owing to use of the compression ring 1004—the stator and rotor assemblies are radially aligned, This, in turn, facilitates a consistent airgap between the stator and rotor assemblies.

At 820, the housing assembly 200 can be secured via the one or more one or more elongated fasteners 604 (FIGS. 23A-23B), as previously described with reference FIGS. 6A-6C. To this end, the fasteners 604 may pass axially through the first openings 1008*a* of the compression ring 1004 (FIGS. 11A-11E). In the compression ring 1004, the first openings 1008*a* may be axially offset from the second openings 1008*b*—and in the mounted position, may be axially aligned with the fastener openings 408 on the rear flange 220 (FIG. 4N).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A motor housing assembly for retaining an electric motor, comprising:
   a housing body portion extending along a housing axis between a first end of the housing body and a second end of the housing body;
   an end flange member coupled to the first end of the housing body, the end flange further comprising an exterior surface and an interior surface and a shaft-receiving opening extending between the exterior and interior surfaces for receiving a shaft of the electric motor, wherein the exterior surface comprising a groove surrounding the shaft-receiving opening;
   a sealing assembly disposed around the shaft-receiving opening of the end flange, the sealing assembly comprising:
      a flinger seal extending between a first and a second end of the flinger seal, wherein the second end of the flinger seal is receivable inside of the groove; and
      a contact seal disposed under the flinger seal and over the front surface of the end flange.

2. The motor housing of claim 1, wherein the second end of the flinger seal is axially translatable inside the groove.

3. The motor housing of claim 1, wherein the sealing assembly further comprises a radial shaft seal disposed inside an interior of the housing body portion and in contact with the interior surface of the end flange member.

4. The motor housing assembly of claim 1, wherein the flinger seal is tapered outwardly between the first and second end of the flinger seal.

5. The motor housing of claim 1, wherein the flinger seal is rotatable with the motor shaft.

* * * * *